(12) United States Patent
Kuchibhotla et al.

(10) Patent No.: US 10,042,908 B2
(45) Date of Patent: Aug. 7, 2018

(54) METHOD AND SYSTEM FOR IMPLEMENTING A UNIFIED DB CLONE SYSTEM

(71) Applicant: ORACLE INTERNATIONAL CORPORATION, Redwood Shores, CA (US)

(72) Inventors: Balasubrahmanyam Kuchibhotla, San Ramon, CA (US); Bharat Paliwal, Redwood City, CA (US); Srivatsan Vijayaraghavan, Bangalore (IN); Sanjay Chinnappaiah Ediga, Bangalore (IN); Adeesh Fulay, Sunnyvale, CA (US); Sudip Datta, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 366 days.

(21) Appl. No.: 14/866,118

(22) Filed: Sep. 25, 2015

(65) Prior Publication Data
US 2016/0092535 A1 Mar. 31, 2016

Related U.S. Application Data

(60) Provisional application No. 62/056,055, filed on Sep. 26, 2014.

(51) Int. Cl.
*G06F 17/30* (2006.01)
*G06F 3/0484* (2013.01)
*G06F 11/10* (2006.01)

(52) U.S. Cl.
CPC .... *G06F 17/30575* (2013.01); *G06F 3/04842* (2013.01); *G06F 11/10* (2013.01); *G06F 17/30289* (2013.01)

(58) Field of Classification Search
CPC ......... G06F 17/30575; G06F 17/30289; G06F 11/10; G06F 3/04842
See application file for complete search history.

(56) References Cited

U.S. PATENT DOCUMENTS

| | | | |
|---|---|---|---|
| 7,523,191 B1 * | 4/2009 | Thomas | G06F 11/3438 709/202 |
| 7,685,140 B2 * | 3/2010 | Jackson | G06Q 10/10 707/999.1 |
| 7,941,470 B2 | 5/2011 | Le et al. | |
| 8,656,123 B2 | 2/2014 | Lee | |
| 8,832,028 B2 | 9/2014 | Susairaj et al. | |
| 8,856,077 B1 * | 10/2014 | Roth | H04L 67/1095 707/638 |
| 9,172,621 B1 * | 10/2015 | Dippenaar | H04L 41/18 |

(Continued)

*Primary Examiner* — Leslie Wong
(74) *Attorney, Agent, or Firm* — Invoke

(57) ABSTRACT

Disclosed are a system, method, and computer program product for a unified system for implementing clones. The unified system includes the appropriate infrastructure to create, maintain, and administer clones and supporting data sources in the computing environment. In addition, a user interface is provided that is capable of visually displaying relationships and lineages of sources and clones in the system. The user interface provides functionality to select any given object, and to trace its parent-child relationships to highlight its related parent and/or child source/clone.

30 Claims, 70 Drawing Sheets

(56) References Cited

U.S. PATENT DOCUMENTS

| | | | |
|---|---|---|---|
| 9,304,705 B2 | 4/2016 | Antony | |
| 9,354,980 B2* | 5/2016 | Baptist | G06F 11/1448 |
| 9,529,808 B1 | 12/2016 | Sudarsanam et al. | |
| 9,558,085 B2* | 1/2017 | Lakshman | G06F 11/2094 |
| 2006/0085370 A1* | 4/2006 | Groat | G06F 17/30958 |
| 2007/0016740 A1* | 1/2007 | Somavarapu | G06F 3/0605 |
| | | | 711/162 |
| 2008/0065669 A1* | 3/2008 | Factor | G06F 17/30961 |
| 2008/0183973 A1* | 7/2008 | Aguilera | G06F 11/1464 |
| | | | 711/147 |
| 2008/0244028 A1* | 10/2008 | Le | G06F 3/0607 |
| | | | 709/208 |
| 2009/0276771 A1* | 11/2009 | Nickolov | G06F 9/4856 |
| | | | 717/177 |
| 2010/0082551 A1* | 4/2010 | Kathuria | G06F 17/30433 |
| | | | 707/674 |
| 2010/0088289 A1* | 4/2010 | Zhu | G06F 17/30362 |
| | | | 707/695 |
| 2013/0262387 A1* | 10/2013 | Varadharajan | G06F 17/30581 |
| | | | 707/639 |
| 2013/0263119 A1* | 10/2013 | Pissay | G06F 9/45558 |
| | | | 718/1 |
| 2014/0244935 A1* | 8/2014 | Ezra | G06F 3/0614 |
| | | | 711/133 |
| 2014/0337686 A1* | 11/2014 | Baptist | G06F 11/1448 |
| | | | 714/763 |
| 2015/0074054 A1* | 3/2015 | Antony | G06F 17/30088 |
| | | | 707/639 |
| 2015/0142748 A1* | 5/2015 | Gottemukkula | G06F 11/1451 |
| | | | 707/649 |
| 2015/0142750 A1* | 5/2015 | Mutalik | G06F 11/1451 |
| | | | 707/654 |
| 2015/0143064 A1* | 5/2015 | Bhargava | G06F 11/1451 |
| | | | 711/162 |
| 2015/0312356 A1* | 10/2015 | Roth | G06F 11/3006 |
| | | | 709/226 |
| 2016/0072899 A1* | 3/2016 | Tung | H04L 41/12 |
| | | | 709/223 |
| 2016/0139809 A1* | 5/2016 | Dolph | G06F 3/0604 |
| | | | 711/162 |
| 2016/0188415 A1* | 6/2016 | Karinta | G06F 11/1451 |
| | | | 707/654 |
| 2016/0308722 A1* | 10/2016 | Kumarasamy | H04L 41/0846 |

* cited by examiner

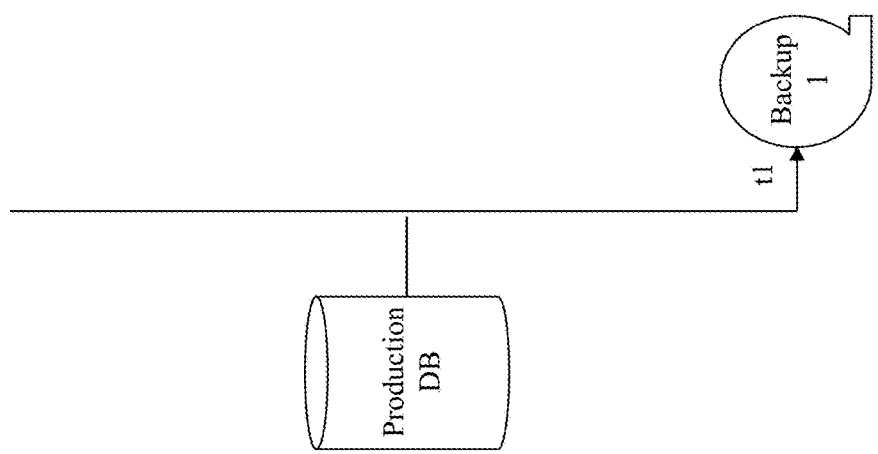

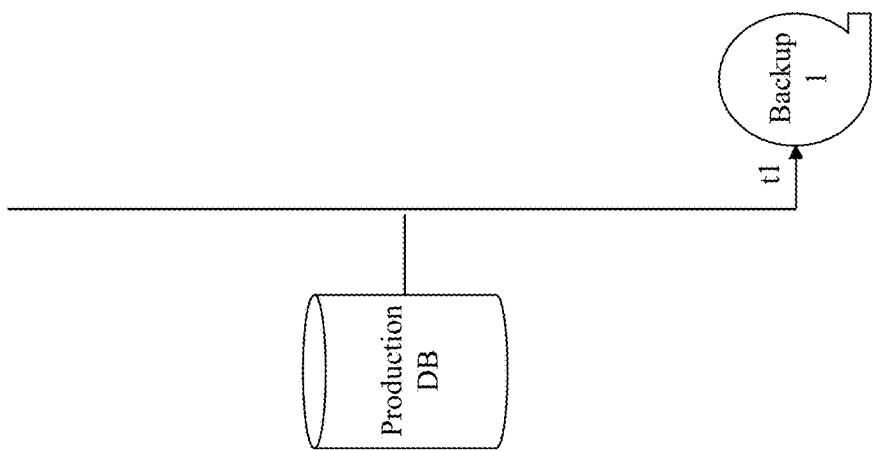

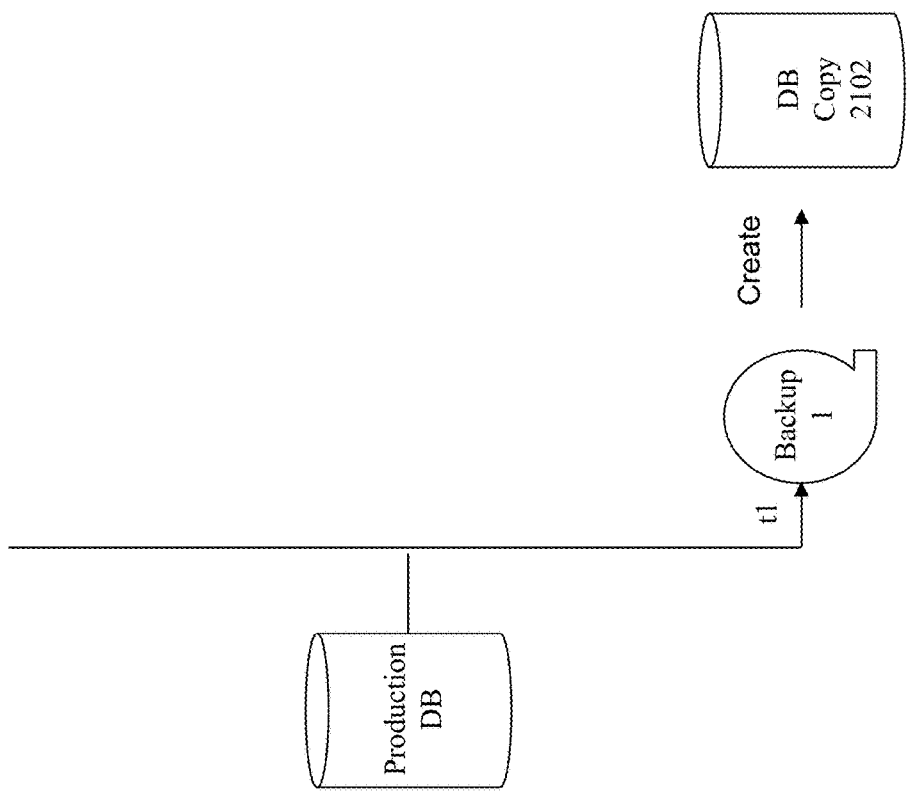

Lineage Map

| Clone | Parent |
|---|---|
| Clone_A3 | A3 |
| Clone_B1 | B1 |
| Clone_B2 | B2 |

Profile A

| Name | Date | Clone | Status |
|---|---|---|---|
| A1 | 5/2015 | | |
| A2 | 6/2015 | | |
| A3 | 7/2015 | Clone_A3 | Removal Overdue by 10 days |
| A4 | 8/2015 | | |

Profile B

| Name | Date | Clone | Status |
|---|---|---|---|
| B1 | 8/2015 | Clone_B1 | Eligible removal 10 days |
| B2 | 9/2015 | Clone_B2 | Eligible removal 30 days |

Fig. 41

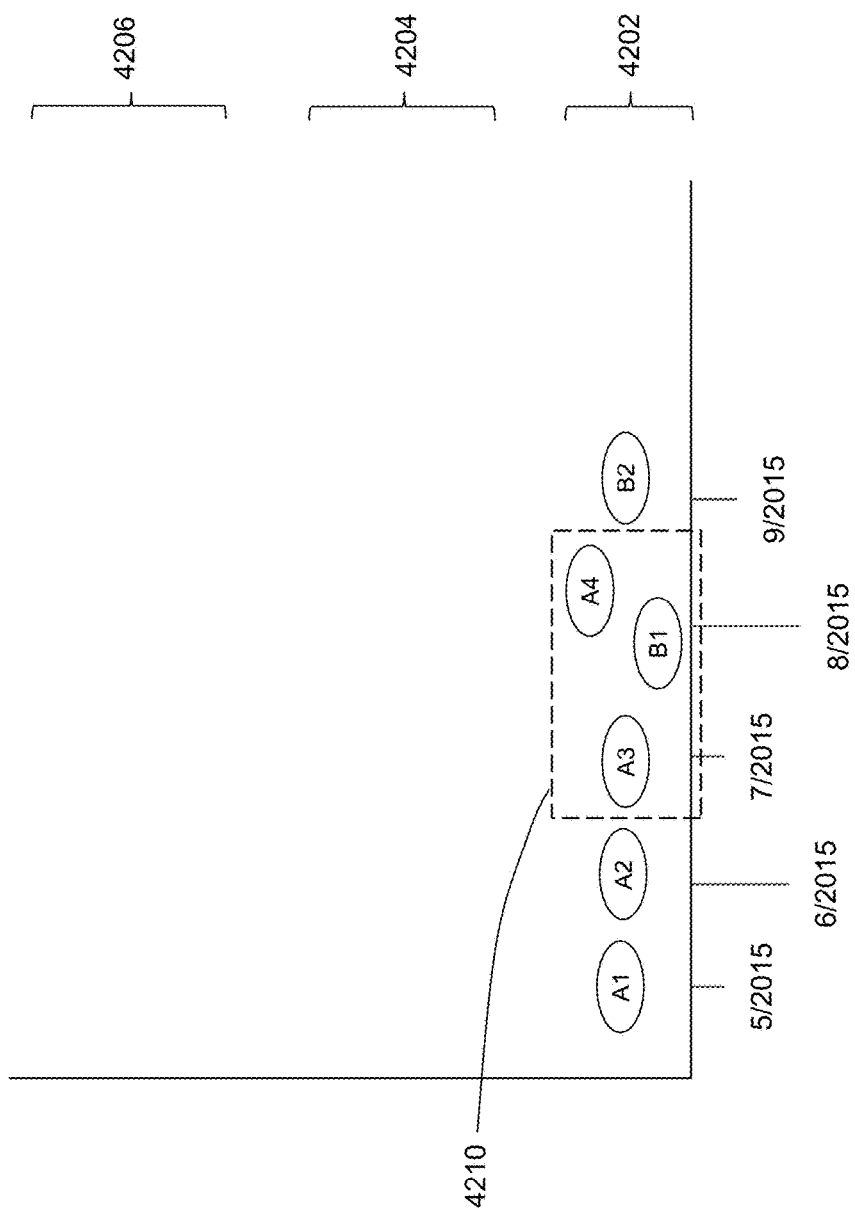

METHOD AND SYSTEM FOR IMPLEMENTING A UNIFIED DB CLONE SYSTEM

CROSS-REFERENCE TO RELATED APPLICATIONS

The present application claims the benefit of priority to U.S. Provisional Application No. 62/056,055, filed on Sep. 26, 2014, which is hereby incorporated by reference in its entirety.

BACKGROUND AND SUMMARY

There is often the need to create "clones" based upon data generated in a computing system or application. A clone is a copy of another set of data, where the clone may be an exact copy or a modified copy of the original data. For example, software applications developers often need to clone a production database in order to implement testing of the software over the cloned database data. This process of using the cloned data is often beneficial to fully test the software upon actual data, helping to identify and resolve problems before the software is introduced into a working production environment.

There is a large number of different ways in which clones can be generated from a set of underlying data. In fact, each system (e.g., database system or storage systems) from which clones can be generated may have its own set of procedures, policies, and different techniques that may be used to create the clones.

These issues relating to the large number of possibilities and permutations in the underlying systems and clone types make it very difficult for an ordinary user to properly create clones from a production environment. Even for experienced administrators, this quickly becomes a very complicated problem to know how, where, and when to create the clones. Given these large number of variations in the possible clones and clone types, this also created significant complications with respect to management, maintenance, and clean-up of the created clones.

The aforementioned problems become even more pronounced in large and complex ecosystems, such as complex enterprise-class database management environments that may contain a large number of different types of database and storage systems. A typical production environment for a large company may include many different types of systems from multiple vendors that maintain data to be cloned, which can exponentially multiply the possible ways in which to create, configure, and maintain the clones (and the clone's underlying source data).

Therefore, there is a need for an improved approach to manage cloning activity in a computing system. Other additional objects, features, and advantages of the invention are described in the detailed description, figures, and claims.

BRIEF DESCRIPTION OF FIGURES

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention.

FIGS. 19A-G illustrates an example process to implement management.

FIGS. 21A-H illustrates an example process to implement management where clones are created having dependencies upon a source.

FIG. 41 shows an illustration of two profiles and a lineage map structure.

FIGS. 42A-J illustrate how a user interface can be populated using this information, according to some embodiments of the invention.

DETAILED DESCRIPTION

As noted above, there is often the need to create clones based upon data generated in many types of computing systems and applications. However, there may be a large number of different ways in which clones can be generated from a set of underlying data. Therefore, issues relating to the large number of possibilities and permutations in the underlying systems and clone types make it very difficult for an ordinary user to properly create clones from a production environment. Even for experienced administrators, this very quickly becomes a very complicated problem to know how, where, and when to create the clones. Given these large number of variations in the possible clones and clone types, this also created significant complications with respect to management, maintenance, and clean-up of the created clones.

Embodiments of the present invention provide a system, method, and computer program product for a unified system for implementing clones. The unified system includes the appropriate infrastructure to create, maintain, and administer clones and supporting data sources in the computing environment. By providing a unified system to implement clones, this avoids the need to require users and administrators to learn how to implement clones for each individual type of underlying system and clones which may be required in the system.

Some embodiments are directed to a user interface that is capable of visually displaying relationships and lineages of sources and clones in the system. The user interface provides functionality to select any given object, and to trace its parent-child relationships to highlight its related parent and/or child source/clone.

This disclosure illustrates various embodiments of the invention in the context of database clones used for testing purposes. It is noted, however, that the inventive concepts disclosed herein are not limited only to clones in the database context nor are they limited only to clones used for testing purposes, unless explicitly claimed as such.

Figure 1:
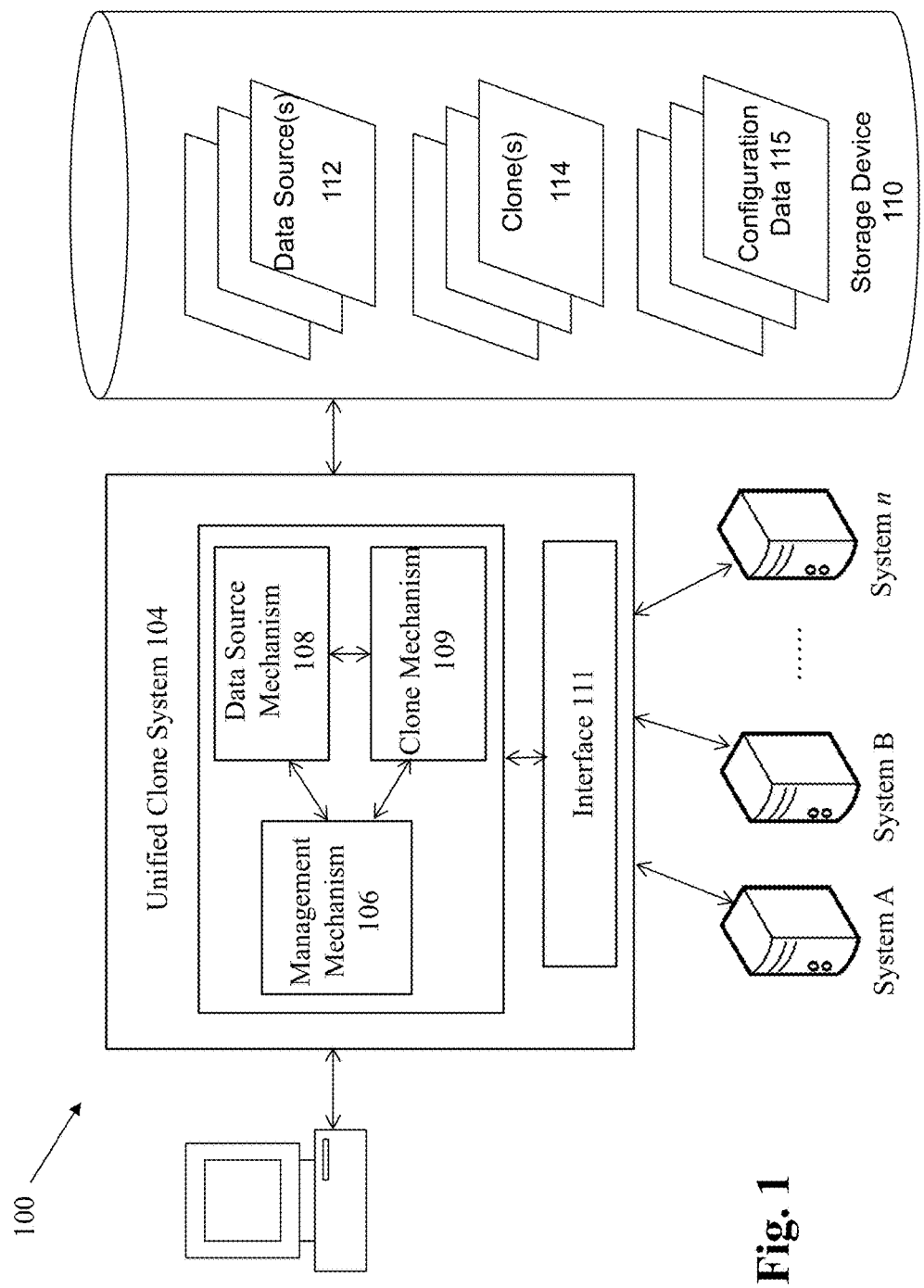
FIG. 1 illustrates an example system which can be employed in some embodiments of the invention to implement a unified system for cloning.

FIG. 1 illustrates an example system 100 which can be employed in some embodiments of the invention to implement a unified system for cloning. The system 100 includes one or more users at one or more user stations that use the system 100 to operate and interact with a unified clone system 104. The user station comprises any type of computing station that may be used to operate or interface with the unified clone system 104 in the system 100. Examples of such user stations include: workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

The unified clone system 104 comprises functionality that is accessible to users at the user stations, e.g., where unified clone system 104 is implemented as a set of engines or modules. A data source mechanism 108 is used to create one or more data sources 112 for the cloning. A clone mechanism 109 is used to create the clones 114. A management mechanism 106 is provided to manage and administer the data sources 112 and clones 114. Each of these mechanisms is described in more detail below.

The unified clone system 104 includes an interface 111 to access external systems A, B, . . . n. Each of these external systems corresponds to a possible source of data from which clones may need to be created, such as database systems or storage systems that may span multiple vendors and/or system types. The external systems typically provide an applications programming interface (API) that allows programmatic access to features and functionality of the system. In the unified clone system 104, the interface 111 calls the external systems using the appropriate API call for that respective system for the desired functionality. For example, each of the external systems may have their own specific set of API calls required to open a file/dump, access data, copy data, create a file/dump, and/or generate backups. The interface 111 within the unified clone system 104 translates the desired functionality intended by the data source mechanism 108 or the clone mechanism 109 into the correct API call necessary to effect that functionality. In addition, each of these external systems may have its own specific authentication/access sequence needed to connect to that system. The interface 111 is configured to make the appropriate sequence of operations with the correct credential to perform the appropriate functionality. Configuration data 115 may be maintained to implement access to the external systems A, B, . . . n. The configuration data 115 comprises any set of information necessary for this access to external systems by the clone system 104, including specifics regarding authentication and authorization data, special processes/procedures pertinent to a given system, network and node/naming information, and/or API call information. As described in more detail below, the configuration data 115 may also provide information and parameters regarding the data source creation process and cloning process. The ability of the system 104 to automatically interface with the external systems permits clones to be made from any supported external system, without requiring a user to have to acquire a high level of expertise in any external system for which clones are desired.

The data used within system 100, such as the data sources 112 and clones 114, may be held in a computer readable storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects and/or files in a file system.

Figure 2:
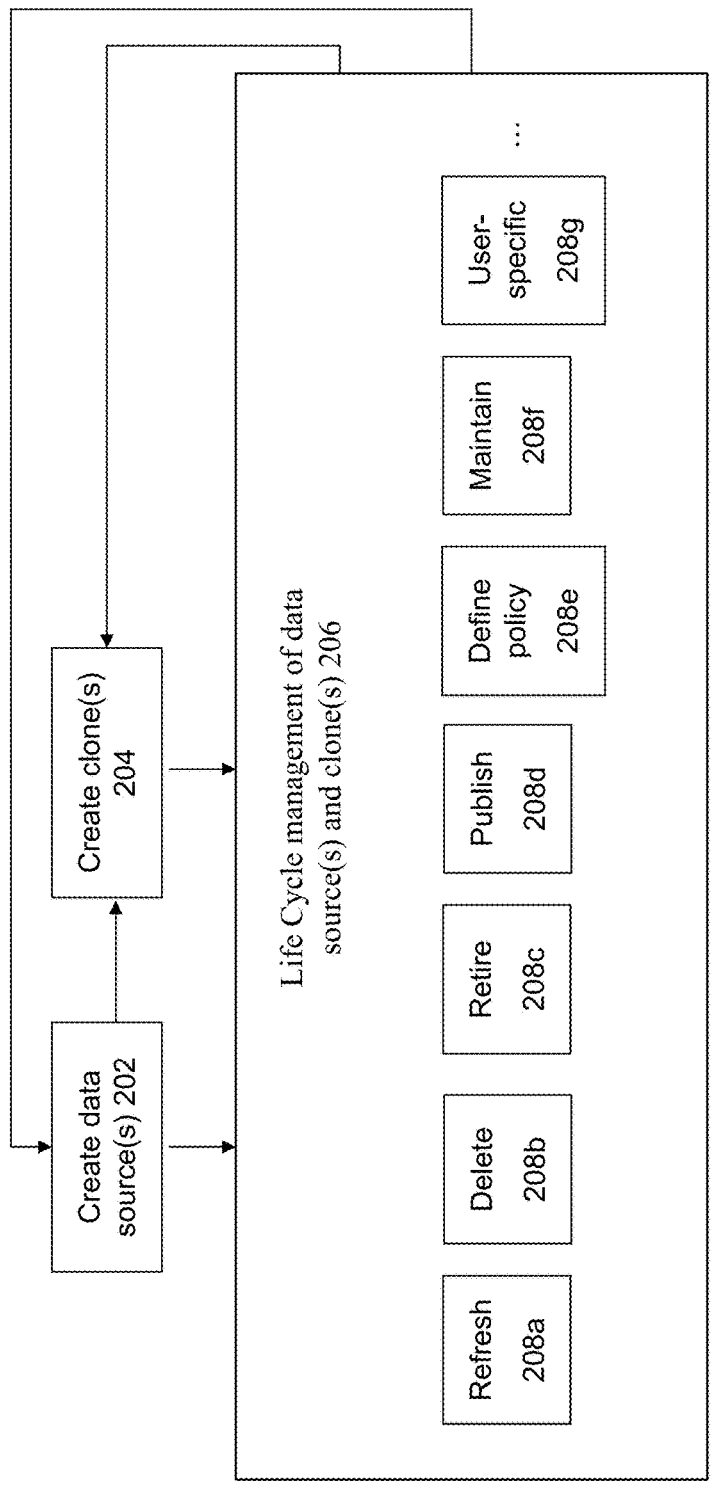
FIG. 2 shows a flowchart of an approach that can be taken to implement a unified system for cloning according to some embodiments of the invention.

FIG. 2 shows a flowchart of an approach that can be taken to implement a unified system for cloning according to some embodiments of the invention. At 202, one or more data sources are created, wherein the data sources correspond to the source of data for the clones. In a database context, these data sources are sources of data from the production DB data for which cloning may be desired.

Figure 3:
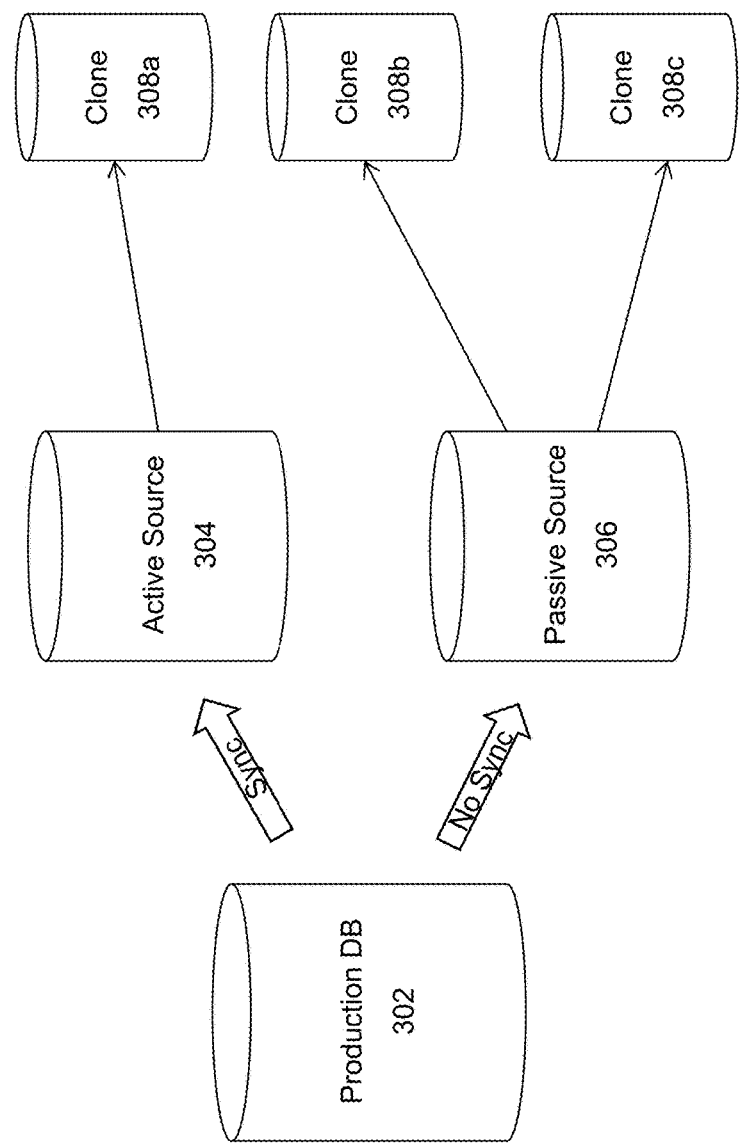
FIG. 3 illustrates active and passive sources.

As illustrated in FIG. 3, the data sources may be classified as an "active" data source 304 and a "passive" data source 306. An active data source 304 pertains to data that may be synchronized with the underlying data, such as production database 302. In contrast, the passive data source 306 pertains to data that is copied and will not be synched back to the underlying data, such as production database 302. Both the active data source 304 and the passive data source 306 can be used as the source for any number of clones, such as clones 308a, 308b, and 308c. While this figure shows the underlying data source as the production database 302, it is noted that a data source (whether active or passive) can be created based upon any suitable source of data, such as other clones, and is therefore not limited to having the underlying data being a production database.

Some examples of active data sources include, but are not limited to, a physical standby or a snapshot standby of a production database. The physical standby corresponds to a standby database that includes a full set of data from an underlying source, e.g., where log records from a primary database are physically applied on a regular basis to real table/row structures at the physical standby to keep it up-to-date. For example, the physical standby can be implemented as a failover standby DB, which is configured to take over operations in the event of a failure of its primary DB. A snapshot standby corresponds to the situation where a database snapshot provides the body of data for the standby, rather than the table schema of the primary.

Another example of an active data source could be a "test master" data source, which refers to a copy of a production database which is created for testing purposes to insulate the production data from the possible negative effects of testing activities. The test master may therefore comprises a sanitized version of the production data, a subset of the production data, or any other transformation from the production data deemed necessary for testing purposes.

Any suitable type of synchronization may be employed to keep the active data source in sync with its underlying data. For example, the test master may synchronize with its underlying data on a discrete basis (e.g., at regular intervals), while the physical standby may perform continuous synching with its primary DB.

Passive data sources generally encompass approaches where the data from the underlying source is merely deposited in a suitable format at a designated location. Examples of passive data sources include, but are not limited to, backups, snapshots, and data dumps. Any suitable tools can be used to form the passive data sources. For example, recovery management tools, such as the RMAN tool (Recovery Manager tool) available from Oracle Corporation or Redwood Shores, Calif., may be employed to create passive data sources in the form of backup data copies.

Returning back to FIG. 2, at 204, one or more clones are created from the underlying data sources. The clone may be created and used for any suitable purpose. For example, software applications developers often need to clone a production database in order to implement testing of the software over the cloned database data. This process of using the cloned data is often beneficial to fully test the software upon actual data, helping to identify and resolve problems before the software is introduced into a working production environment.

Another example use case for clones is to provide a resource to offload workloads off from the underlying production data. For example, many decision support systems (DSS systems) provide the functionality to run reports from gathered data. By generating a clone of the data from the DSS system, reports can be generated from the clone rather than the production system, thereby improving system efficiencies and responsiveness by reducing the ongoing workload on the production system.

Yet another example use case is for disaster recovery purposes. The clone may provide a resource for recovering from a failure that may occur to the production database, such as providing a standby, where production work can be failed over to the clone in the event of a problem at the production database.

Figure 4:
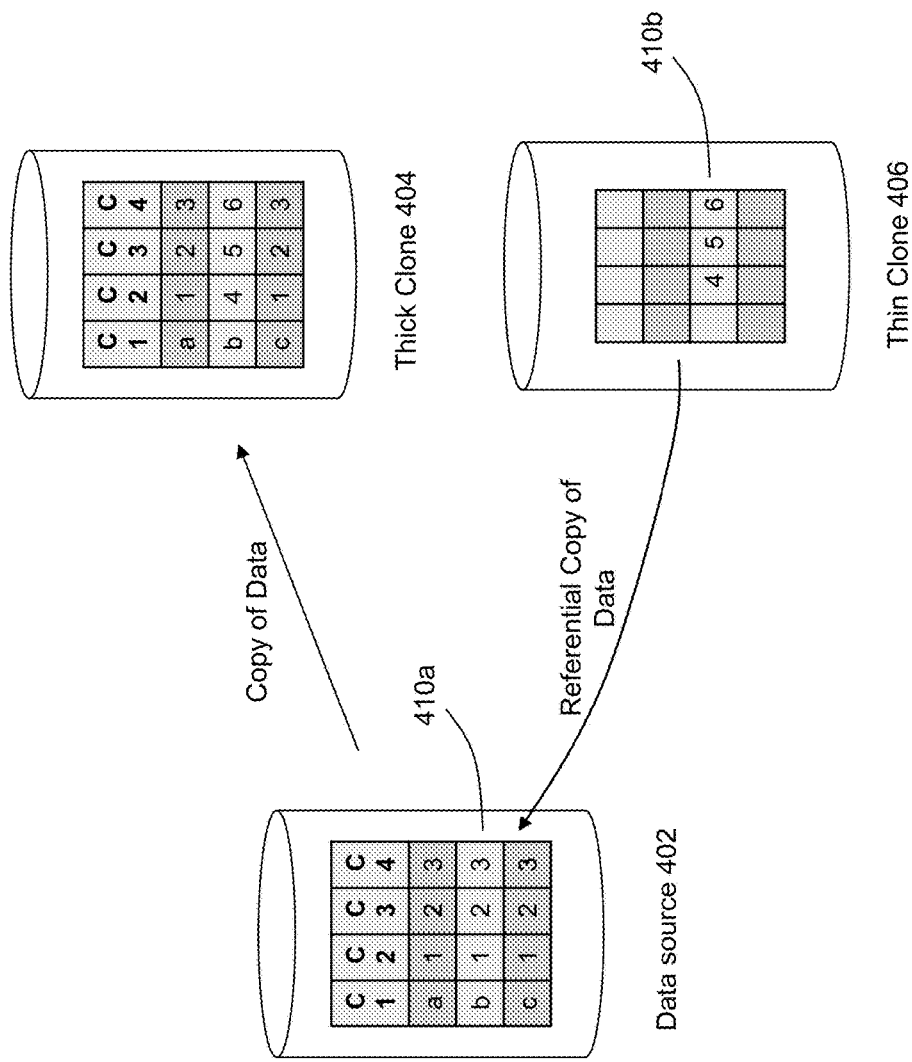
FIG. 4 illustrates two possible types of clones that may be created in the system.

FIG. 4 shows two different example kinds of clones that may be created in the system—full clones 404 and thin clones 406. A full clone 404 (also referred to herein as a "thick clone") is a clone having a full copy of the data from its source 402. Example of full clones include, for example, data dumps or system backups, e.g., from a recovery manager tool. A thin clone 406 is a type of clone where it is referentially tied to its source data. In the thin clone, only the delta between the clone and its underlying data source will be separately allocated as storage. For example, in this figure, row 410b in clone 406 has several entries (i.e., column entries "4", "5", and "6") which differ from that same 410a in the data source 402. Therefore, only these changed portions are represented in the clone 406, with the rest of the data referentially tied to the data source 402. The thin clones may be implemented, for example, as snapshots or by using underlying DB clone mechanisms.

After the data sources have been created at 202 and/or after the clones have been created at 204, additional life cycle management actions may be taken at 206 against either and/or both of the data sources and clones. Operations may be performed to refresh the data sources/clones (208a). This action may be to be taken, for example, when an underlying data source for a clone is out-of-date, and therefore the clone is refreshed to a more up-to-date data source. In addition, delete/shutdown operations may be initiated (208b). These operations can be taken to stop a clone, e.g., when a clone exceeds its designated lifetime and/or when the number of clones exceeds a numerical limit established by policy. Operations may be taken to perform retirement activities (208c). This action may be taken, for example, to remove a data source from being a selectable candidate as the source for a new clone, e.g., when the retired source exceeds it designated lifetime and/or when the source is considered to be out-of-date. Publication operations may also be performed (208d). These actions may be taken to publish the clone and make it available for access by users. Various policies may be defined for clones and/or data sources (208e). These policies specify parameters and guidelines under which clones may be maintained, created, and/or deleted. Any suitable type of maintenance operations can be performed upon the clones/sources (208f). Example of such maintenance operations include applying software updates, patches, and/or patchsets. Other operations may also be performed subject to user privileges (208g). For example, admin users may have privileges to perform certain operations that are not available to ordinary users. Any of the above operations may be specific to the particular DB pertinent to the clone.

These lifecyle operations may be applied in any order and/or combination of actions. It is noted that some circumstances may therefore perform some of these actions in a given order for certain types of clones/sources, while other types of clones/sources may necessitate a different combination and/or order of operations in the lifecycle.

Figure 5:
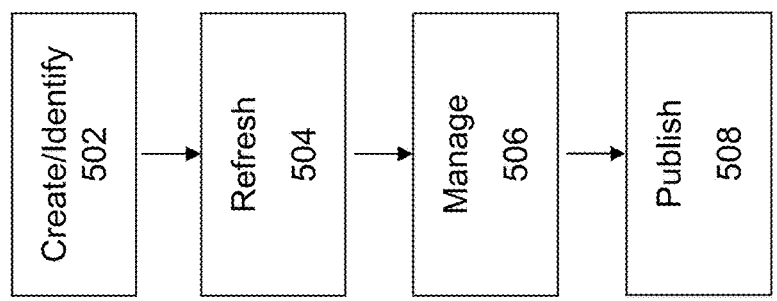
FIG. 5 shows a flowchart of an approach to implement life cycle operations.

For example, FIG. 5 shows a flowchart of one possible approach to implement life cycle operations, e.g., for data sources. At 502, the data source is either created or identified. The identification function is applied if it is desired to use an existing source of data as a data source for cloning. In some embodiments, this functionality is implemented by identifying an appropriate existing set of data, and adjusting the system metadata to "label" the set of data as a data source. The creating function is applied to create a new data source. A mapping table can be maintained to track the data sources in the system, where the mapping table is updated to include the particulars of the newly created/identified data source.

At 504, refresh operations can be performed on the data sources. This action can be performed, for example, on active data sources to synch the active data source to the production data. For passive data sources, in addition to "refreshing" the data, this action may be performed to create new versions of the data.

At 506, management functions are performed upon the data sources. Any suitable type of management functionality may be implemented for the data sources, such as those described above with respect to FIG. 2. For example, data retention policies can be defined and applied to the data sources, to make sure expired data sources are aged out of the system.

At 508, the data sources may be published. For example, the data sources can be published to a cloud environment as a "service". In some cases, an organization may wish to establish a private cloud model to provide access to the data sources. A portal can then be established to access the data sources within the private cloud.

Figure 6:
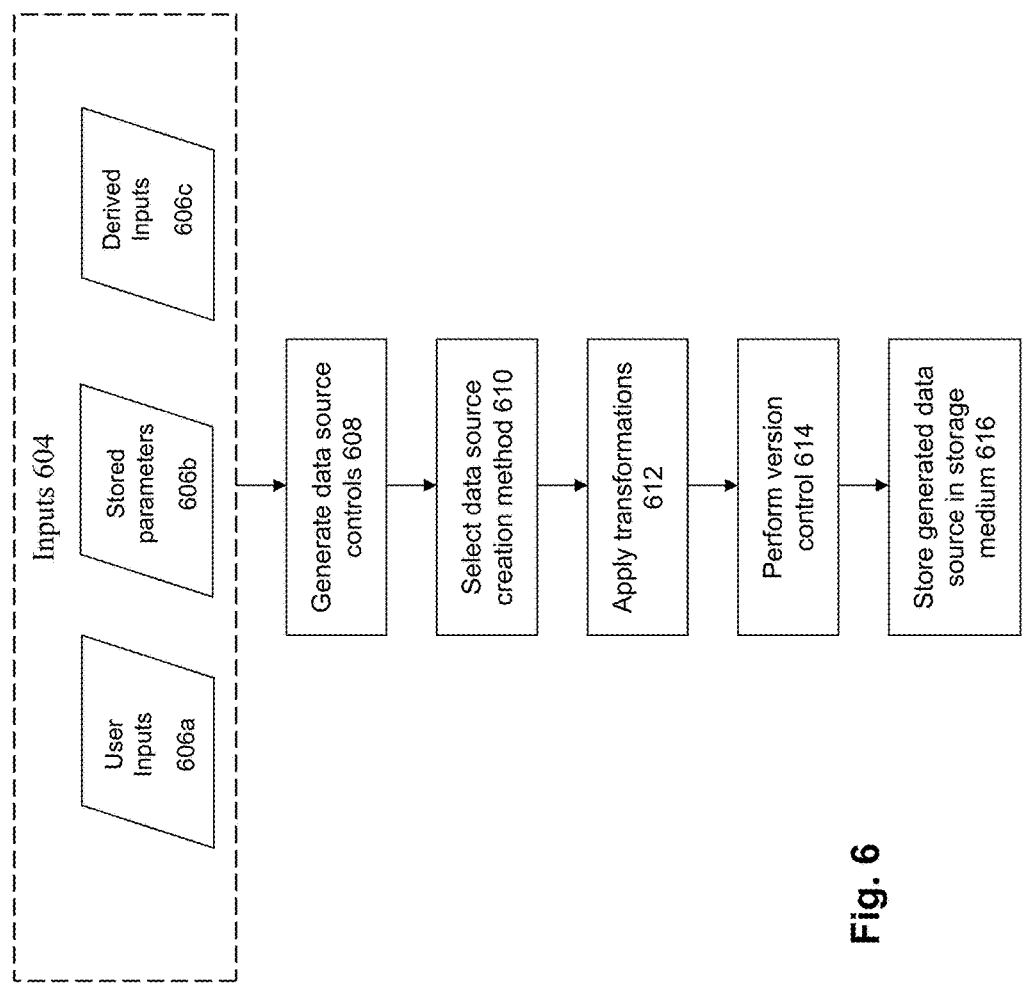
FIG. 6 shows a flowchart of an example approach to create data sources according to some embodiments of the invention.

FIG. 6 shows a flowchart of an example approach to create data sources according to some embodiments of the invention. The inputs 604 to the source creation process include user configuration inputs 606a. This type of input pertains to data that is specifically identified, created, or provided by the user, such as for example, user selection/identification of an input source or a production DB. Stored parameters 606b comprise any set of parameters that are maintained in the system, such as for example, policy-based parameters or stored user preferences. Policies are described in more detail below. In addition, derived inputs 606c may be employed, which are parameters for the data source creation processed that are derived by the system. This type of information is derived and/or calculated by the system, rather than being explicitly provided. Such derived information may include data about the type of systems/data, compatibilities and incompatibilities, etc.

The inputs 604 are provided to a data source creator, which at 608, provides control information to control the data source creation process. The control information comprises data that is used to guide the creation of the data source, including any parameters corresponding to identification of the underlying data and any required transformations for the resultant data source.

At 610, a selection is made of the specific method for creating the data source. For example, to create an active data source, a decision can be made to select creation of a physical standby, snapshot standby, or a test master. To create a passive data source, a decision can be made to create, for example, a backup, snapshot, or a data dump.

At 612, a data source transformer may perform transformations upon the created data source. Numerous types of transformations may be performed on the data. Example transformations include (but are not limited to): (a) topology (e.g., to transform from a topology that includes disaster recovery to one having no disaster recovery); (b) configurations (e.g., to transform configurations settings for database size); (c) masking (e.g., to remove sensitive information from the data such as names, addresses, salaries, social security numbers, etc.); (d) post-processing transformations; (e) binary (e.g., transform a binary to include new patches).

At 614, a data source version manager may be used to manage and control the different versions of the data sources. This is performed because, over time, there may be any number of different versions of data as changes occur to the data sources. By tracking the different version of the data, this allows the system to establish (a) active windows for managing the availability of the data source; and (b) track usage of expired source versions.

At 616, the process outputs a set of one or more data sources. In a database context, these data sources are sources of data from the production DB data for which cloning may be desired. As noted above, the data sources may be classified as "active" data sources and "passive" data sources. The data source may be placed onto any computer readable medium for access to create a clone. In some embodiments, the data source may be placed into a cloud-based storage system, where a user accesses the data source in a logical storage structure that is implemented using a remote network-based and/or distributed storage system. In some embodiments, the data source may be provided as a "service" in a SaaS ("Software as a Service") platform, where the user consumes resources in the SaaS system on a platform that is shared with other users/entities/organizations.

Figure 7:
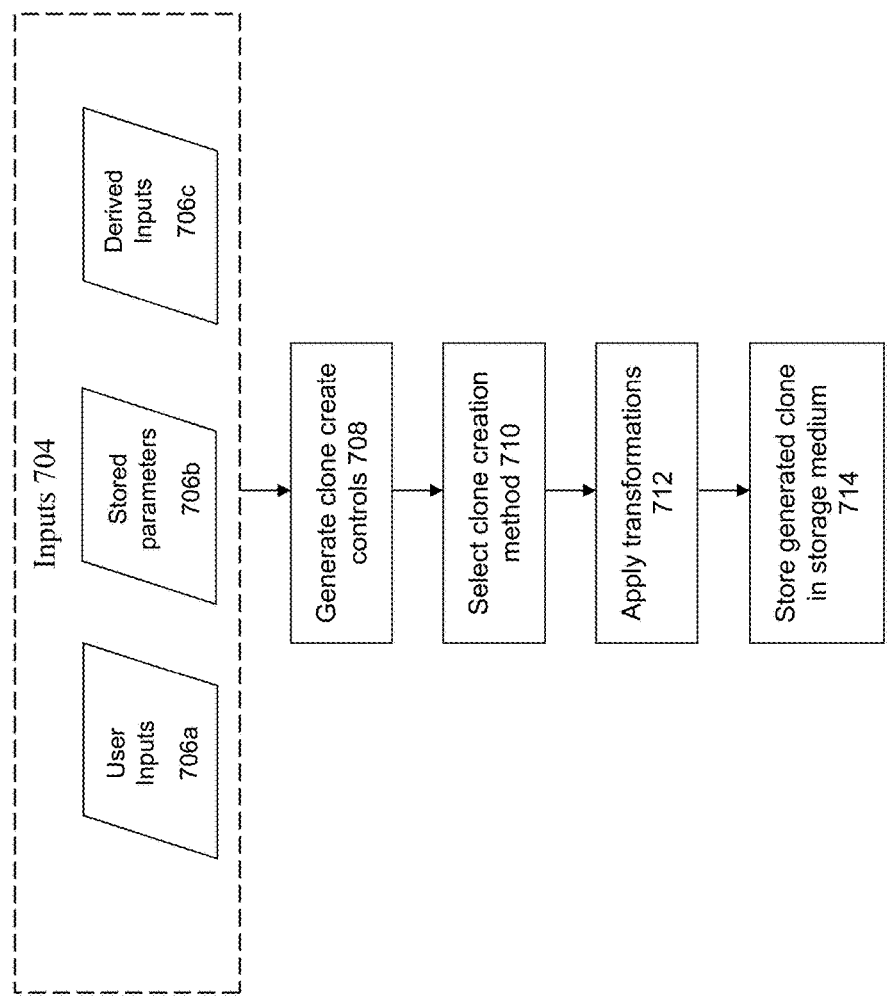
FIG. 7 shows an example approach to create clones according to some embodiments of the invention.

FIG. 7 shows an example approach to create clones according to some embodiments of the invention. Inputs 704 may be provided for the clone creation process. These inputs are similar to those identified for the data source creation process, and includes user configuration inputs 706a. This type of input pertains to data that is specifically identified, created, or provided by the user, such as for example, user selection/identification of a data source for creation of the clone. Stored parameters 706b comprise any set of parameters that are maintained in the system for creation of the clone, such as for example, policy-based parameters or stored user preferences. Policies are described in more detail below. In addition, derived inputs 706c may be employed, which are parameters for the data source creation processed that are derived by the system. This type of information is derived and/or calculated by the system, rather than being explicitly provided. Such derived information may include data about the type of systems/data, compatibilities and incompatibilities, etc.

There are numerous types of inputs/configuration parameters that may be provided to control the clone creation process. For example, a specific time period may be established for the clone. This permits the clone to be created as of a given point in time, the latest point in time, or as of a prior point in time. As another example, the configuration settings may include information that identifies the intended topology for the clone, e.g., a clustered topology or a non-clustered topology. Another possible configuration setting is to establish the specific configuration of the system or the clone, including for example, configuration information about the file system, processes (e.g., listener processes), or the hardware. The database size may also be configured, e.g., with respect to CPU, memory, processes, and storage. Post-processing activities may also be defined, e.g., regarding processing of scripts or SQL (structured query language) code. Inline updates may be established, e.g., regarding patches or patchsets. Management setup may also be configured, e.g., to establish target properties for the clone. At 708, these inputs are provided as controls to a clone creator module.

At 710, control information is generated to perform selection of a specific clone creation method. For example, a selection can be made to create either a thin clone or a full clone, where the full clone is a clone having a full copy of the data from its source. Example of full clones include, for example, data dumps or system backups, e.g., from a recovery manager tool. A thin clone is a type of clone where it is referentially tied to its source data. The thin clones may be implemented, for example, as snapshots or by using underlying DB clone mechanisms. In some embodiments, the selection of the cloning techniques can be automatically performed based at least in part on an architecture of a source database system and/or inputs and/or stored preferences.

At 712, transformations may be performed upon the data for the clone. Example transformations include (but are not limited to): (a) topology (e.g., to transform from a topology that includes disaster recovery to one having no disaster recovery); (b) configurations (e.g., to transform configurations settings for database size); (c) masking (e.g., to remove sensitive information from the data such as names, addresses, salaries, social security numbers, etc.); (d) post-processing transformations; (e) binary (e.g., to transform the binary to include new patches); (f) subsetting (e.g., to retain only a portion of the source data).

At 714, the process outputs a set of one or more clones onto a computer readable medium. In some embodiments, the clone may be placed into a cloud-based storage system, where a user accesses the data source in a logical storage structure that is implemented using a remote network-based and/or distributed storage system. In some embodiments, the clone may be provided as a service in a SaaS platform, where the user consumes resources in the SaaS system on a platform that is shared with other users/entities/organizations.

Figure 8:
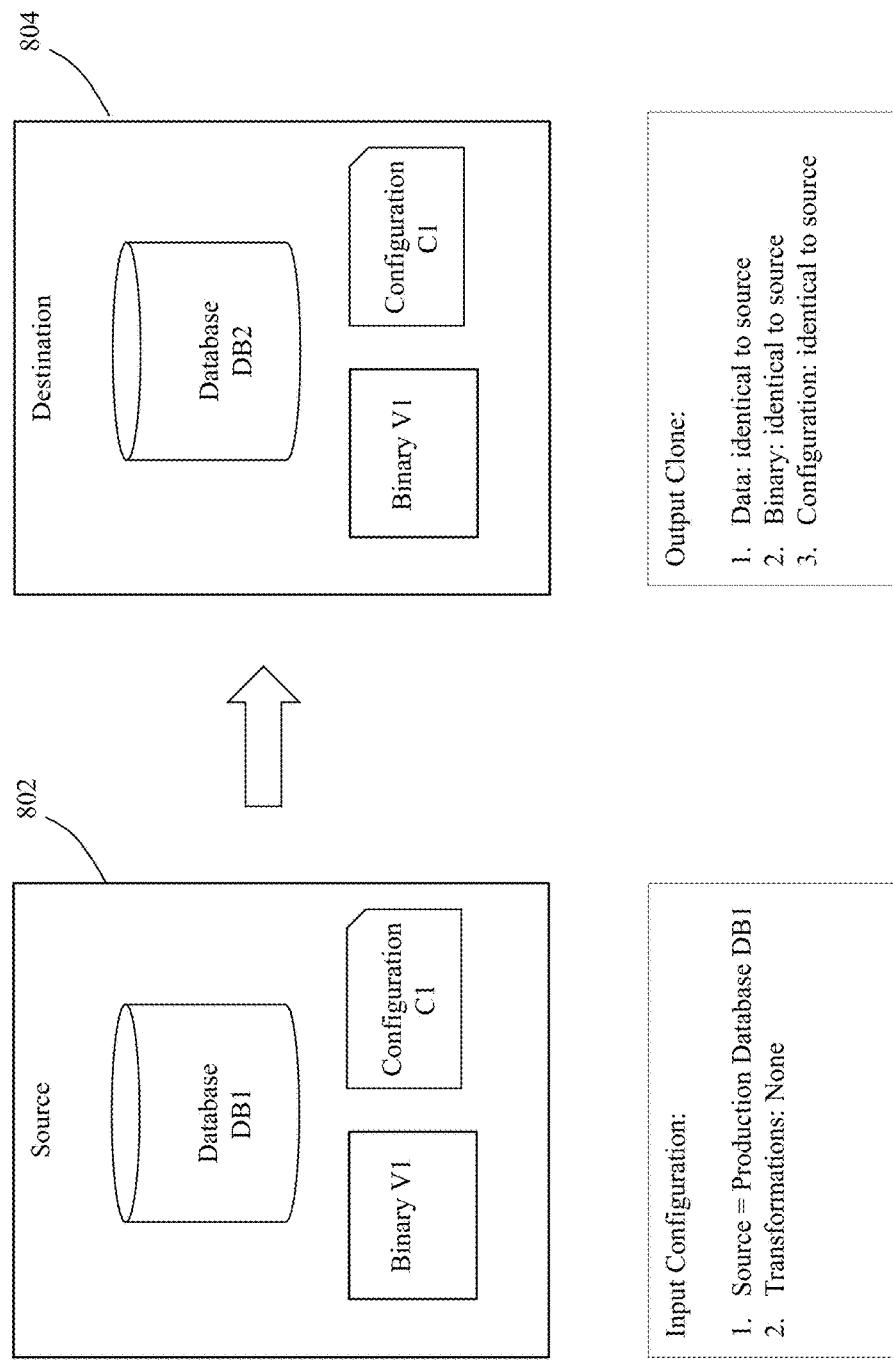
FIG. 8 shows a use case involving a full identical clone.

FIGS. 8-16 illustrate some example use cases for the DB clones. FIG. 8 shows a first use case involving a full identical clone. Here, the input configuration settings identify the source as the production database DB1 and no transformations to be applied to the data during cloning. As a result, the clone 804 is identical to the source 802.

Figure 9:
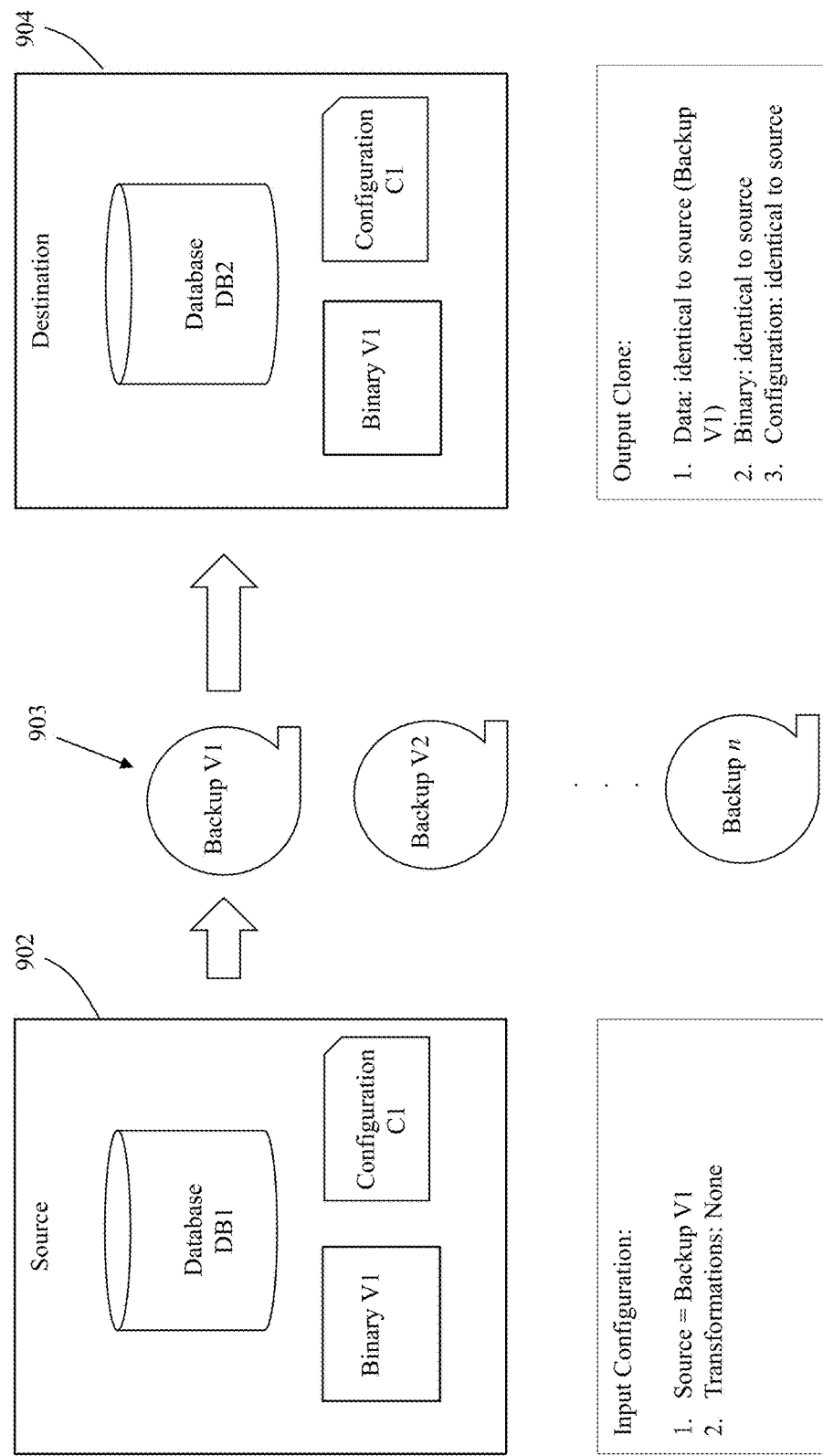
FIG. 9 shows an example use case involving a clone that uses an existing backup, instead of the production data as the underlying source.

FIG. 9 shows an example use case involving a clone 904 that uses an existing backup 903, instead of the production data 902 as the underlying source. This use case is often implemented to perform stage/load testing, and may be implemented with duplicate/restore using a backup/restoration tool. It is noted that since there are different versions of the backups that may be selected, additional management configurations may be imposed to track versioning of the backups, and/or to make sure that older versions are properly managed according to any aging policies established for the different versions.

Figure 10:
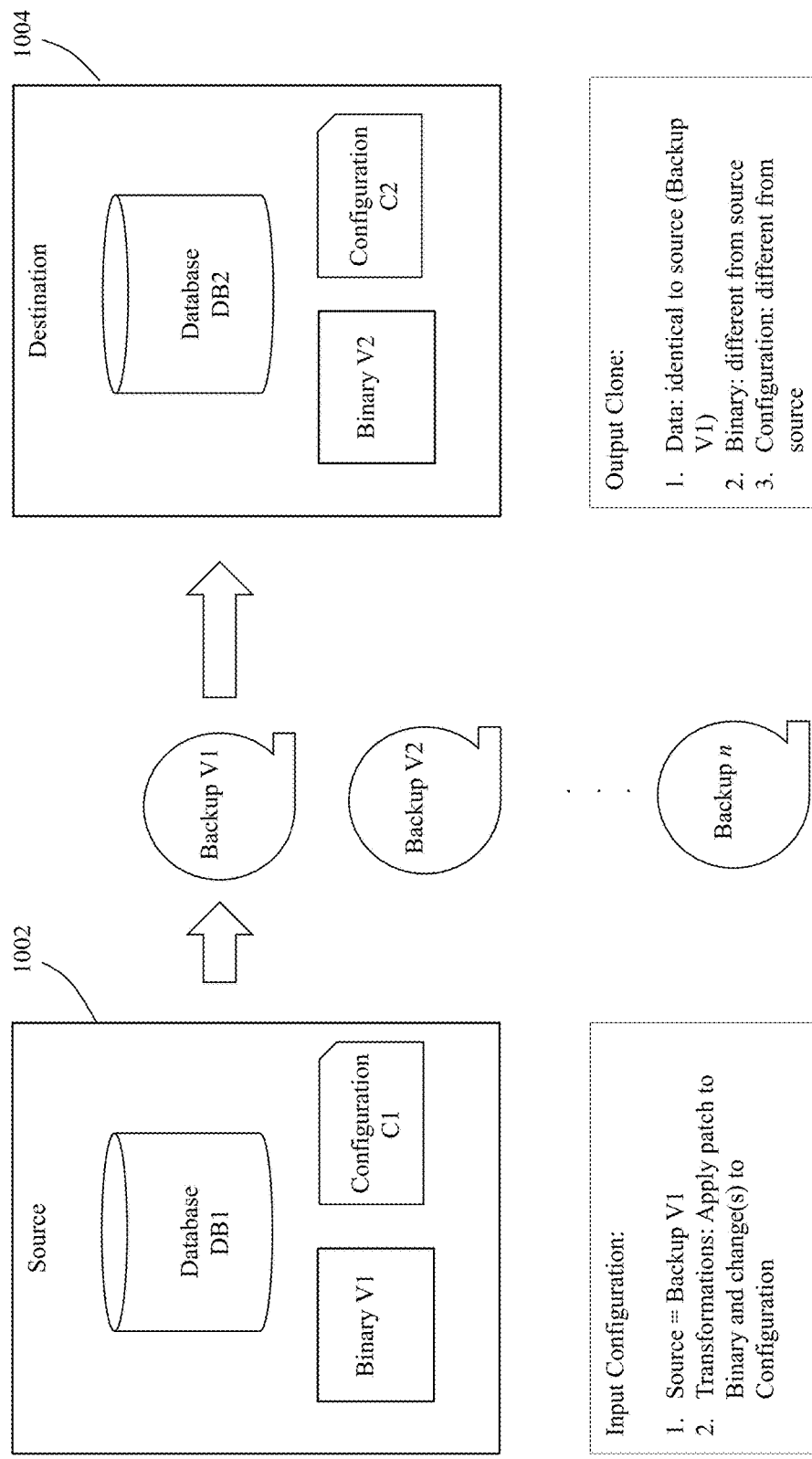
FIG. 10 shows a use case involving a clone that uses a different binary/configuration from its source.

FIG. 10 shows a third use case involving a clone that uses a different binary/configuration from its source. Here, the input settings identify transformations to be applied to both the binary and configuration settings during cloning. Therefore, during the cloning process, a patch may be applied to the binary and/or other changes made to the configuration setting of the clone 1004 so that they are different from the binary and configuration settings of the source 1002. This use case is often useful for "change" testing with a full load (e.g., for new fixes and new configurations).

Figure 11:
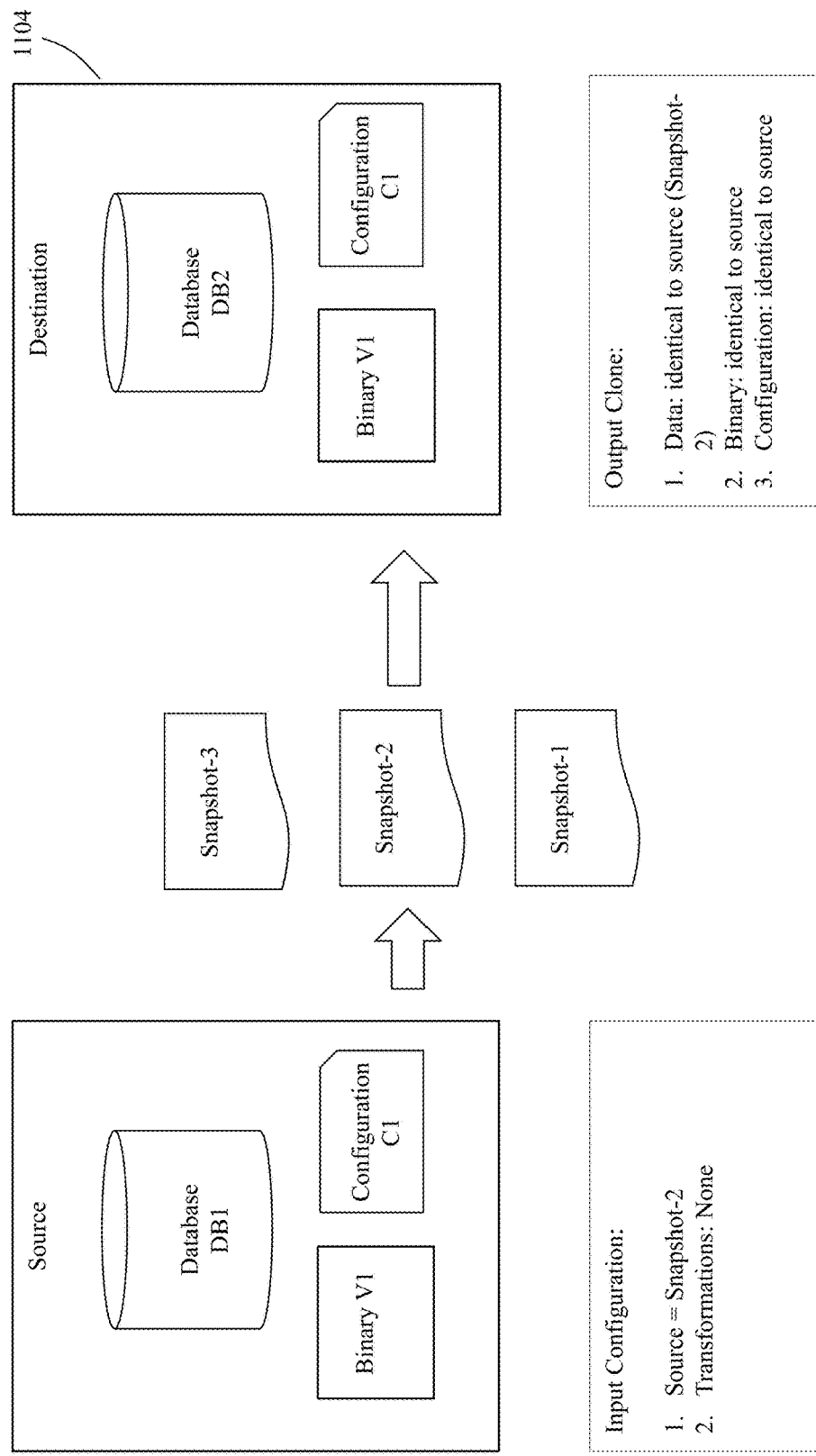
FIGS. 11 and 12 show situations involving the use of snapshots as the source for cloning.
Figure 12:
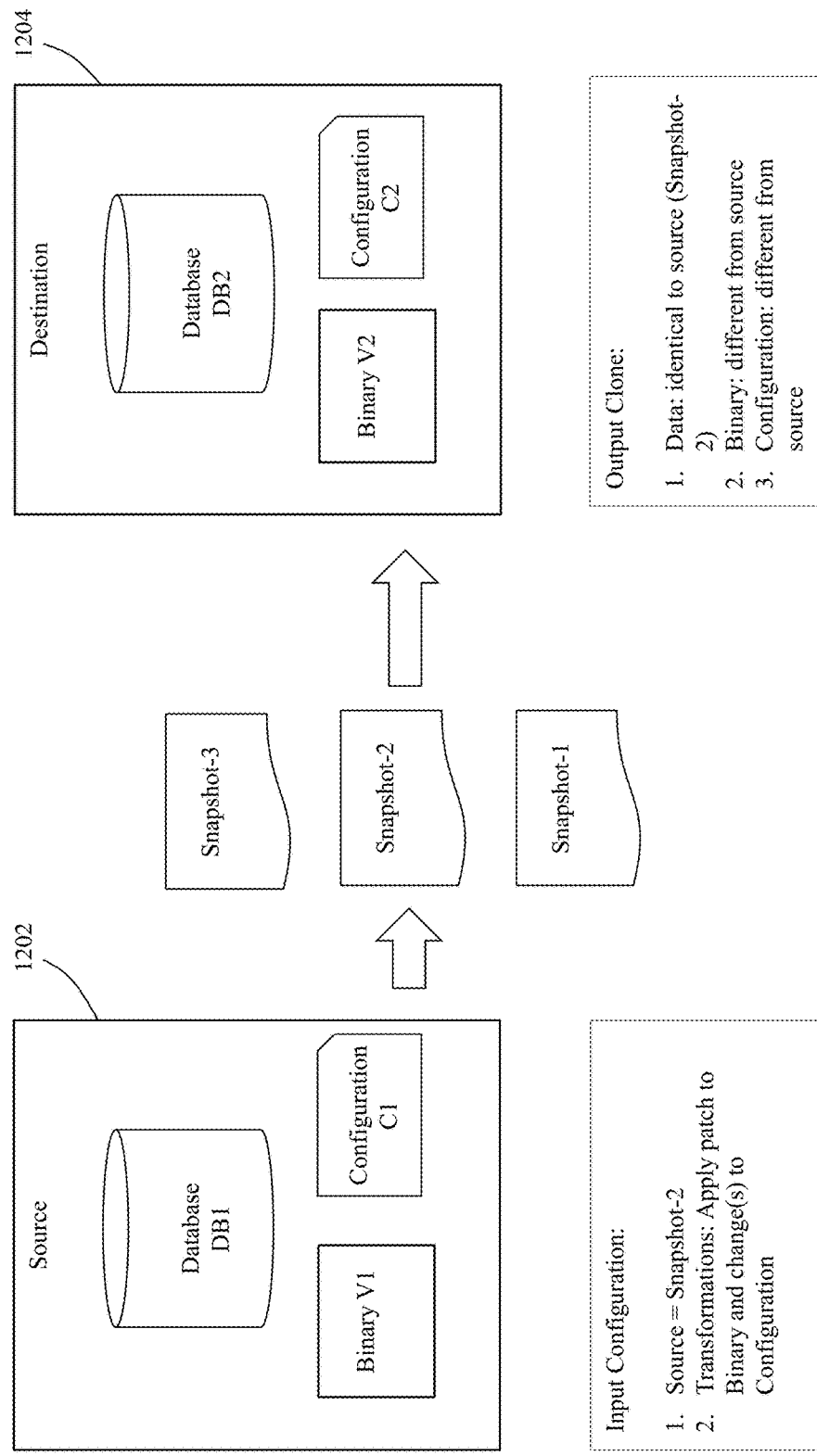

FIGS. 11 and 12 show situations involving the use of snapshots as the source for cloning. In the example of FIG. 11, the input settings identify the source as snapshot-2 and for no transformations to be applied during cloning. As a result, the clone 1104 is identical to the source snapshot and the binary and configuration settings are also identical. In the example of FIG. 12, the input settings also identify the source as snapshot-2. However, this example also specifies transformations to be applied to both the binary and configuration settings during cloning. Therefore, during the cloning process, a patch may be applied such that the binary and configuration setting of the clone 1204 are different from the binary and configuration settings of the source 1202. This use case is often implemented for change testing with a full load.

Figure 13:
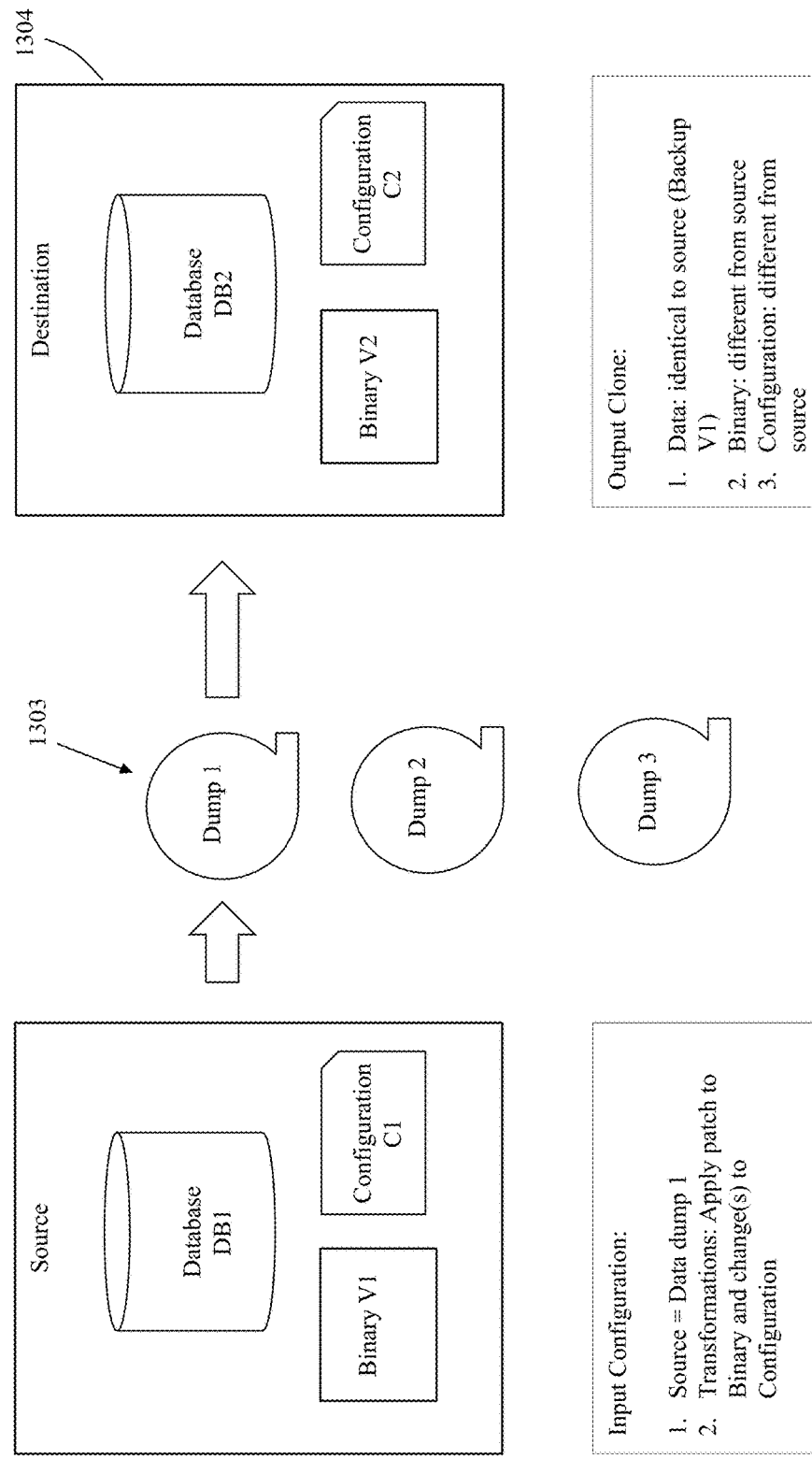
FIG. 13 shows a use case involving a clone using a data dump.

FIG. 13 shows a use case involving a clone using a data dump. Here, the clone 1304 is created using the data dump 1303 as the source. In some cases, the clone may be on a completely different platform from the source. Therefore, this use case is often useful for cross platform migration testing.

Figure 14:
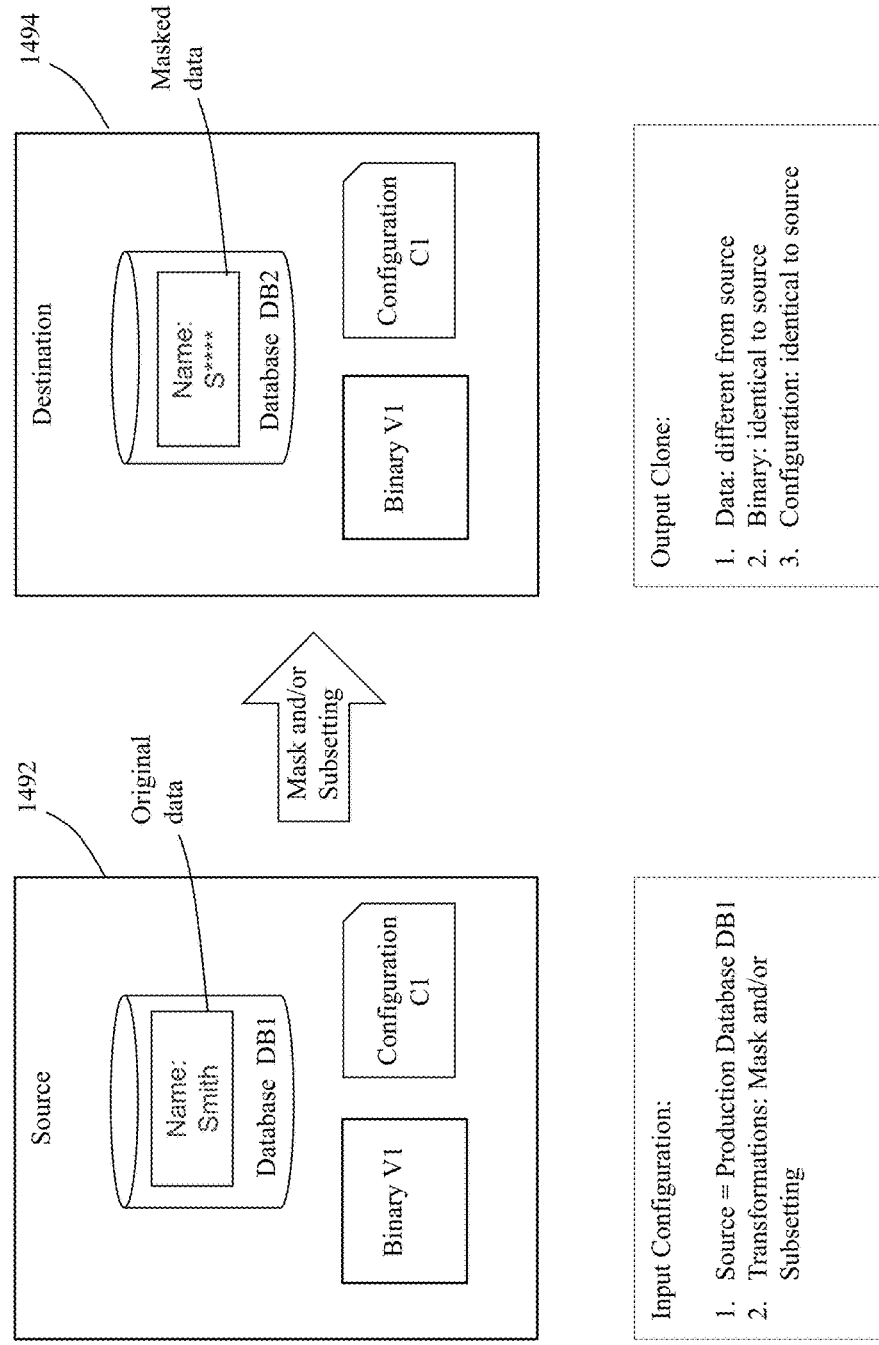
FIG. 14 shows a use case involving a clone using a backup having masking applied to the data.

FIG. 14 shows a use case involving a clone using a backup having masking and/or subsetting applied to the data. The idea behind masking is that production data often contains information that is subject to strict privacy protections. As such, that data should be masked (or sanitized) before being placed into a clone that may be accessed by those who are not normally permitted to view the sensitive data. For example, real names, addresses, and social security data in a production database may be masked (e.g., using a one-way hash to obscure the real data) so that only non-sensitive data appears in the clone. This is one step that is often taken to generate a test master. In FIG. 14, the input settings specify that a transformation involving masking is to be applied to the source data. In some cases, the specific fields for which masking is to be applied may be designated in the input settings. Therefore, the clone 1494 will include masked data that is different from its underlying source 1492. This use case is often useful for non-production testing and/or development.

Another possible transformation that may be performed in addition to (or instead of) masking is subsetting. Users may want a clone of the system with a smaller representation of data. For example, the production may have a 5 TB of data. A development environment that is set up to make a change to the application may require only a smaller representative set of that data. In this case, subsetting is performed to obtain only a portion of the original data. It is noted, however, however, that subsetting may not be appropriate in certain situations. For example, subsetting data for thin clones may not be appropriate, because the act of subsetting will result in loss of storage savings since the deletes are recorded in clone. In such cases, the users can create a subsetted copy of production as a testmaster, and then generate a thin clone from the test master.

Figure 15:
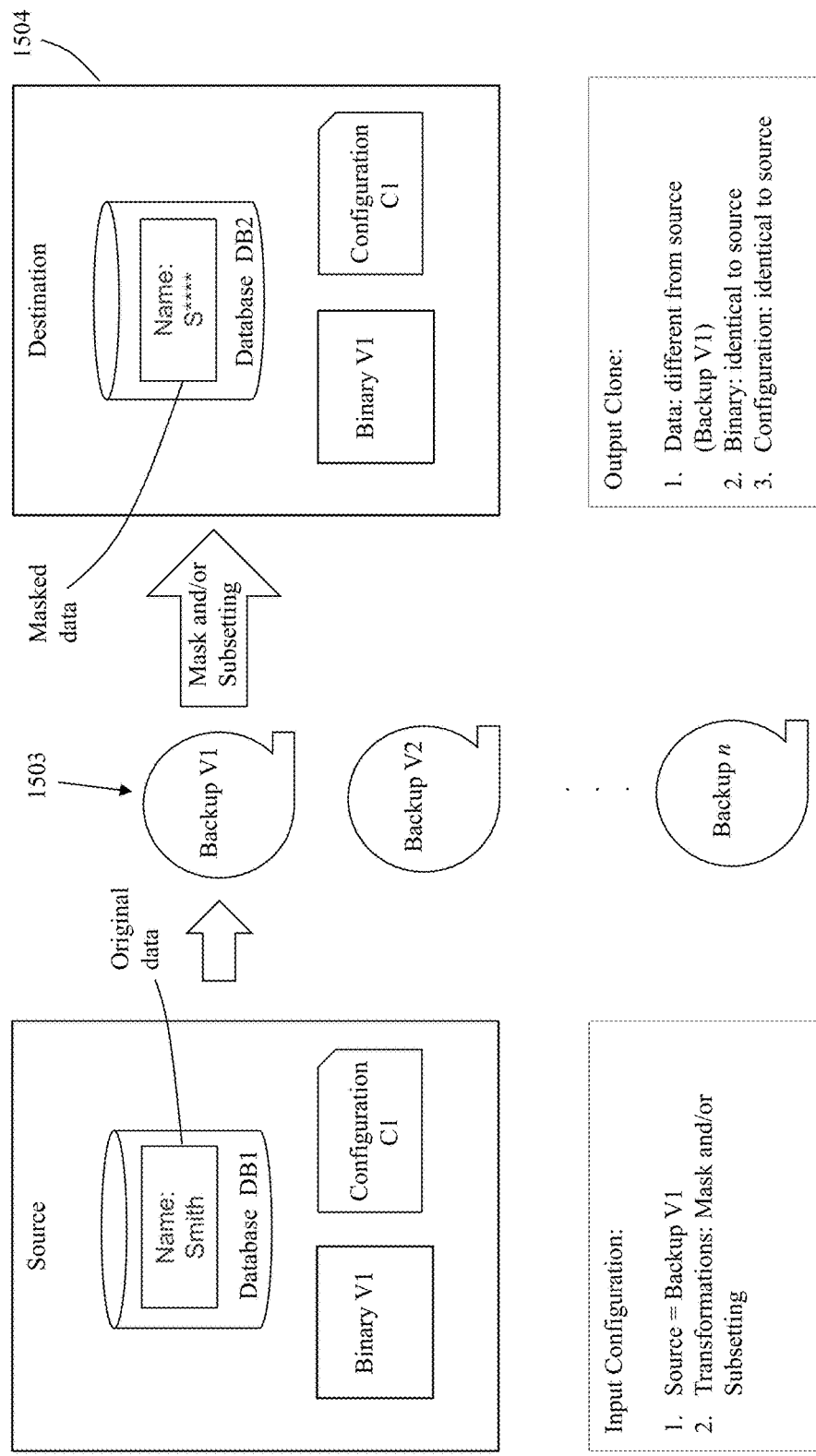
FIG. 15 shows another use case involving a clone having masking applied to the data, where an existing backup is used.

FIG. 15 shows another use case involving a clone having masking applied to the data, where an existing backup is used. Here, the existing backup 1503 may be restored and masked to create the clone 1504. This use case is often useful for non-production testing and/or development.

Figure 16:
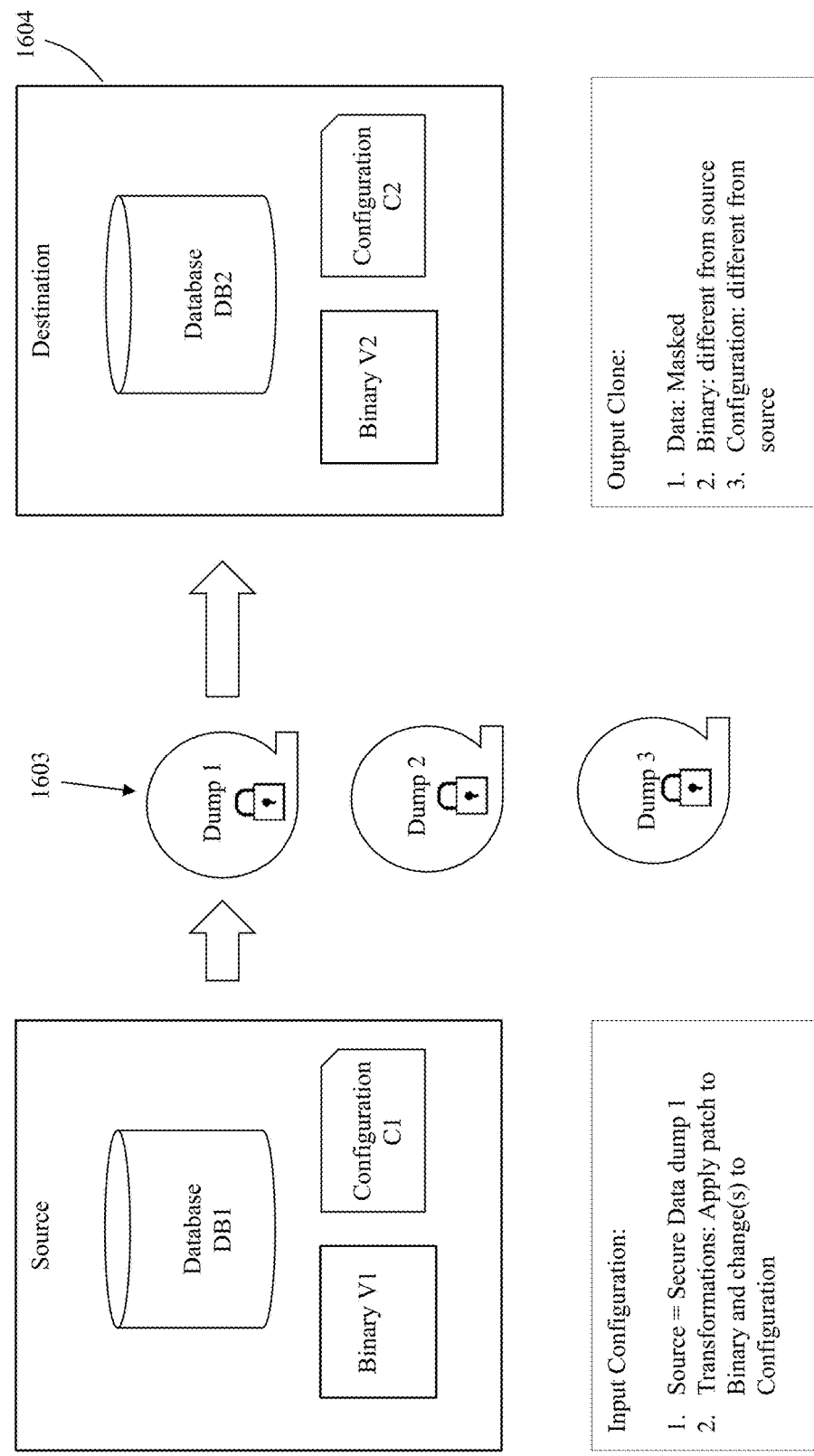
FIG. 16 shows a use case involving cloning from a secure dump.

FIG. 16 shows yet another use case involving cloning, this time from a secure dump 1603. A secure dump contains data that has already been secured, e.g., where the data in the secure dump is already sanitized relative to its source. Therefore, even if the clone is to be used for testing, this situation may not require any masking to maintain privacy of the original underlying data. As such, masking may not necessarily need to be applied to generate a clone 1604 from the secure dump 1603. This use case is often useful for testing and/or development teams.

As previously noted, different versions of sources and clones may exist over time. This is due to the progressive changes that occur to production data, and hence the follow-up changes to the data copies that rely upon that production data. Over time, it is possible that there exists a proliferation of different versions of both sources and clones that need to be managed and cleaned up, especially to make sure that "aged out" data does not continue to proliferate in the system.

Embodiments of the present invention provide management functionalities that can be used to manage active versions of data used for clone or refresh, including auto-expiring old passive data sources, and notifying services of staleness. These sets of functionality can also be used to track and present lineages of versions from production instances to test master instances to services running on the test master instances, and providing automated recommendations based on the tracked lineage.

Figure 17:
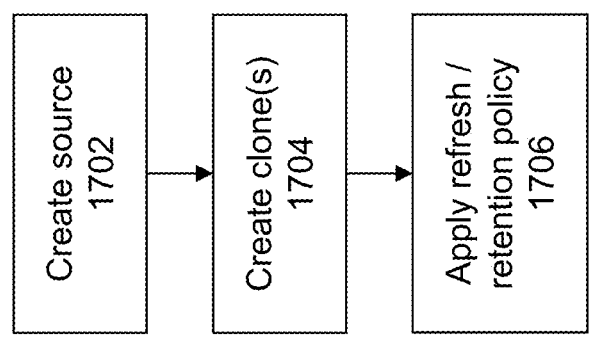
FIG. 17 shows a high level flowchart of an approach to manage different versions of sources and clones in a system.

FIG. 17 shows a high level flowchart of an approach to manage different versions of sources and clones in a system. The process begins at 1702 with the creation of a source. In some embodiments, this source comprises the test master, although the flow is applicable to any type of source. For purposes of illustration, but not by way of limitation, the present explanation will illustratively refer to test masters as the source.

At 1704, one or more clones will be created. The one or more clones will be created from a specific version of the source (e.g., test master). It is noted, however, that over time there will be additional sources that are created which are more up-to-date than the source that was used to create the one or more clones.

At 1706, one or more refresh/retention policies may be applied for the clone-related data within the system. Refresh operations may be performed to ensure that the proper set of data is being used for the data sources and/or clones. Retention policies may be applied to determine whether and/or when data can be removed from the system. These policies can be applied to move a source to more recent versions (e.g., to manage snapshots, backups, and/or dumps). This approach can be used to manage active versions of data that can be used for clone or refresh (e.g., by implementing a designated active item window for sources/clones), including optionally auto-expiring old passive data sources, and/or notifying services of staleness. For example, this process can be applied to manage old data source (e.g., passive data sources that are snapshots or backups) for which a threshold amount of time has passed since the snapshots or backups were available for generating new clones and/or representing latest available versions of passive data (i.e., data that is not live in production). In addition, this process can be performed to make sure that the test master is refreshed (e.g., periodic/discrete or continuous), and possibly to perform a refresh of a gold copy. Moreover, this permits test instances (e.g., service/clone) to be refreshed.

Notifications can be provided when source/clones are due to expire. For example, escalating notifications, with optionally specifying escalating consequences, can be provided for increasingly stale passive data sources.

In some embodiments, the clone maintenance operations perform in-place replacement of cloned database with services configured to run on top, including preservation of connections and other information. This approach can be used to preserve functionality of services that depend on old passive data sources, and managing retention and purge policies and actions for the old passive data sources. In some embodiments, this process is initiated based at least in part on service templates that do not need to change (service templates are described in more detail below).

It is noted that a refresh operation may be applied to any situation as necessary or desired within embodiments of the invention, and is therefore not limited in its application only to circumstances to involving a delete operation or an operation to create a new object.

The present approach can be used to track and/or present lineage of versions of the source/clone data, e.g., from production instances to test master instances to services running on the test master instances. In some embodiments, automated recommendations and/or actions can be taken based at least in part on tracking the lineages.

Figure 18:
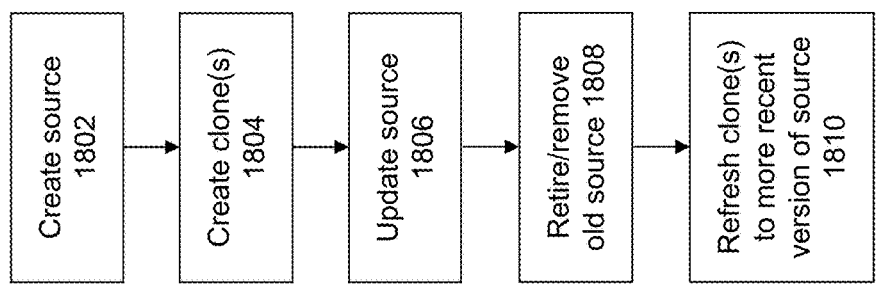
FIG. 18 shows a specific flow that may be applied in certain circumstances to manage clones.

FIG. 18 shows a specific flow that may be applied in certain circumstances. At 1802, the source is created, e.g., a test master. At 1804, one or more clones are created from the test master. At some point later, at 1806, the source is updated, e.g., when a new version of the test master is created.

At 1808, the old test master is then removed and/or retired. In some circumstances, the test master cannot be immediately removed because there may be some dependencies that still exist for the test master. Therefore, instead of removing the old test master, it is retired so that it still exists, but no further clones are permitted to be created from that old test master. The old test master is kept in a retired state until the dependencies have been removed (e.g., when its dependent clones have been deleted and/or refreshed to a newer test master), and only deleted when dependencies have been removed.

At 1810, the clones that have been created from the old test master can be refreshed (and/or deleted). In some embodiments, a user is given a certain amount of time by policy to migrate a clone to a newer version of a source. If the migration/refresh does not occur within a threshold time period, then the system will automatically refresh the clone to a new version.

Figure 19B:
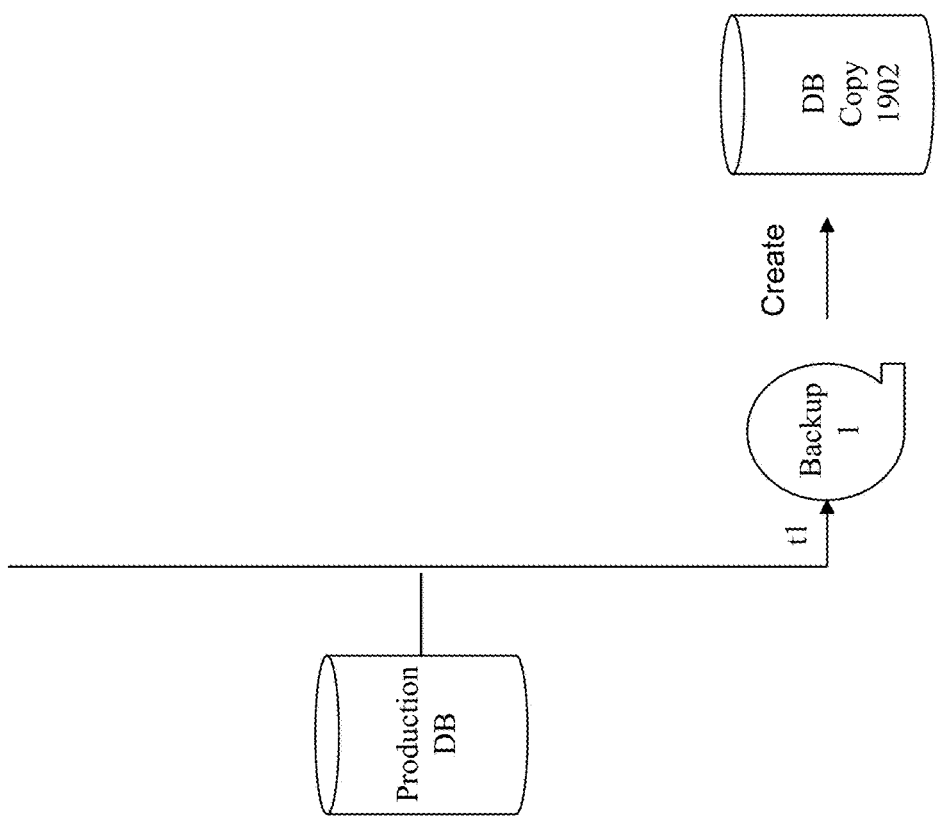
Figure 19C:
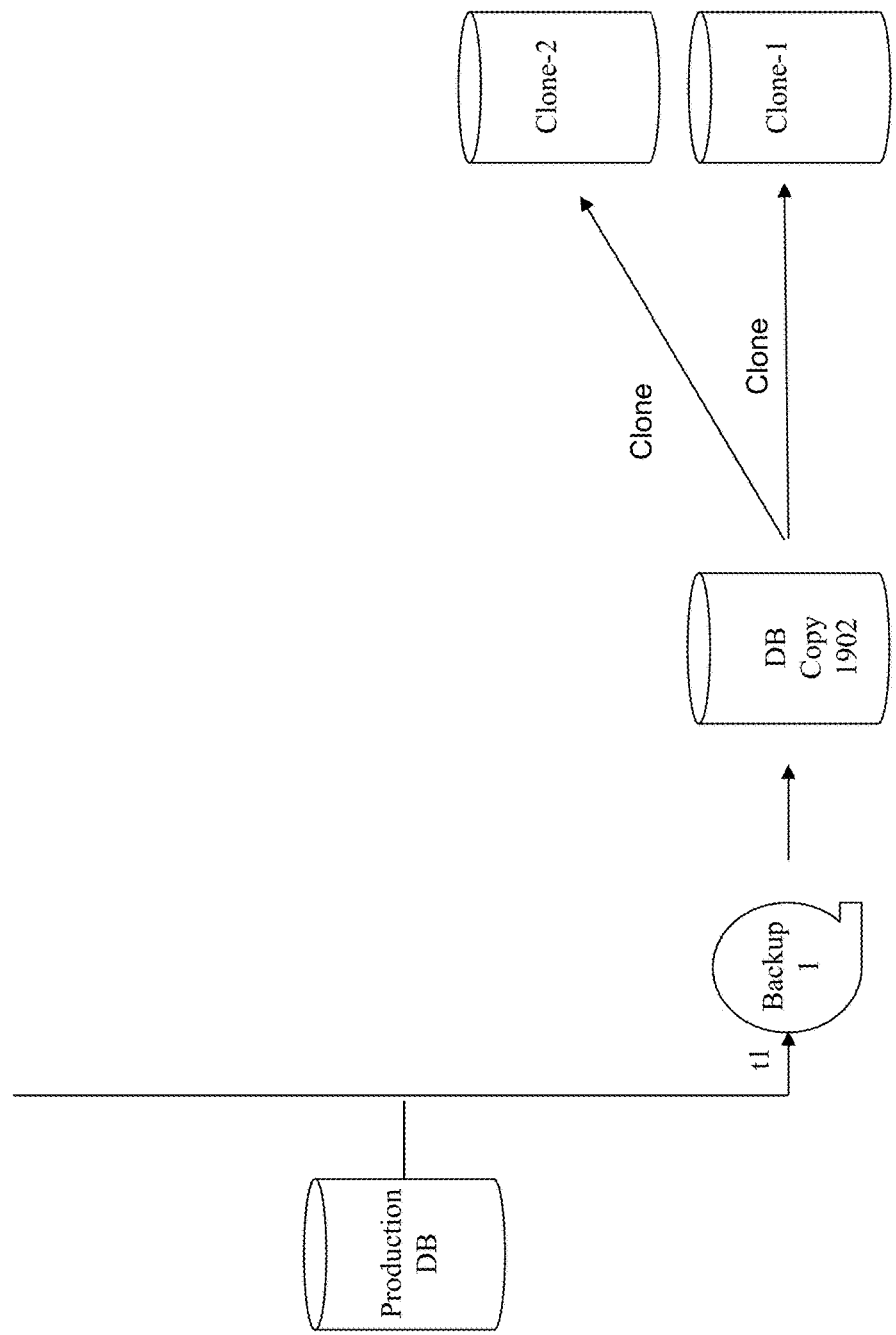
Figure 19D:
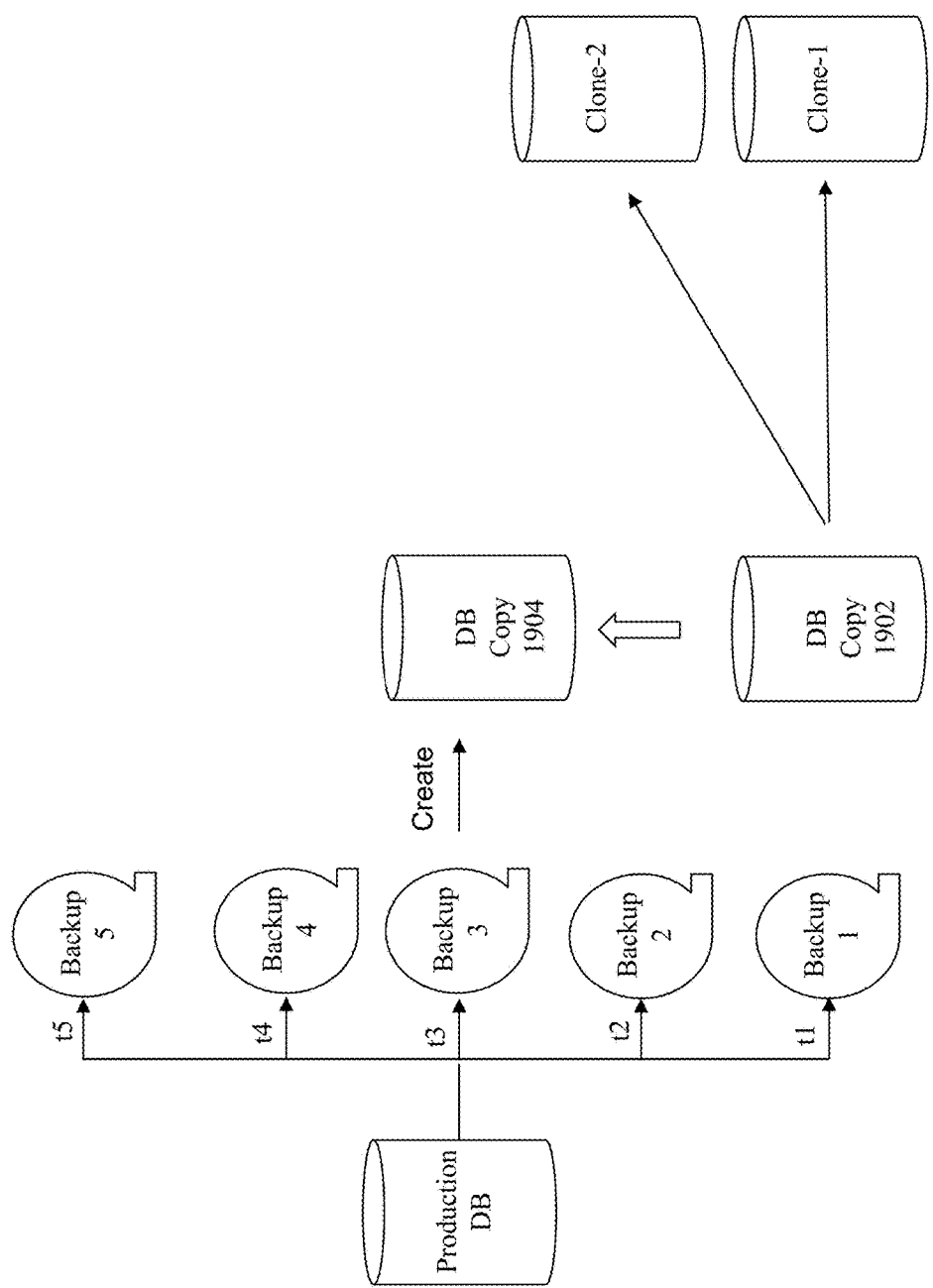

FIGS. 19A-G illustrate this process. These figures illustrate an example environment where the DB source corresponds to multiple backups, and a test master DB was created from the backup at time T1. FIG. 19A illustrates a production database for which a backup (Backup 1) has been created from that database. Backup-1 was created at time t1. As shown in FIG. 19B, a test master 1902 is created from the Backup 1. As shown in FIG. 19C, clones Clone-1 and Clone-2 are created from the test master 1902.

Over the course of time, additional backups are created from the production database. In particular, at time t3, another backup (Backup 3) is created from the production database.

At some point, the test master DB 1902 created from the backup at time T1 may be considered too old/stale, and therefore needs to be refreshed. At this point, a new test master DB 1904 may be created, e.g., from the backup (Backup 3) from time T3.

Figure 19E:
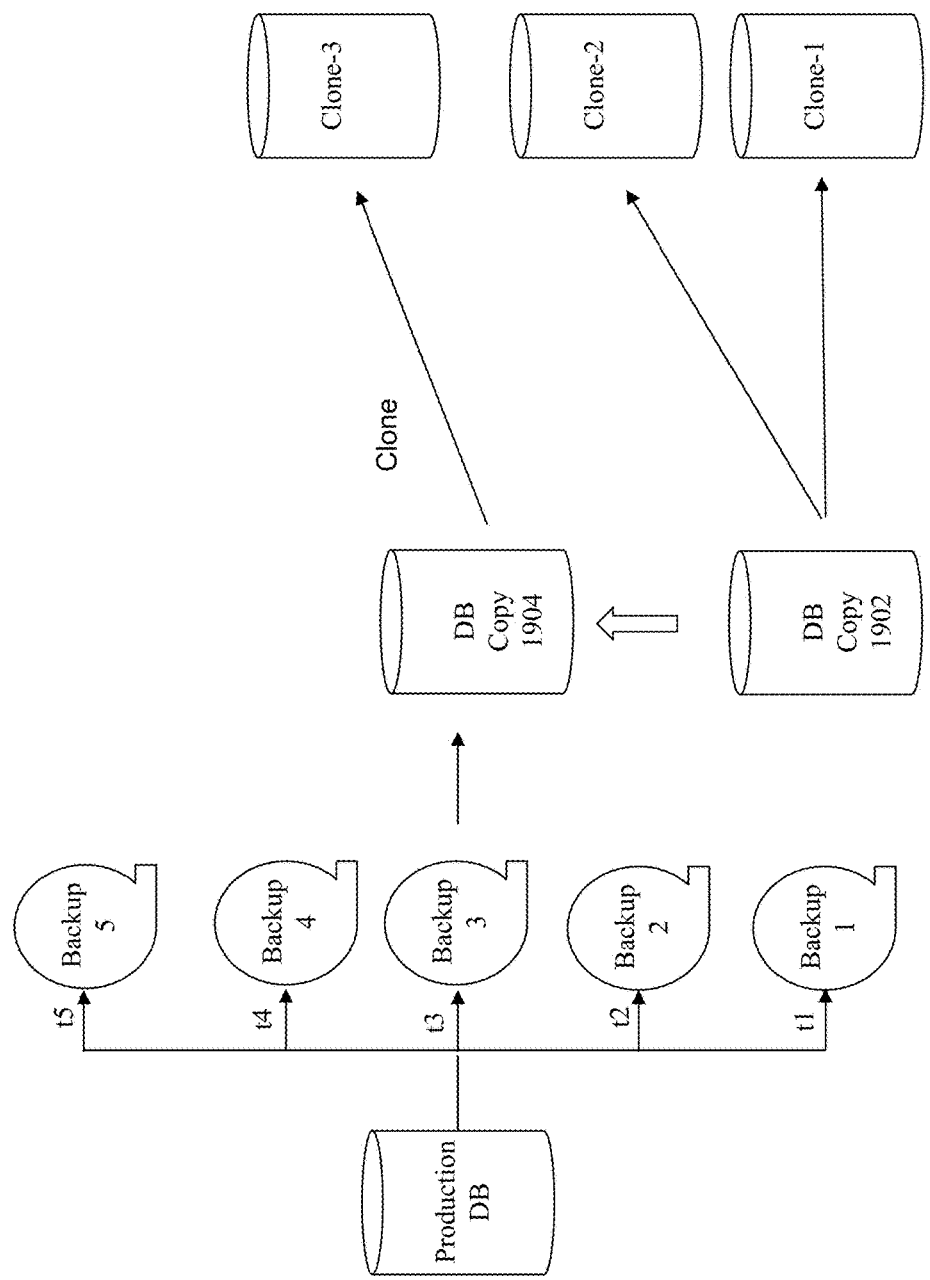

At this point, the old test master 1902 should not be used anymore to create clones. In this situation, any new clones would be created from the latest test master DB (whose source is the backup from time T3). Therefore, as shown in FIG. 19E, the new test master 1904 is used to create a new clone Clone-3. It is noted that in some embodiments, if the data source is active, then clones will be created from the latest data source. If the data source is passive, the clone can be created from any active version of data—which can be determined by policy.

However, the pre-existing clones (Clone-1 and Clone-2) would still be associated with the old test master DB 1902 that corresponds to time T1. These pre-existing clones will continue to access the old test master DB until a change is required or desired. For example, the system retention policy may require the old data sources that are stale to be deleted, thus forcing the clones to refresh to a new version. Alternatively, the user associated with the pre-existing clones may simply desire to refresh to the latest/later version of the test master DB.

Figure 19F:
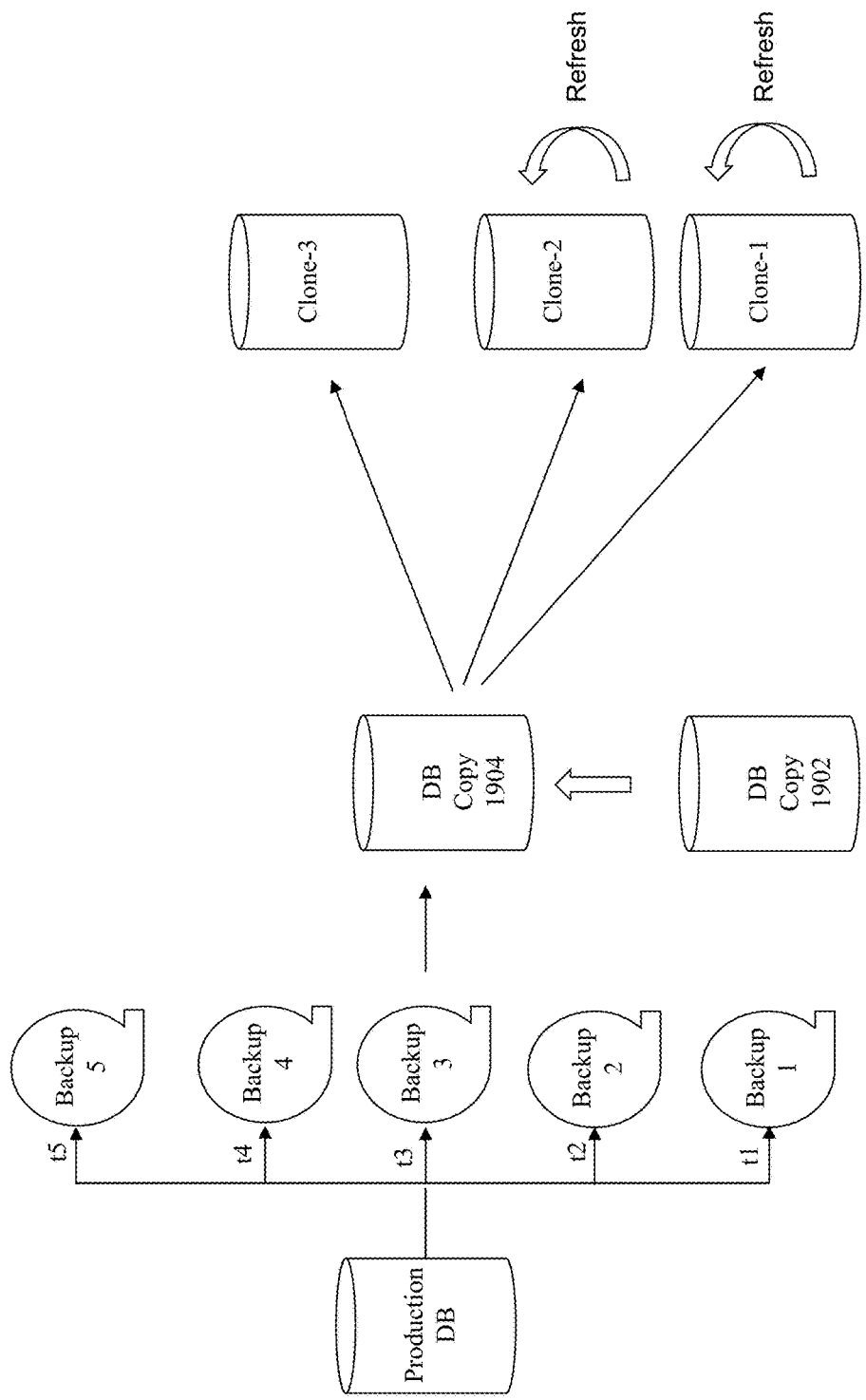

In this situation, a refresh operation would be performed upon the pre-existing clones so that they would now be associated with the latest/later version of the test master DB 1904 (e.g., the one associated with the backup at time T3). As shown in FIG. 19F, the pre-existing clones Clone-1 and Clone-2 are therefore refreshed to the new test master 1904.

One way to implement this refresh operation is to modify the system metadata so that the identification and reference locations that was previously used for the old test master DB is now associated with the new test master DB when a refresh of the data source is performed. In addition, a service template (discussed in more detail below) can be used to implement the refresh of the clones, so that the refreshed clones are associated with the new test master DB.

In this way, in-place replacement of cloned databases can be performed with services configured to run on top. By adjusting the metadata as described above, this approach is accomplished to also include preservation of connections and other information. The services may be initiated based on service templates that do not need to change.

In addition, this approach preserves the functionality of services that depend on old passive data sources (such as old snapshots or backups), and allows for the system to manage retention and purge policies and actions for older versions of data.

Figure 19G:
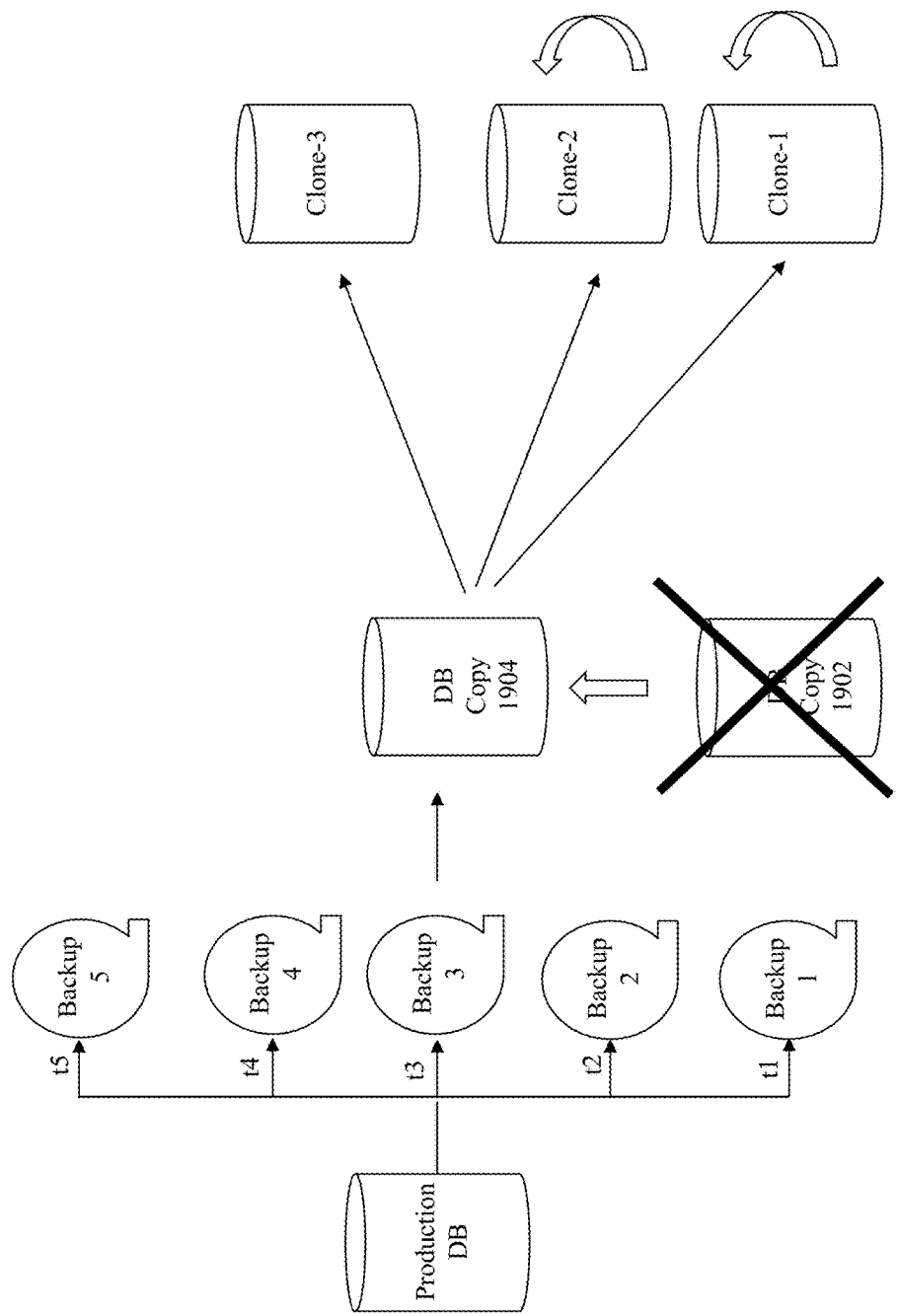

As shown in FIG. 19G, the old test master 1902 may be removed. The timing of the removal of test master 1902 depends upon whether there are any dependencies that need to be resolved. If there were no dependencies, then the removal operation of FIG. 19G could have been performed at any time. As described in more detail below, the timing of this removal is more constrained if there are any existing dependencies.

Figure 20:
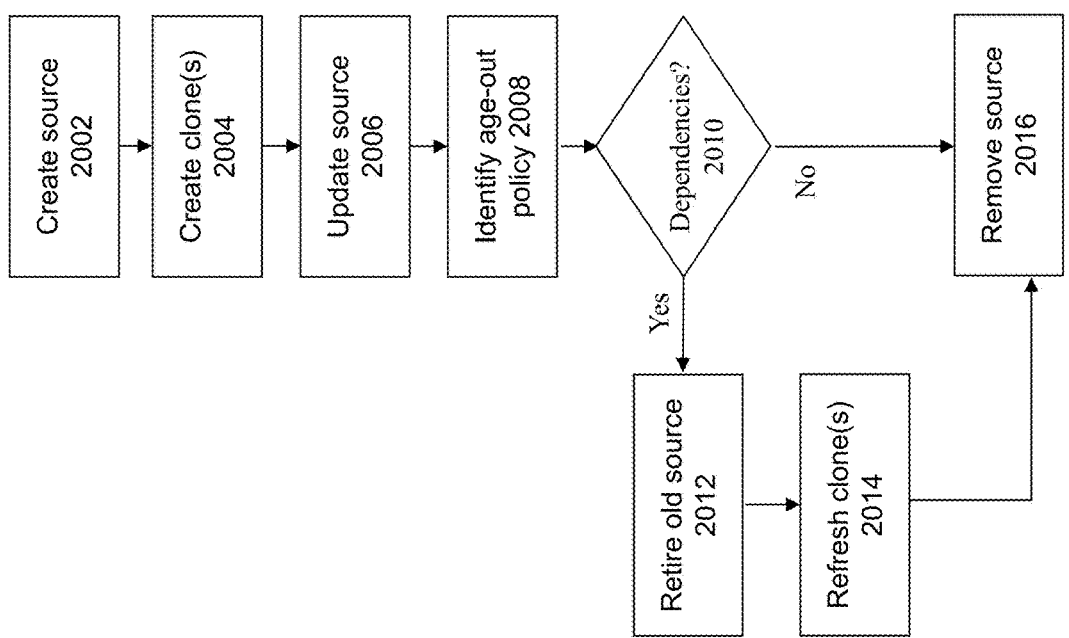
FIG. 20 shows a flow for an approach where clones are created having dependencies upon a source.

FIG. 20 shows a flow for an approach where the clones are created having dependencies upon the old test master, and hence refresh of the clones must occur before removing the old test master.

At 2002, the source is created, e.g., a test master or a snapshot. At 2004, one or more clones are created from the test master. The clones are created having a dependency upon the source. For example, the clone may be created as a thin clone having referential dependencies upon the source. At some point later, at 2006, the source is updated, e.g., when a new version of the test master is created.

At this point, assume that at 2008, an age-out policy has been identified for the source, which dictates the removal of the source. This may occur, for example, if a policy has been established having a specified time window for the existence of the source, and the threshold time limit for that source has occurred for been exceeded.

At 2010, a determination is made whether there exists any dependencies upon the aged-out source. If not, then at 2016, the source can be immediately removed.

However, if there are any dependencies, then the old source is retired at 2012. This change of status means that no further clones can be created from that source. At 2014, the clones that are dependent from the retired source are refreshed to a more recent source. Thereafter, the retired source can be removed at 2016.

Figure 21C:
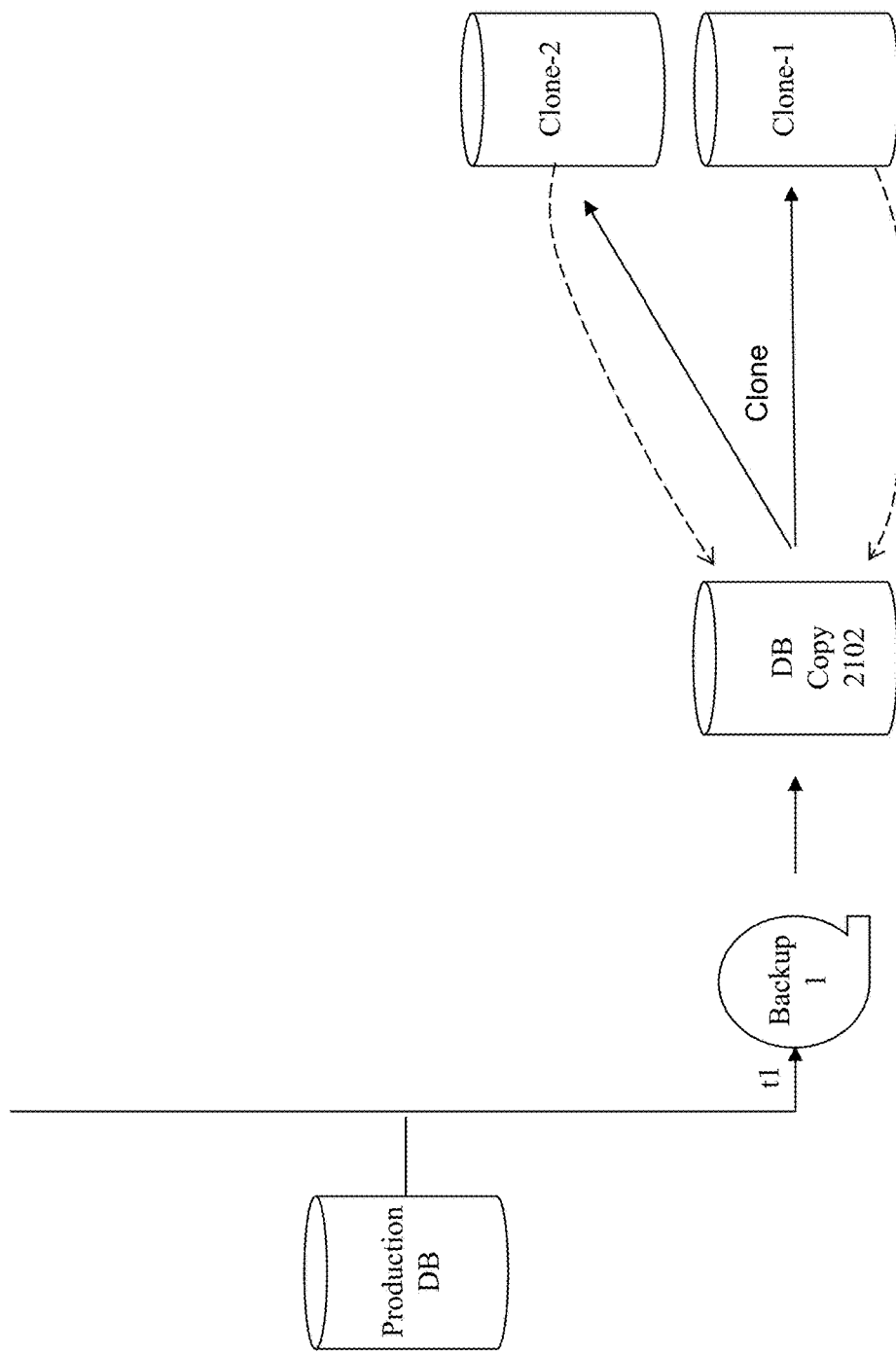

FIGS. 21A-H illustrate this process. FIG. 21A illustrates a production database for which a backup (Backup 1) has been created from that database. Backup-1 was created at time t1. As shown in FIG. 21B, a test master 2102 is created from the Backup 1.

As shown in FIG. 21C, clones Clone-1 and Clone-2 are created from the test master 1902. In this scenario, clones Clone-1 and Clone-2 are thin clones which are referentially dependent upon test master 2102.

Figure 21D:
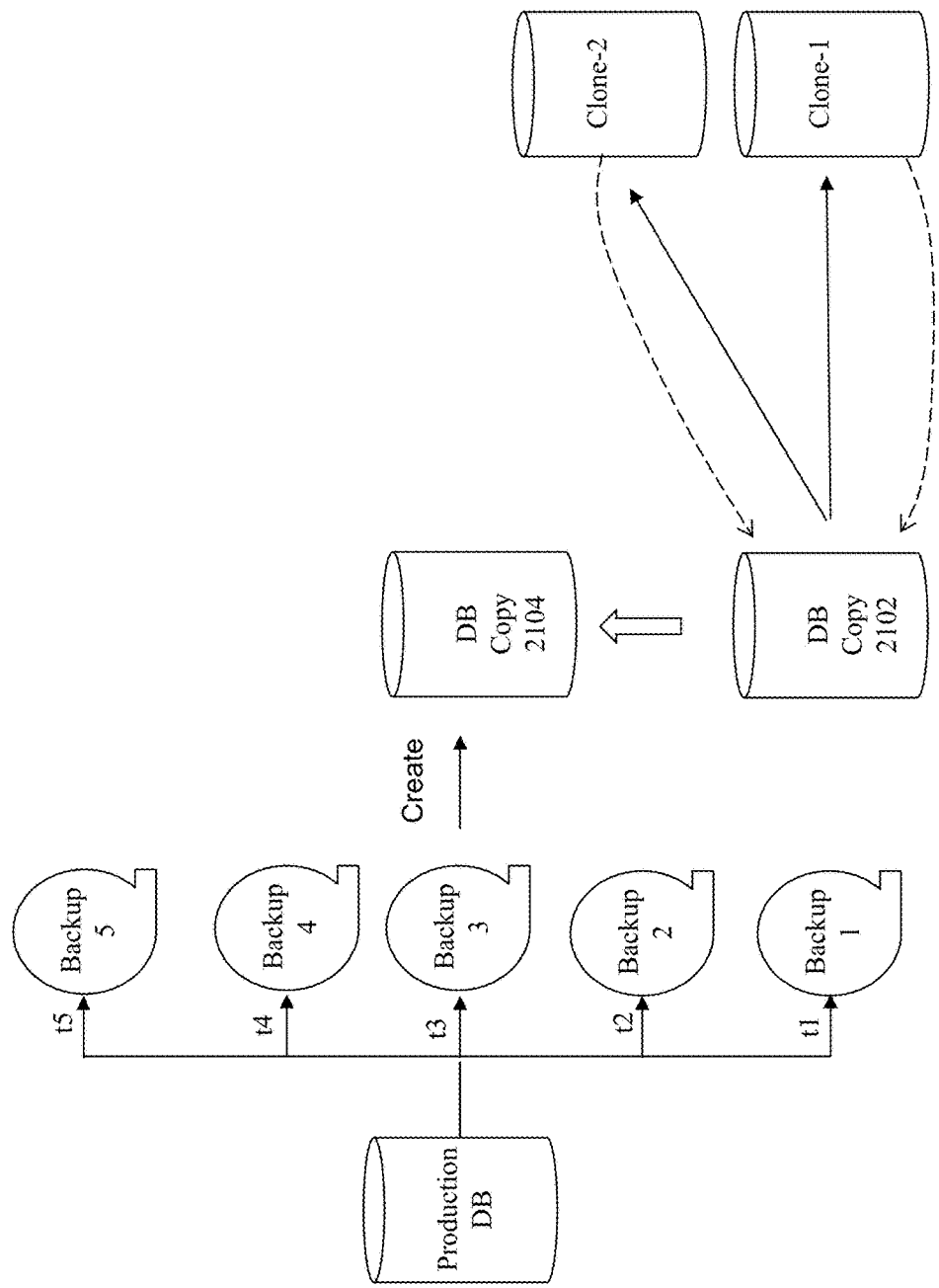

Over the course of time, additional backups are created from the production database. In particular, at time t3, another backup (Backup 3) is created from the production database. At some point in time, the test master DB 2102 created from the backup at time T1 may be considered too old/stale, and therefore needs to be refreshed. At this point, as shown in FIG. 21D, a new test master DB 2104 may be created, e.g., from the backup (Backup 3) from time T3.

Figure 21E:
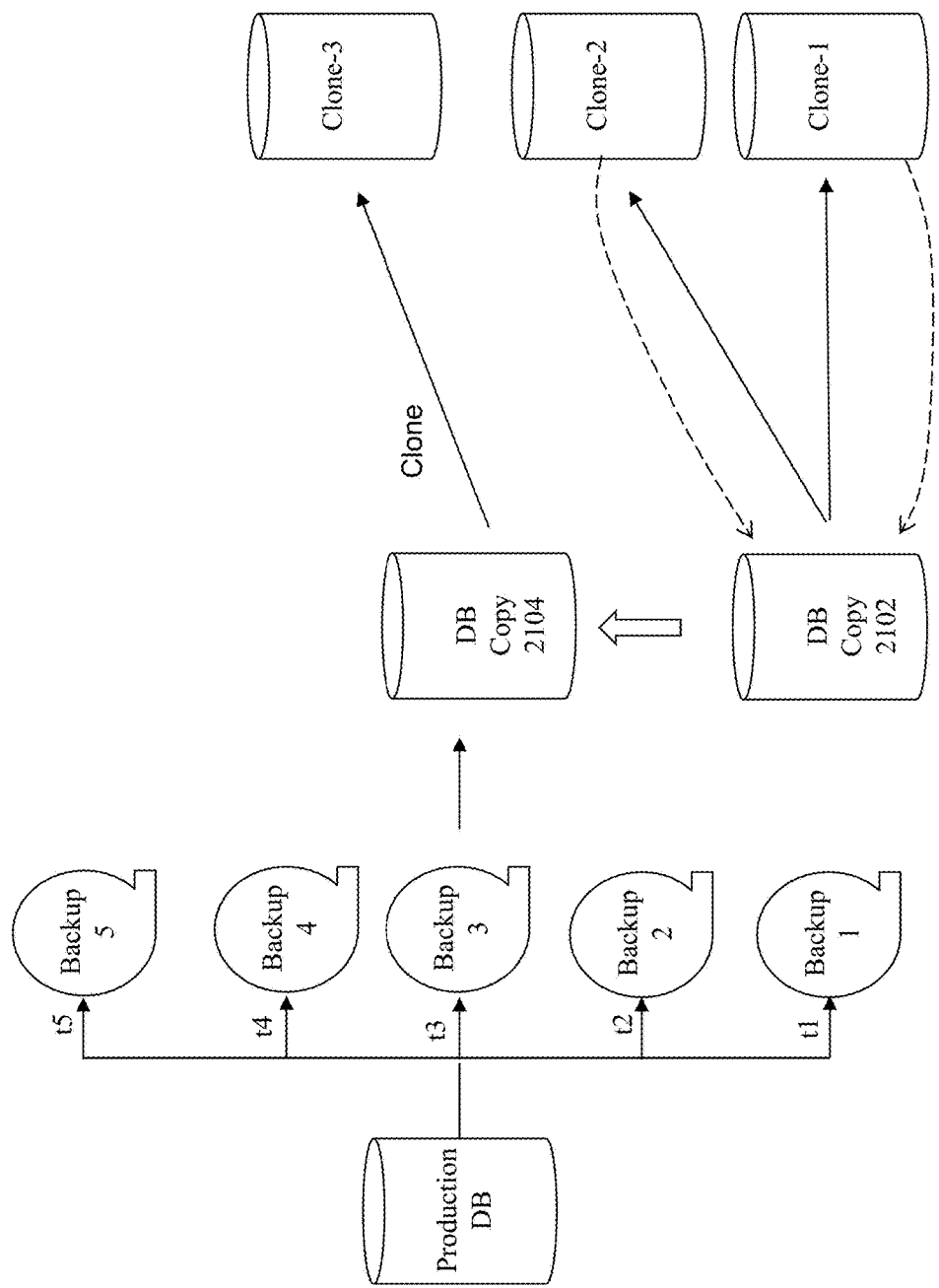

At this point, the old test master 2102 should not be used anymore to create clones. In this situation, any new clones would be created from the latest test master DB 2104. Therefore, as shown in FIG. 21E, the new test master 2104 is used to create a new clone Clone-3.

However, the pre-existing clones (Clone-1 and Clone-2) would still be associated with the old test master DB 2102 that corresponds to time T1. These pre-existing clones will continue to access the old test master DB until a change is required or desired. For example, the system retention policy may require the old data sources that are stale to be deleted, in this case requiring the deletion of test master 2102.

Figure 21F:
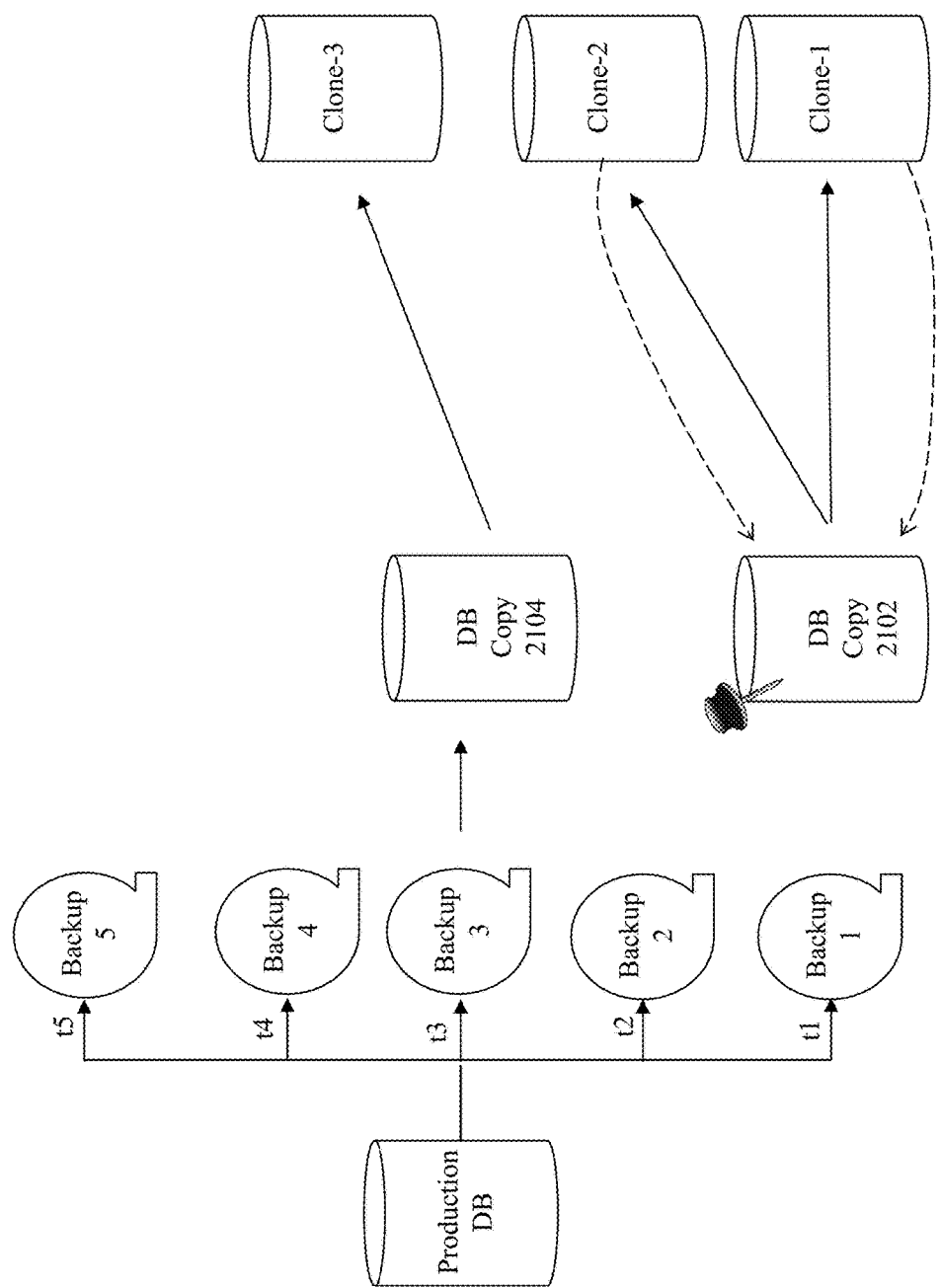

In this situation, test master 2102 cannot be immediately deleted because of the dependencies that exist from thin clones Clone-1 and Clone-2. Therefore, as shown in FIG. 21F, the old test master 2102 would be marked with metadata to indicate that it should not be immediately deleted, and no new clones should be created from this test master.

Figure 21G:
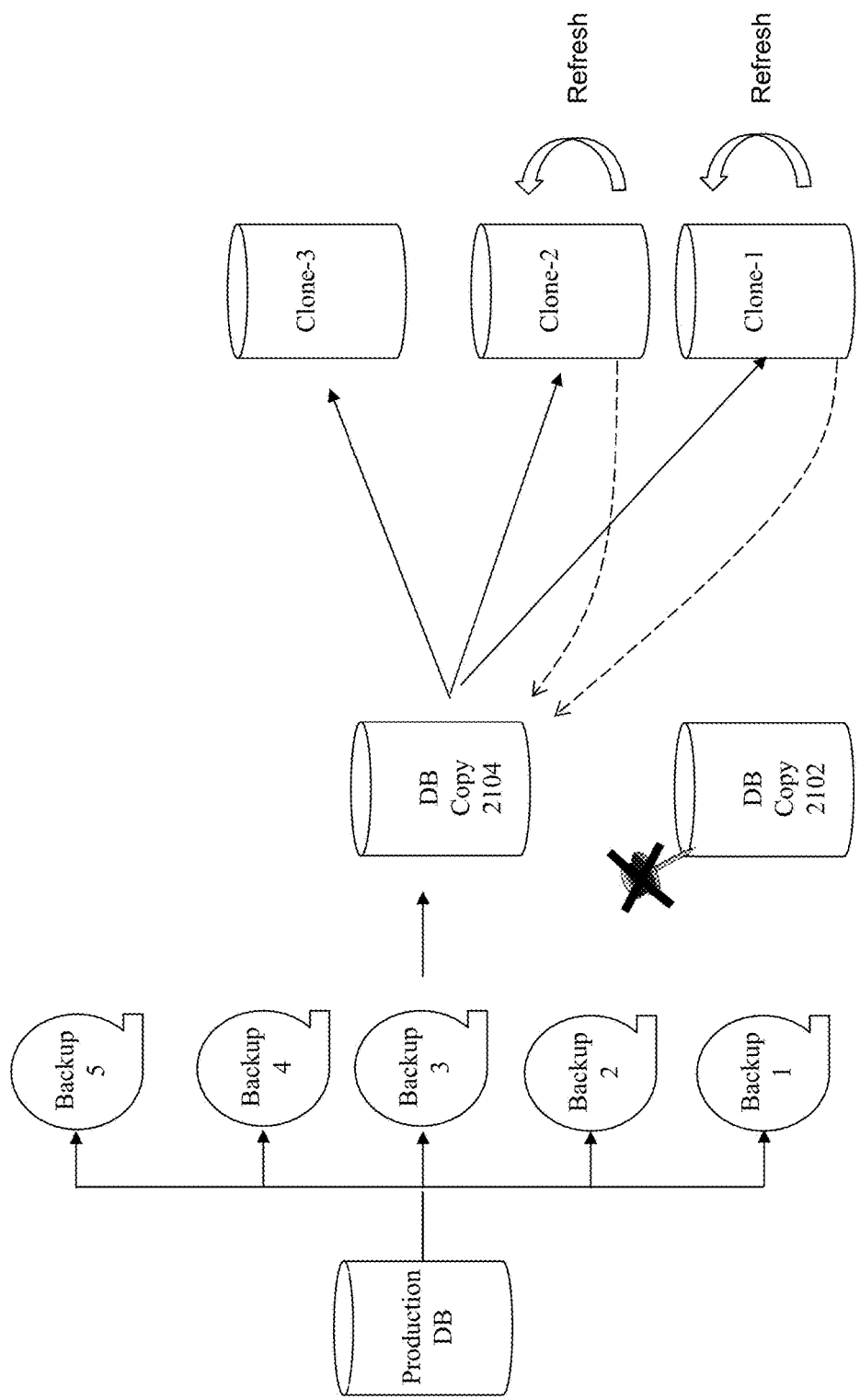

A refresh operation would be performed upon the pre-existing clones so that they would now be associated with the latest/later version of the test master DB 2104. As shown in FIG. 21G, the pre-existing clones Clone-1 and Clone-2 are therefore refreshed to the new test master 2104. If they are to be retained as thin clones, then these refreshed clones Clone-1 and Clone-2 would now be referentially dependent upon test master 2104. As previously noted, one possible approach to implement the refresh operation is to modify the system metadata so that the identification and reference locations that was previously used for the old test master DB is now associated with the new test master DB when a refresh of the data source is performed.

Figure 21H:
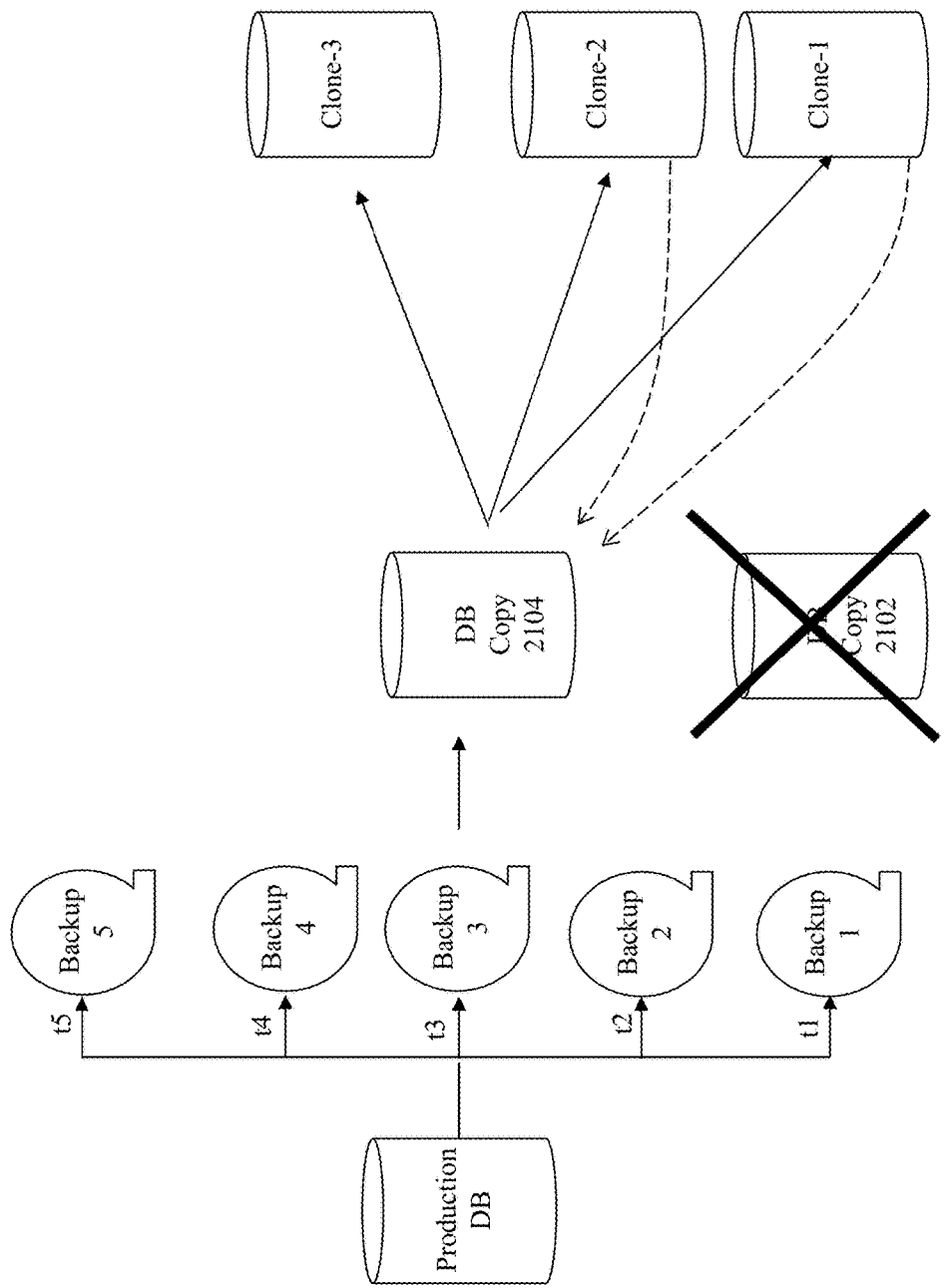

At this point, the old test master 2102 no longer is locked from being removed, and can now be deleted from the system. As used herein, the term "purge" may be used synonymously with the term "delete" in this disclosure. As shown in FIG. 21H, the old test master 2102 can now be deleted from the system.

The above approaches can be used for any type of source and/or clone. For example, snapshot clones (e.g., services instances) can be refreshed in the same way. In this situation, the test master DB may be based upon a backup from time T1. The snapshot clones are created from the test master from time T1. The test master DB can be refreshed to a later backup, and the snapshot clones can also correspondingly be refreshed to the new test master DB.

In a similar way, the data source for the clones may also correspond to a snapshot. It may be assumed in some cases that enough time has elapsed such that the snapshot source is no longer active (so that no new clones are permitted to be created from this snapshot). Such aging policies may be based upon, for example, a time period (e.g., only snapshots created within the last two weeks can be active) or a set number of snapshots (e.g., only a max of the latest 10 snapshots can be active).

Since the snapshot data sources may consume system resources (such as storage resources), it may be desirable to remove the stale snapshots. The problem is that they cannot be removed if there are clones that are still reliant upon the stale snapshots. In this situation, an escalating series of warnings can be provided to the user associated with the stale clones/snapshots to request a refresh to a newer snapshot. The user may then request a refresh. If a refresh is not requested within a certain time period, the system can be configured to automatically perform the refresh.

In this situation, the approach of FIG. 20 can be applied, and the pre-existing clones reliant upon the snapshot source will undergo a refresh such that they now correspond with the latest snapshot. At this point, there are no further clones that rely upon the inactive snapshot. Therefore, this inactive snapshot can now be removed.

Figure 22:
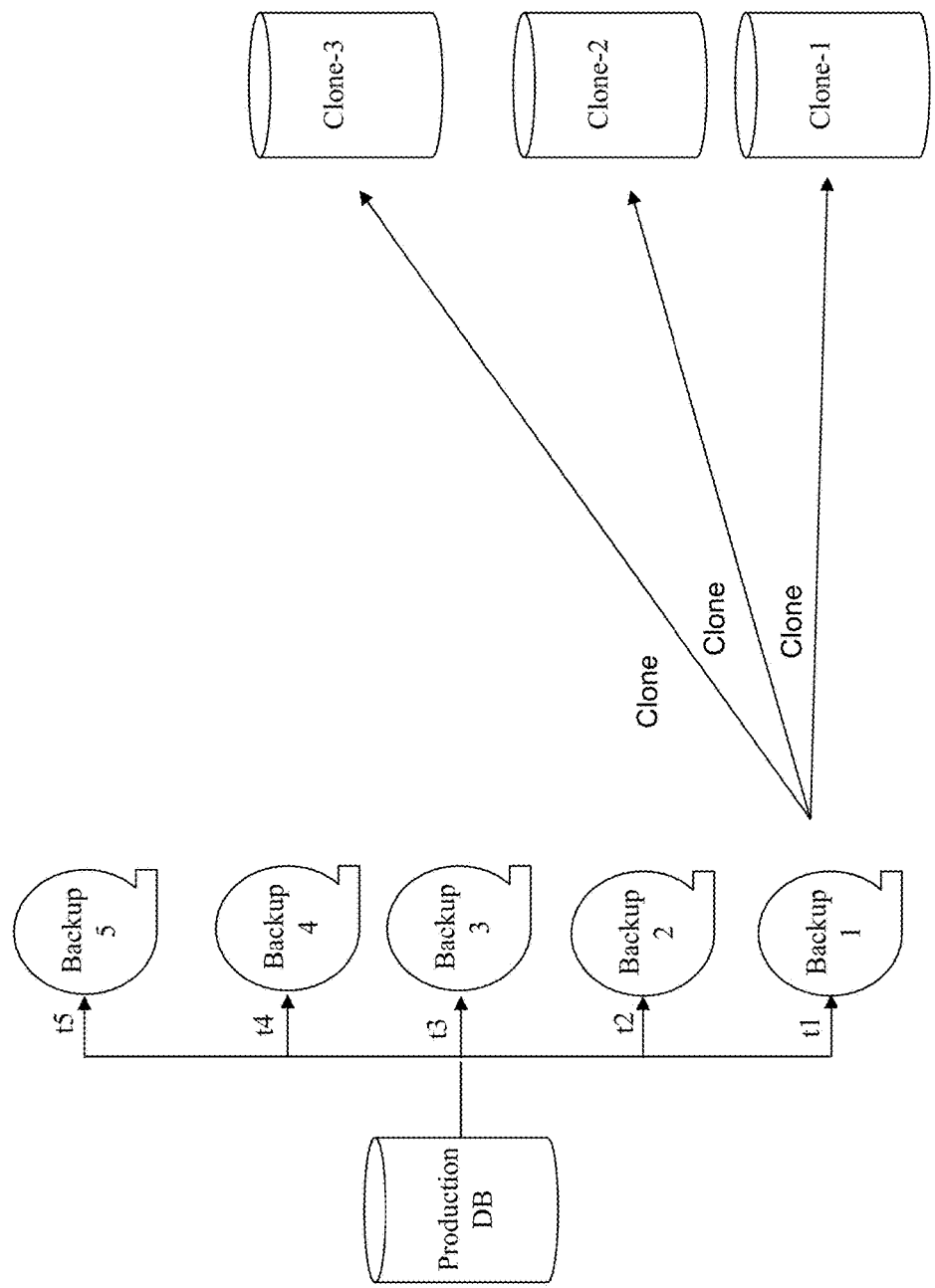
FIG. 22 illustrates a scenario where no test master is used.
Figure 23:
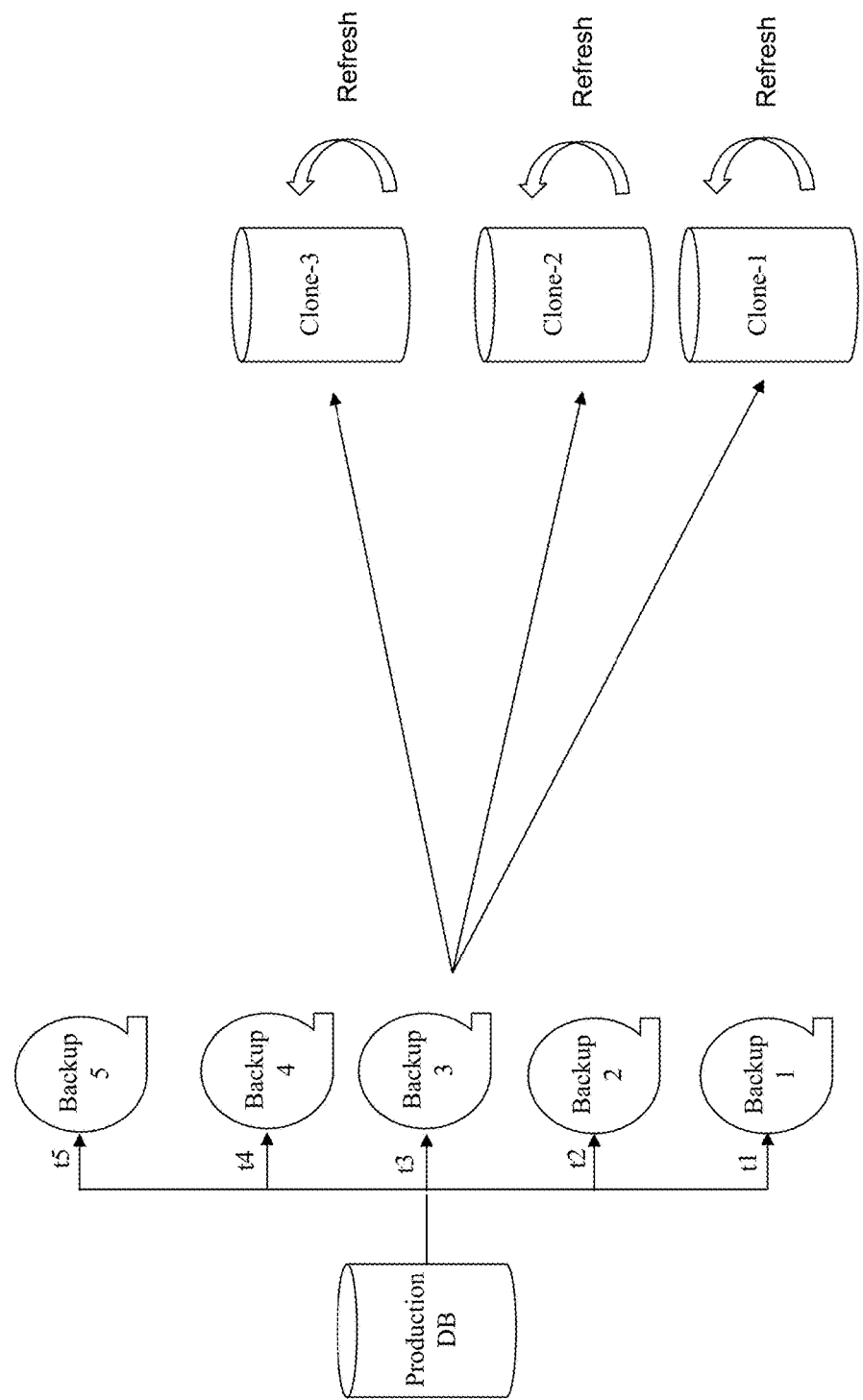
FIG. 23 illustrates refreshing a clone.

FIG. 22 illustrates the scenario where no test master is used. Instead, the clones Clone-1, Clone-2, and Clone-3 are directly created from a backup (Backup 1). According to some embodiments, as shown in FIG. 23, clones can be refreshed to a later backup of the production DB (e.g., Backup 3), using the same approach as described above.

Figure 24:
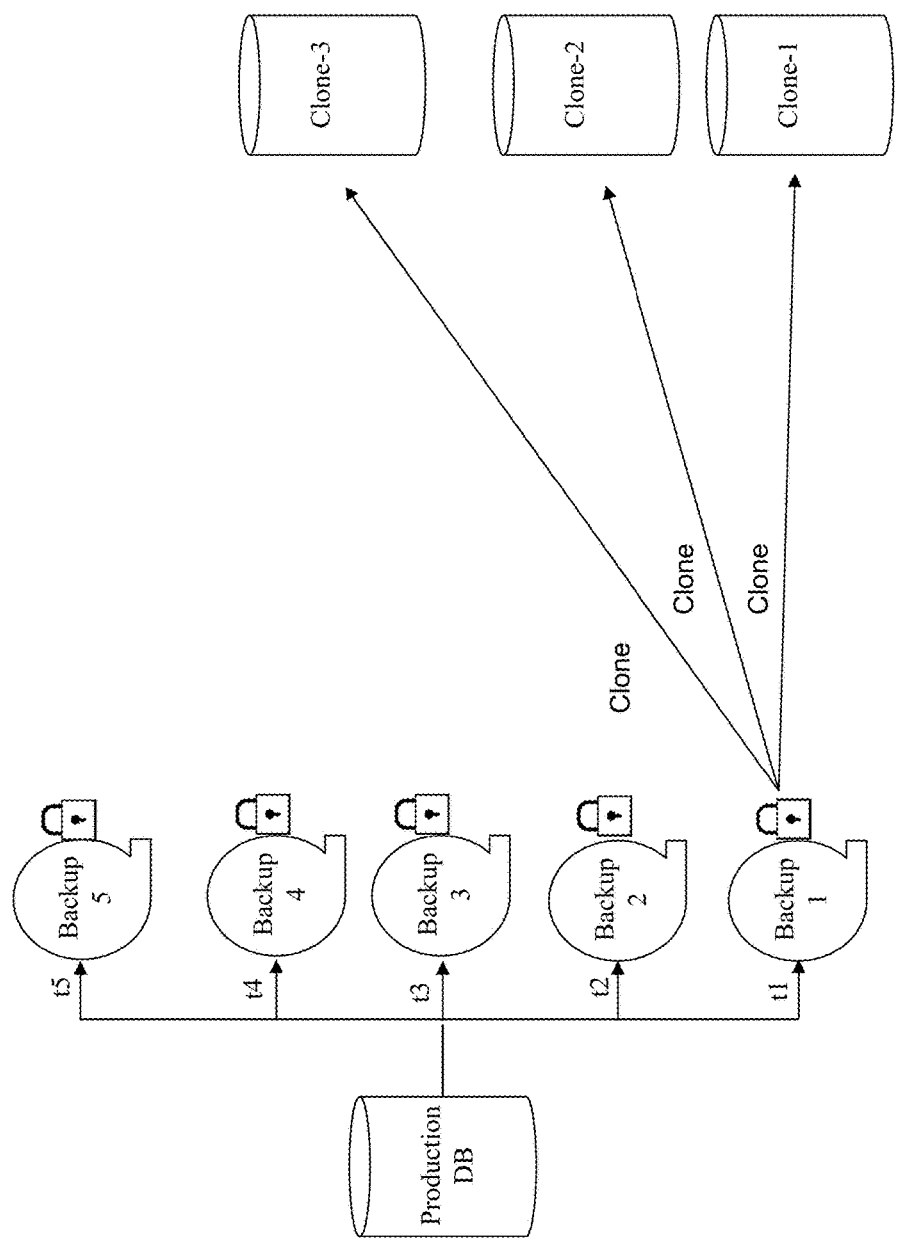
FIG. 24 illustrates a scenario where secure copies are used to create the clones from the source.
Figure 25:
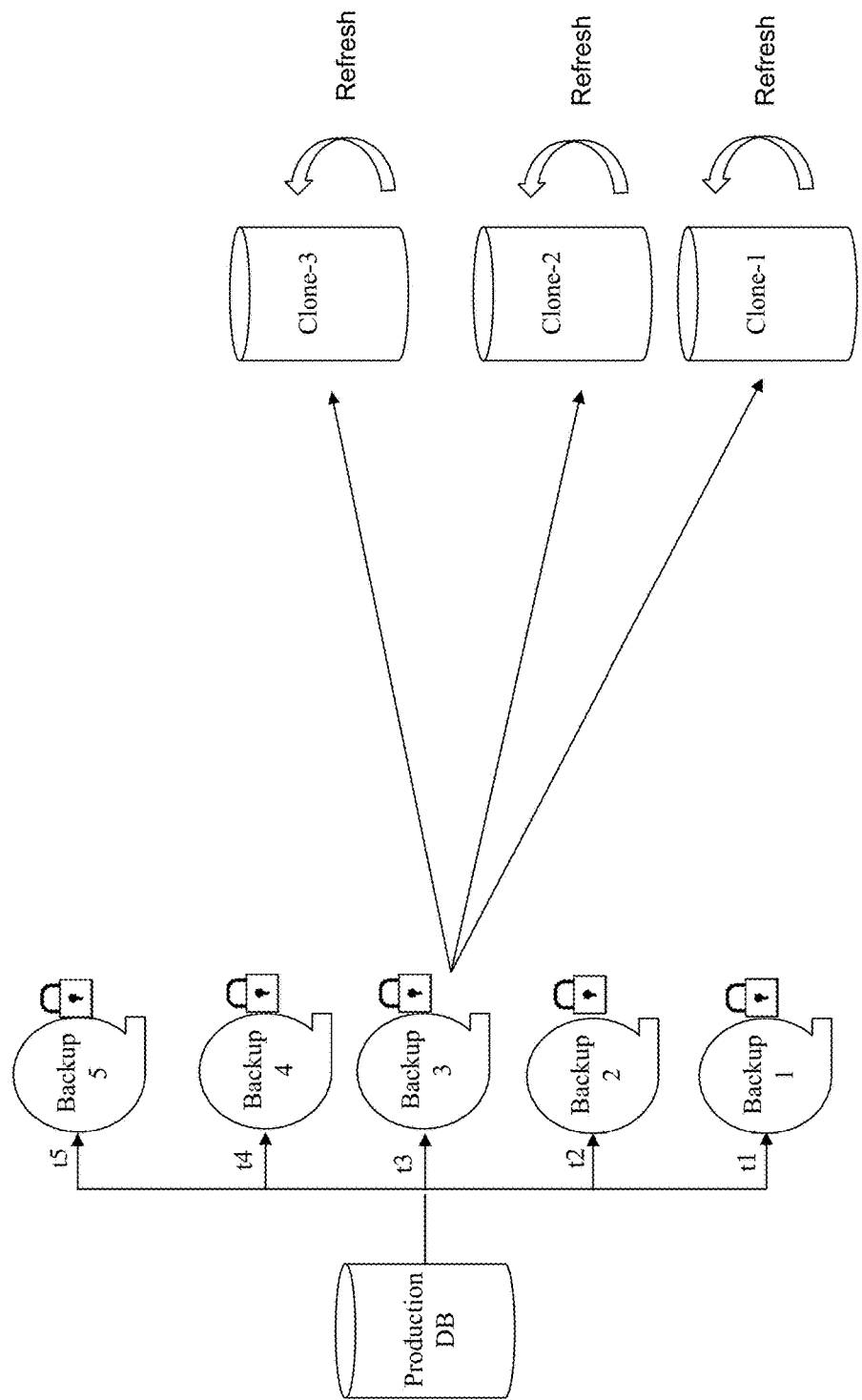
FIG. 25 illustrates refreshing a clone where secure server instances are used to create the clone from the source.

FIG. 24 illustrates the scenario where secured and desensitized physical and/or logical copies of the source are used to create the clones. FIG. 25 illustrates where a refresh is implemented. In the case of FIG. 25, secure service templates may be used that refer to a later backup of the production DB. "Service templates" are described in more detail below.

Some embodiments provide an approach to manage the creation and retention of clones by using management profiles. The management profile comprises set of parameters for performing management of clones, with a common interface for performing data specific actions, even for the different types of data sources and clones in the system.

Figure 26:
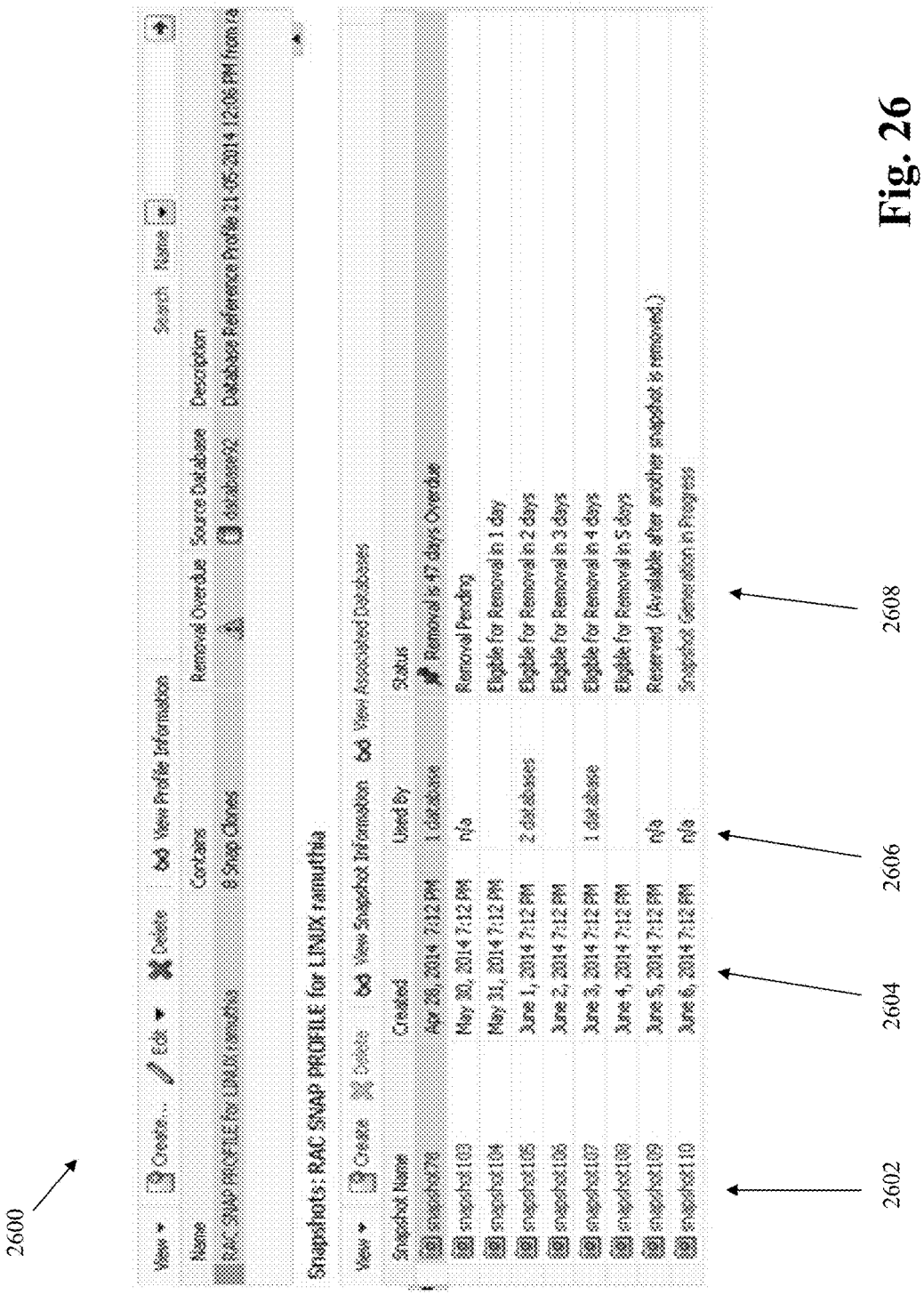
FIG. 26 illustrates an example profile.

FIG. 26 illustrates an example profile 2600. The profile 2600 provides a display of information that may include the snapshot names 2602, creation dates 2604, and number of databases 2606 that are using the snapshot. In addition, the profile 2600 may list the policies that may have been established for the retention/creation of the snapshots. If so, then retention/creation status data 2608 may be displayed in the interface. For example, the retention status information may include the removal status, warnings about stale snapshots, and messages about pending removals.

These management functionalities can be used to manage active versions of data that can be used for clone or refresh, including auto-expiring old passive data sources, and notifying services of staleness. These sets of functionality can also be used to track and present lineages of versions from production instances to test master instances to services running on the test master instances, and providing automated recommendations based on the tracked lineage.

As noted above, retention policies may be established for the retention of clone-related data within the system. Refresh operations may be performed to ensure that the proper set of data is being used for the data sources and/or clones. This can be performed to move source along (e.g., manage snapshots, backups, dumps). In addition, this process can be performed to make sure that the test master is refreshed (e.g., periodic/discrete or continuous), and possibly to perform a refresh of a gold copy. Moreover, this permits test (service/clone) instances to be refreshed (e.g., with a single button push).

The policy provides the ability for admin to create snapshots of databases at a specific interval(s). The profile can also be used to specify a purge policy along with creation of profiles. For example it can be a number of revisions that can be present at any instance for a profile. In some embodiments, the approach provides the ability to refresh the profile automatically based on a specific schedule. The admins can also refresh the profile on demand if required.

Figure 27:
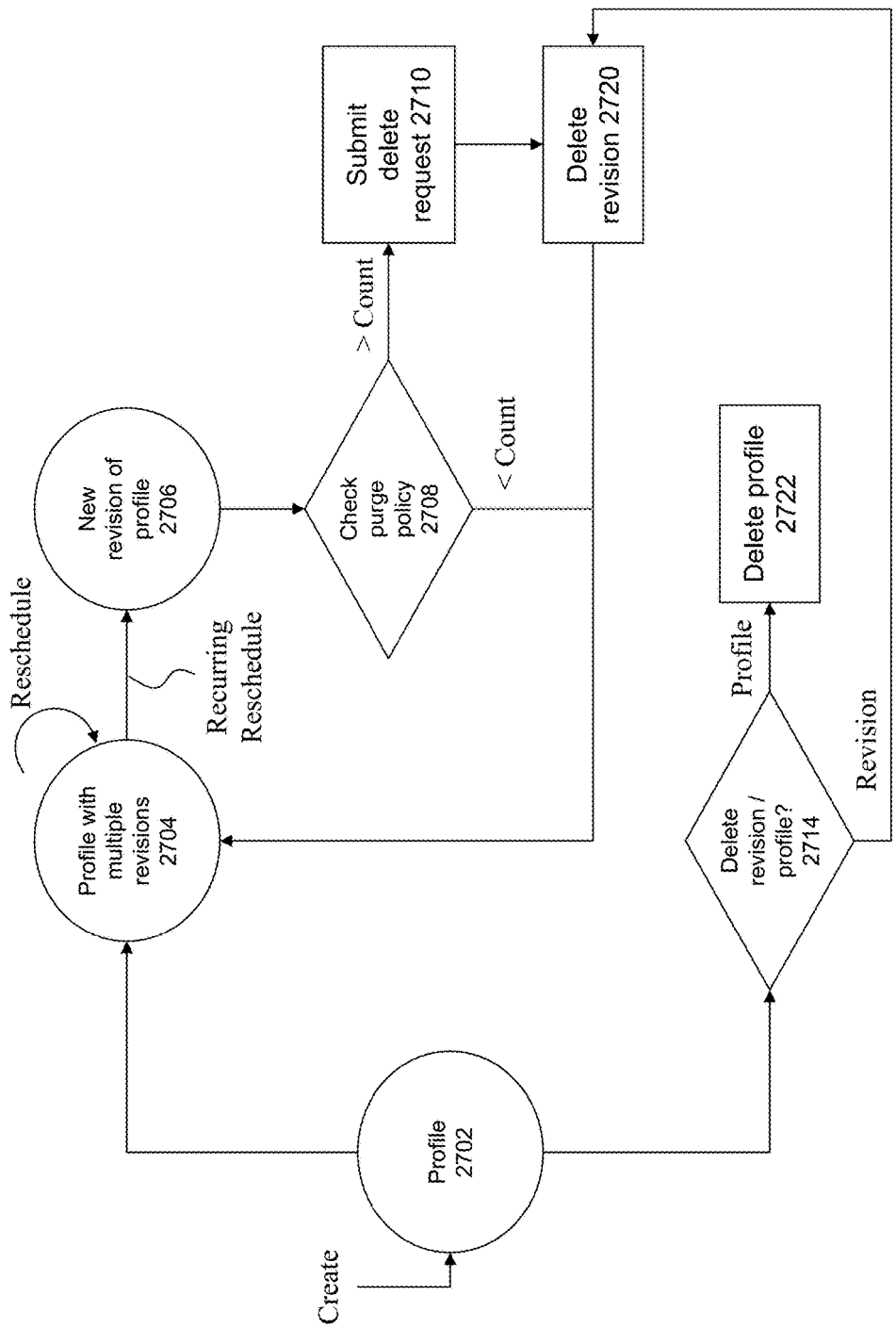
FIG. 27 illustrates an example usage flow to implement profiles according to some embodiments of the invention.

FIG. 27 illustrates an example usage flow to implement profiles according to some embodiments of the invention. At 2702, the flow begins with creation of a new version (also referred to as "revision") of a clone, e.g., a new clone as delineated in section 2602 of FIG. 26.

At 2704, the flow proceeds to handle the profile having multiple versions, since the system according to some embodiments can create profiles with multiple versions/revisions. This occurs, for example, where there are multiple clones associated with the profile. In some embodiments, the interface shown in FIG. 26 can be used to view the different profile versions, as well as profile details for a selected version and usage of profiles for clone instances.

A schedule can be associated with the profile, e.g., to provide scheduling for management functionality associated with the profile. For example, this approach permits scheduling for revisions of a profile at regular intervals, e.g., where the profile is submitted with recurring schedule, which creates a number of snapshots at regular intervals. The selected profile can be modified to edit the schedule associated with operations to be performed with respect to the profile. The schedule may be a recurring schedule or an event that is rescheduled any number of times.

At 2706, the flow performs an operation to implement a new version of the profile, e.g., upon a recurring schedule. A check of the purge policy is made at 2708. The reasons for the purge policy is because a profile may be associated with many snapshots, each taken at different points of time. The purge policy in one embodiment maintains a limit on the number of snapshot revisions. A purge policy for profiles can be specified that identifies, for example, the number of profiles revisions to keep. For example: if Admin specify the number as 10, then during the creation of the $11^{th}$ revision of the profile, the oldest revision of that profile will be deleted. If the count of revisions exceeds the purge policy threshold, then at 2710 a delete request is issued to remove an old revision. At 2720, deletion would occur for the identified revision. If the count does not exceed the threshold, then the flow loops back to 2704.

This type of purge policy can be established, for example, when backups are taken every day and requirements on storage to keep the backups will increase. As such, the purging policy helps to keep a reasonable limit on the storage for the revisions. The purging policy can be implemented in any number of different ways, such as for example, using: (a) Number of Backups/Snapshots: this option chooses to keep only a specific number of latest revisions. Once the number of revisions of the profile reaches the maximum count, the older revision of the profile gets deleted automatically; (b) Time interval: There may be applications where the backups should be persisted only for a specific duration of time. For those use cases, a period of time is defined for which the backups have to be persisted beyond which it becomes stale and will get deleted automatically. For example: —purge_policy_type time_interval—duration 20 days. All backups whose lifetime is >20 days will get deleted.

In some embodiments, additional/different handling may be performed if a version of profile is used by a database. For example, in some embodiments pertaining to thin databases, they are not removed until all the databases created for the specific version are removed. In this case, the status of the version of profile can be marked as "Obsolete", which means it exists in system but the user cannot use it for creating new clones. This flow is also described elsewhere in this disclosure, but is also applicable here for purging the version of the profile when databases are running the same.

The flow may also a direct path to implement deletion of either a profile or a revision. At 2714, a determination is made whether deletion is desired for a profile or for a revision. If deletion is desired for a profile, then the profile is deleted at 2722. On the other hand, if deletion is desired for a revision, then the revision is deleted at 2720.

The profiles can be revised in the system in any suitable way. For example, one possible approach is to implement an automatic refresh of the profile. Another possible approach is to implement manual refresh of profile, where a refresh control is provided in a user interface, where the user can select a profile for refresh. This will submit a request, where execution data will be cloned from an earlier execution and the profile component will be updated. The revising profile may submit a request, which on succeeds links the created backup with the same profile and stamps it with a new tag/version/timestamp. A profile can be attached with any number of backups. Each version can be associated with a time. Creating new version of backup triggers a job to delete the oldest version in the profile, if the purge policy is met.

Figure 29:
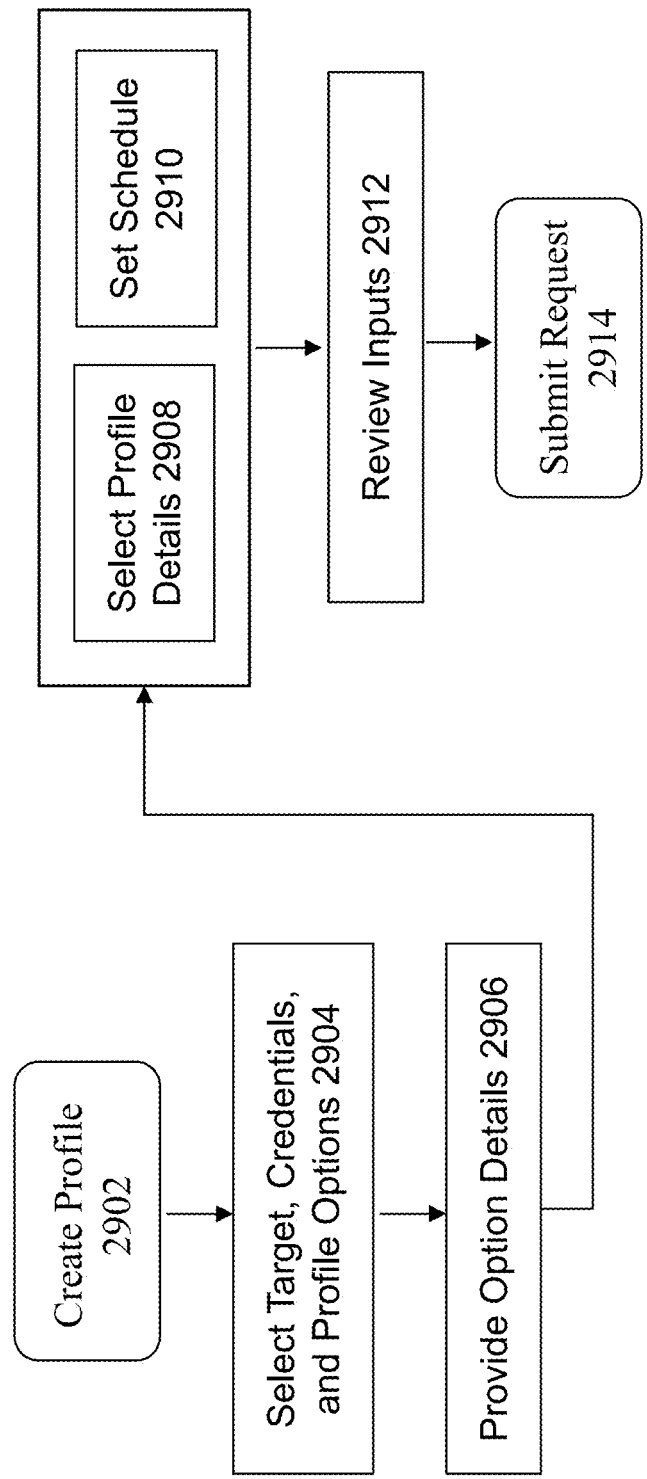
FIG. 29 shows an approach to implement sources/clones using profiles according to some embodiments.

There are numerous advantages to using profiles. For example, the automatic profile refresh capability of the invention permits database administrators to schedule automatic data refresh with appropriate purge policy which will help them to: (a) automate data refresh; (b) purge old data thereby saving storage space; and (c) allows users to perform a time travel against a database at the time of service request, by accessing past versions of backups/snapshots FIG. 29 shows an approach to implement sources/clones using profiles according to some embodiments. At 2902, the process to create the profile is initiated. At 2904, options and parameters for the profile can be established. For example, reference targets for the profile can be identified in this action. In addition, credential for the creation entity can also be established. At 2906, a user interface can be provided to allow the user to provide information for content options. At 2908, profile details entered through the user interface are received. For example, profile details such as profile name and profile description may be received for the new profile.

At 2910, scheduling is configured for the profile. As previously noted, the schedule can be used for scheduling of revisions for the profile at regular intervals, e.g., where the profile is submitted with recurring schedule, which creates a number of snapshots at regular intervals. The user may perform a review of the inputs at 2912, and if correct, submit the request to create the profile at 2914.

As just one example, when snapshot profile is submitted in some embodiments, a storage snapshot can be created. From a scheduling perspective, the snapshot profile can be scheduled to run on a regular basis, e.g., weekly on Friday at 5 PM, and a purge policy configured with a maximum number of revisions, e.g., where the maximum revisions to keep alive are 8. Then at any point of time afterwards, the profile will be associated with 8 revisions/snapshots.

In some embodiments, the system can be configured such that an administrator can delete either specific revisions of the profile or whole profile itself. If the administrator does not wish to revise the profile or keep any of the revisions already created, then the profile itself can be deleted. Any of the revisions can be removed, including revisions in the middle of a progression of other revisions. For example, assume that revisions V1, V2, and V3 have been created for a profile. Any of these revisions V1, V2, or V3 can be deleted, without touching the other revisions.

Figure 28:
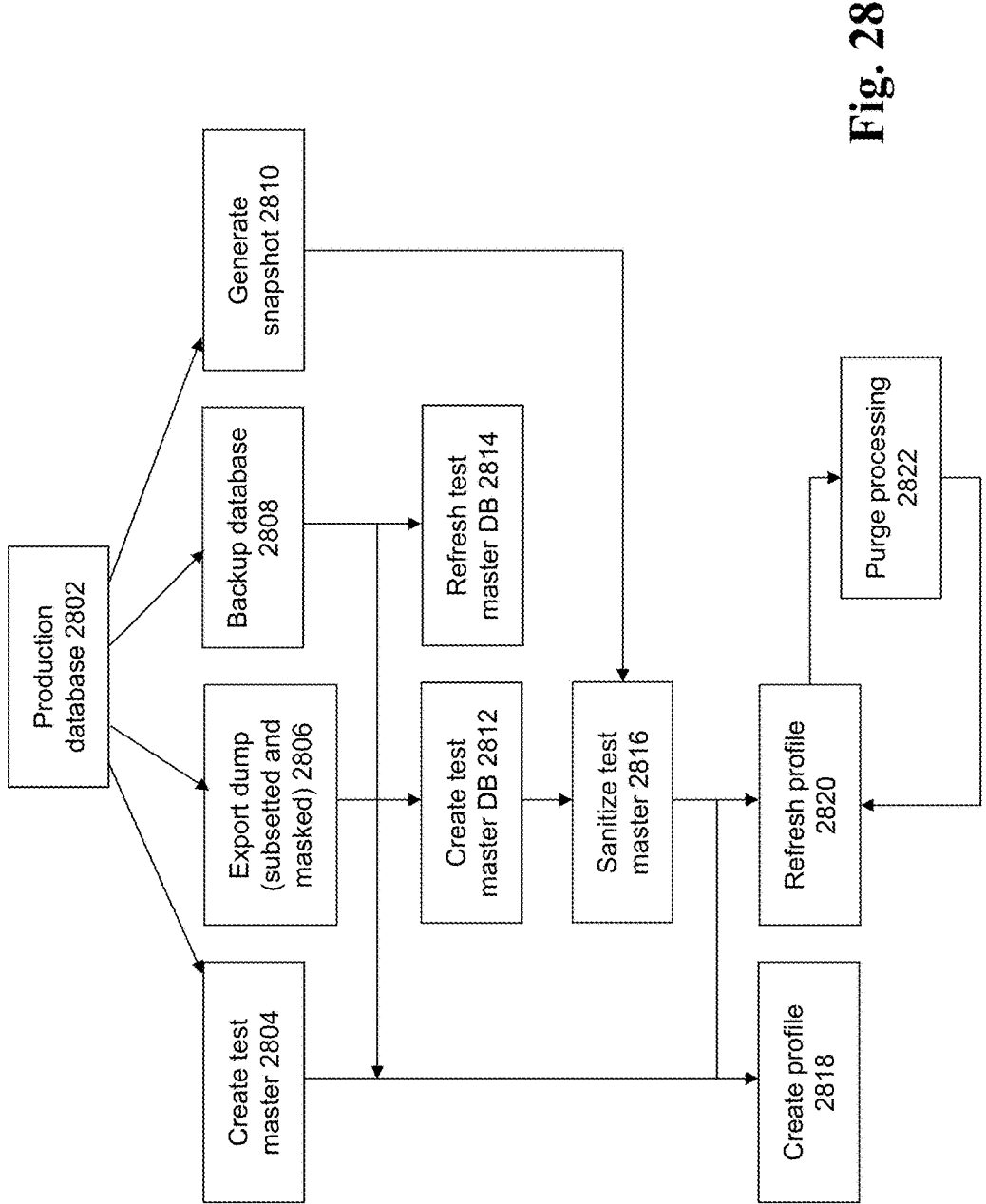
FIG. 28 illustrates a flow for performing creation of a data sources/clones according to some embodiments.

FIG. 28 illustrates a flow for performing creation of a data sources/clones according to some embodiments. For example, this diagram can be used to describe how test master databases are created from a production database 2802 and the sources from which profile can be created.

At 2804, a physical standby of the production database 2802 can be implemented as the test master database. Here, the test master is not refreshed, and instead the data flows continuously from primary to standby which keeps it in sync. In an alternate embodiment, the data source, e.g., test master, is refreshed continuously to make exact replica of production database.

At 2806, export dumps are taken from the production database 2802. At 2812, the test master database is created from the export dump. As the export dumps are taken at specific intervals, the test master is refreshed (2814) at discrete times and only portrays the production database at discrete time points.

At 2808, backups are taken from the production database 2802. At 2812, the test master database is created from the backups. As the backups are taken at specific intervals, the test master is refreshed (2814) at discrete times and only portrays the production database at discrete time points. The test master does not represent the production database at all times. At 2810, the test master database is created from generated snapshot standbys.

It is noted that the test master database need not be an exact copy of the production database. The data can be subset and masked (2816) before creating the test master. Any suitable approach can be taken to filter/mask the data while creating the test master.

At 2818, the profile is created, as described above. The profile can be refreshed at 2820. Purge processing may occur at 2822. In some embodiments, there is an advantage to use the backups/exported dumps to create the test master database and use it as the profile source instead of using the backups/exported dumps directly as profile sources. One advantage is that storage can be saved if test master is created in certain kinds of storage and flash technology is used to create the database service instances. Another advantage of creating the test master is that administrator may be able to verify the test master before feeding it to the profile.

As previously discussed, test masters can be created as a special class of clones. Test masters generally are created with appropriate masking to de-sensitize data from underlying sources. In some embodiments, the test master differs from the cloned DB on the basis of several additional reasons, where the test master can be created as a normal DB clone with the additional post processing. The additional processing flags the clone as a test master, schedules recurring/one-time profiles depending on the type of test master. In addition, some types of test masters support refresh and volume tracking to aid volume management and profiles/database management in case the volume is deleted, to manage possible dangling snapshots/databases. In addition, in some embodiments, the test master updates (upgrades/patches) automatically create a new profile for use with the test master.

Figure 30:
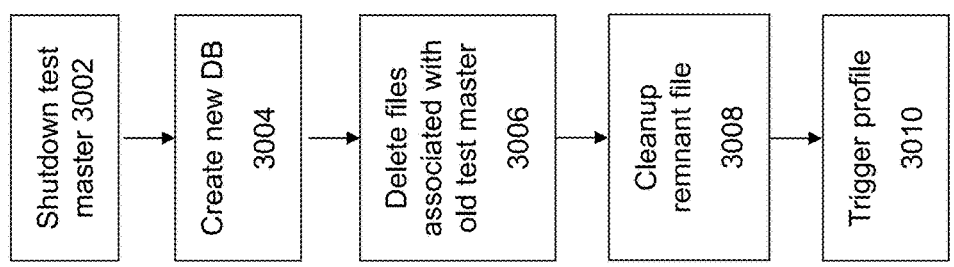
FIG. 30 shows an approach that can be taken to refresh a test master for a full clone.

FIG. 30 shows an approach that can be taken to refresh a test master for a full clone. At 3002, the test master is shutdown. At 3004, a new database is created with the same identifier as the test master that was just shut down. This new database forms the new test master DB.

At 3006, after the database is successfully created, the process deletes the datafiles and any other files from the previous incarnation of this test master. In case of failure, cleanup is performed at 3008 so that the remnant files do not remain in the system (and consume excessive disk space). At this point, the process brings up the database from the old data files.

At 3010, a profile (e.g., an on-demand profile as opposed to a recurring profile) is triggered to capture the new data version into the profile. It is noted that in this case, it is likely that scheduling of a recurring profile updates is probably not going to occur, since the profile will likely be created when the test master is refreshed.

The process to perform a refresh on the test master may retain a history of the list of volumes (or LUNs) used by various incarnations of the test master. When the test master is refreshed, the set of volumes/LUNs used for the test master can be maintained. The user can be presented with the list of these volumes, their usage in terms of snapshots and databases. This data can be corroborated against the collected data as follows: (a) volumes that no longer exist on the filer and do not have snapshots/databases are no longer shown; (b) volumes that no longer exist but were hosting snapshots and/or databases are shown with a warning—the user will have to take action to clean up the profiles tracking these snapshots as well as he databases since they will no longer be functional; and (c) volumes from which snapshots are created and (optionally) databases are created, where information about snapshots are presented.

Refreshing a test master that is used for snapshot clones may require additional processing. The user may have created snapshots from this database and databases may have been created from any of these snapshots. Deleting the database/destroying the volume will essentially result in destroying the snapshots and in turn, the databases created from the snapshots. For example, for a first possible scenario, the snapshots are created from the test master, and they do not fall into the active window specified for the data (e.g., where none of the snapshots fall into the active window after the next snapshot is created). As another possible scenario, the snapshots are created from the test master, and one or more snapshots fall into the active window (e.g., where at least one snapshot remains in the active window after the next snapshot is created). Another possible scenario is where snapshots are created from the test master, and one or more databases are created from these snapshots (e.g., based on the existence of a database). The approaches described in FIGS. 18 and 20 are applicable to address each of these scenarios.

In some embodiments, snapshots may be tightly coupled with the volumes. As long as volumes exist, the old snapshots will remain. In some situations, even though datafiles are deleted, the filer will be unable to release the blocks since they are held by the snapshots. In addition, once a volume is deleted, the profiles may be (obviously) non-functional and there will be a need to clean up the same.

Figure 31:
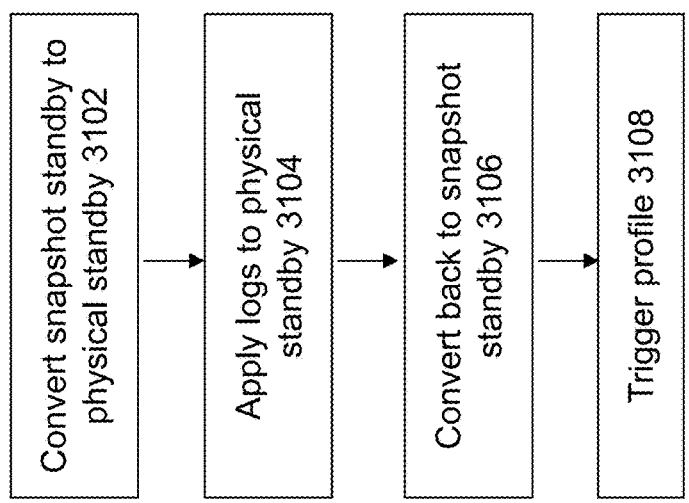
FIG. 31 shows a flowchart of an approach to refresh snapshot standbys.

FIG. 31 shows a flowchart of an approach to refresh snapshot standbys. At 3102, the snapshot standby is converted to a physical standby. This action creates a full standby clone, instead of using the snapshot as the standby.

At 3104, all appropriate logs are applied as necessary to bring the physical standby to a current state. For example, redo logs may be applied as necessary, where any new redo log entry from the date of the previous snapshot standby until the current time period are applied to bring the physical standby completely up-to-date.

At 3106, the physical standby is then converted back into a snapshot standby. In this situation, the clone now exists as a snapshot (rather than a full physical copy of the database). At this point, at 3108, a profile is triggered (e.g., an on-demand profile) to capture the new data version into the profile. This adds the new clone onto the list of clones (e.g., as shown in FIG. 20).

Figure 32:
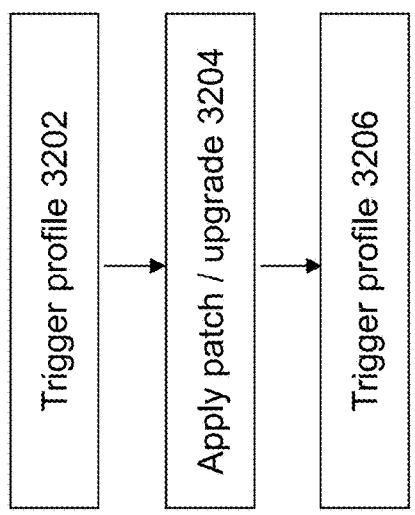
FIG. 32 illustrates another approach that can be taken to update a test master for snapshot clone purposes.

FIG. 32 illustrates another approach that can be taken to update a test master for snapshot clone purposes. When test masters used for snapshot clone purposes, actions may be taken to perform an update, e.g., a patch or an upgrade. At 3202, the process optionally triggers an on-demand profile, e.g., to perform a switchback operation.

Thereafter, at 3204, the patch/upgrade operation is performed. This action updates the snapshot clone with new contents. At 3206, the process triggers a profile (e.g., on-demand profile), to ensure that the latest snapshot is available for cloning post update. This same process can be used when test masters are used for full clones to perform the update having a patch or upgrade.

The process to perform a test master deletion faces a similar issue as test master refresh. The difference is that in a refresh, the test master database is a target. In deletion, one runs into two issues: (a) post deletion, the target no longer exists in the system (b) it is possible for a new target with the same name/type shows up. When test masters are used for full clones, this is addressed by first editing all profiles with recurring schedules to stop the same, and to then delete the test master.

Deletion may also be performed for test masters that are used for snapshot clone purposes. Here, if the databases/active snapshots are created out of these databases, then the process stops, since the database should not be deleted. If not, then the procedure edit all profiles with recurring schedules to stop the same. At this point, the test master can be deleted.

It is noted that in some embodiments, since a physical standby is always in sync with its primary database, there is no need to explicitly 'refresh' this test master. According to other embodiments, the physical standby can be refreshed, e.g., in asynchronous replication environments where there is a possibility that the physical standby does not necessarily always reflect the current state of the primary database.

According to some embodiments, clones can be created using a "template" (also referred to herein as a "service template"). The service template comprises a set of pre-packages configurations for creating clones, which may be specific to, for example, (a) data sources; (b) policies; (c) configuration/change information. This permits clones to be configured without requiring detailed implementation of all required input options. For example, regarding the option to configure the database size, instead of requiring a user to explicitly know the exact size to set for the various components of the system, the template may include three simple options of "large" "medium", and "small. Under the covers, the template would have set configuration details of each of these options.

Figure 33:
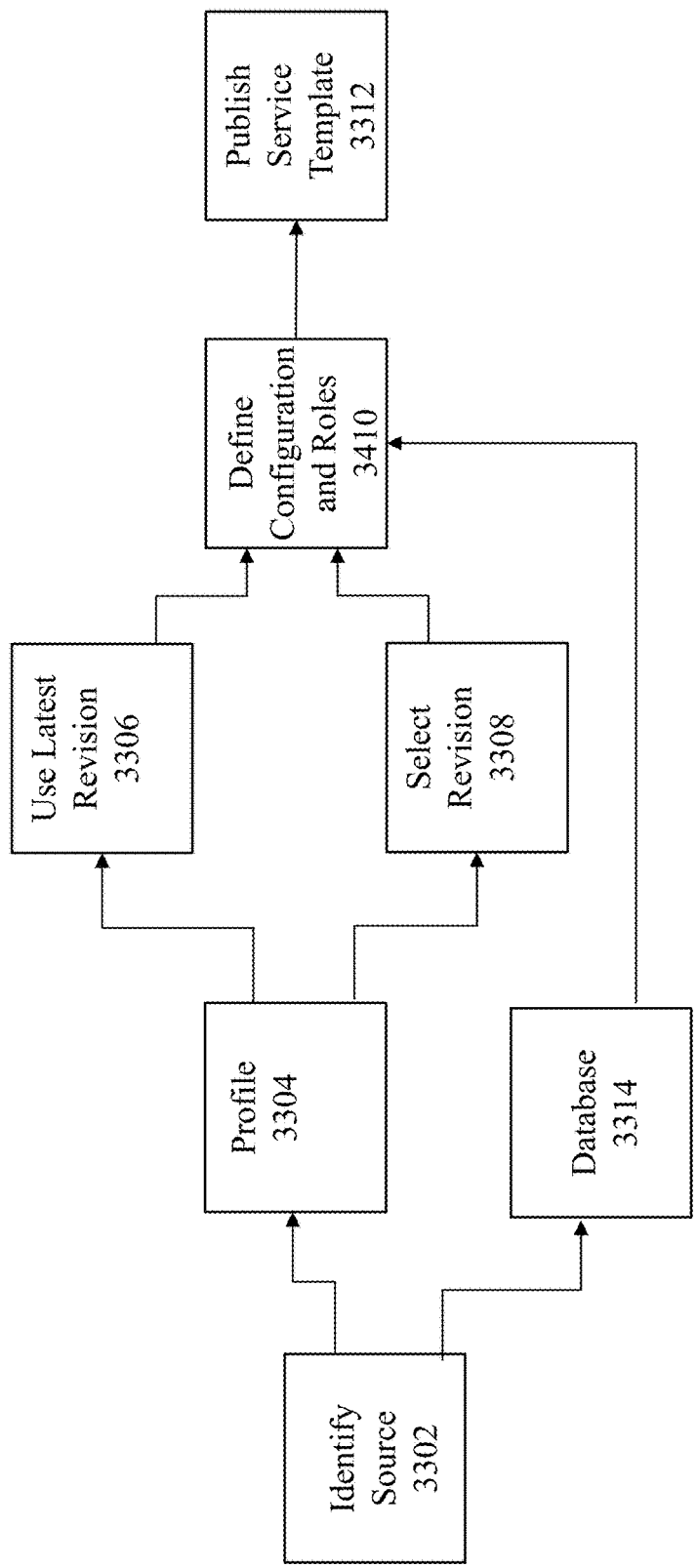
FIG. 33 shows a flowchart illustrating how data sources are used to create service templates.

FIG. 33 shows a flowchart illustrating how data sources are used to create service templates. At 3302, a data source is identified for the service template. The data source can be either a profile 3304 or a database 3314.

If the database 3314 is a direct data source, then the process assigns the configurations and roles to the service template at 3310. The service template is then published at 3312.

If the profile 3304 is used as a data source for the service template, then the process can select which version to use as the source. At 3306, one option is to select only the latest revision of the profile. At 3308, another option is to make all the revisions of the profile available, where a specific profile/revision is selected. The user can then select the revision of the profile when submitting the request. In some embodiments, the ability to select a specific revision of a profile is particularly applicable for profiles which are refreshed manually. In certain embodiments, a specific time interval can be used to select the profile. At 3310, configurations and roles to the service template. Thereafter, at 3312, the service template is published.

Figure 34:
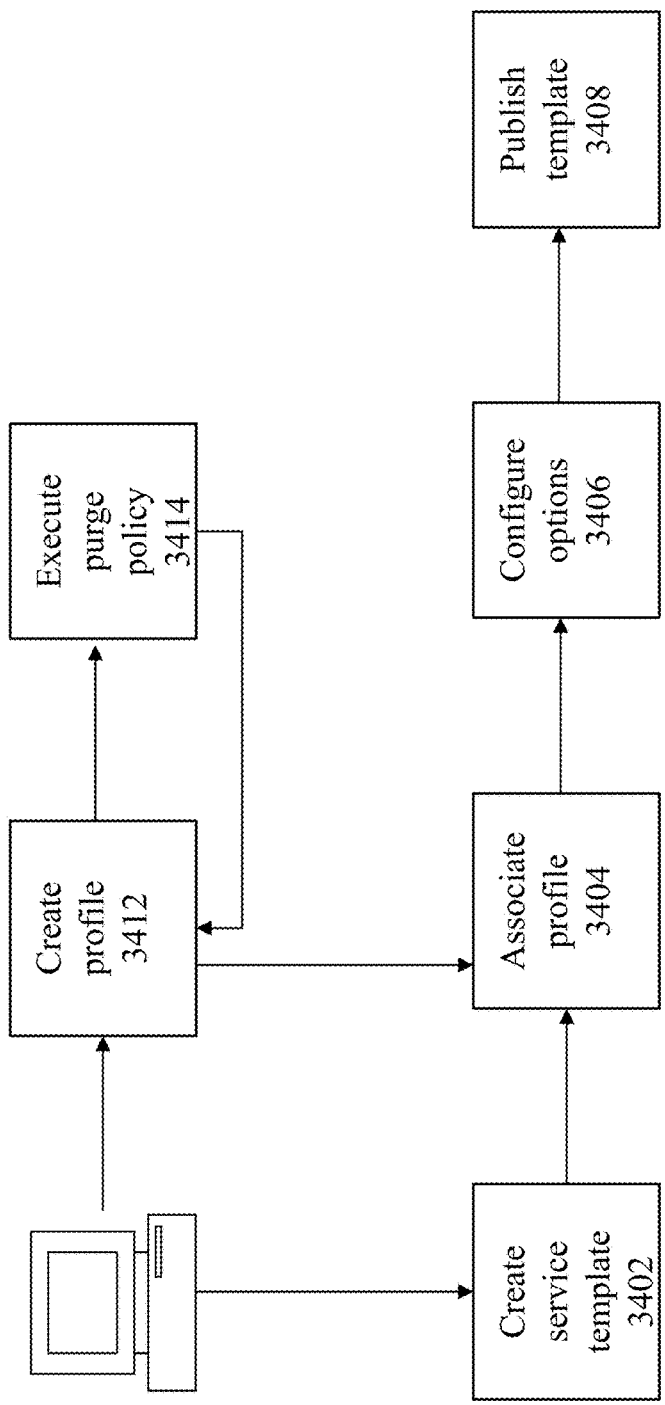
FIG. 34 shows a flowchart that illustrates the interaction between the template creation process and profiles.

FIG. 34 shows a flowchart that illustrates the interaction between the template creation process and profiles. At 3412, one or more profiles are created. The profiles can be created, for example, with recurring schedules. One or more purge policies may be applied to the profile at 3414.

At 3402, a service template is created, e.g., using the process described above. At 3404, the service template is associated with the profile. As stated above, the profile may be selected with the latest revision and/or with a selected revision. At 3406, one or more options can be configured for the template. For example, one option is to configure the system to notify users if a new revision of the profile is available. Thereafter, at 3408, the template is published.

Figure 35:
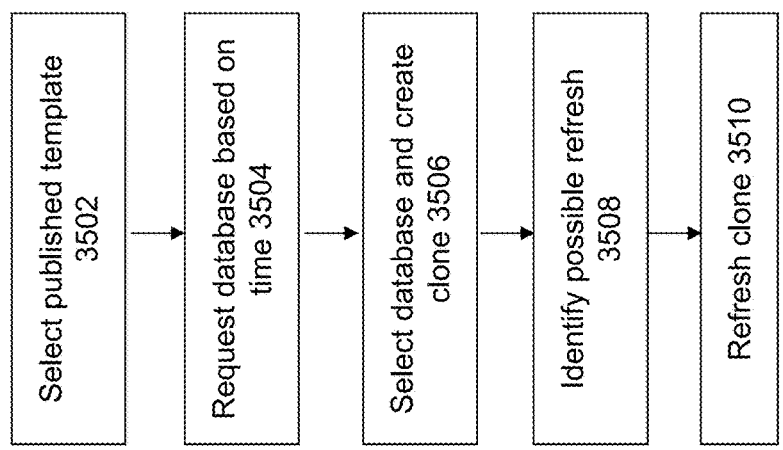
FIG. 35 illustrates an example flow for using the service template.

FIG. 35 illustrates an example flow for using the service template. At 3502, a published template is selected by a user. The user may configure one or more options established for the template to create a clone.

At 3504, a request may be made for a database at a specific point time. For example, there may be any number of version of the database from various points in time (e.g., from backups taken at different time periods). The template may be used with a specific time period for the database. At 3506, a database is selected using the selected time. Here, a particular version of the database is picked to correspond to the desired time period. Thereafter, the clone is created using the parameters configured for the template.

At 3508, identification is made at some later point in time of a possible refresh that can be performed. For example, a new revision of the selected profile may be available. The user can be presented with a choice to refresh. If the refresh option selected, then at 3510, the clone is refreshed. This can be implemented by refreshing the database to the latest version.

Some embodiments of the invention are directed to an improved user interface for visualizing and managing data sources, clones, and the relationships between data sources and clones. As discussed above, a clone may be created and refreshed using multiple methods. The inventive user interface tracks parent-child relationships of the production/test master/test system and facilitates management of the methods and objects used for cloning/refresh, the data source used for cloning, and the parent-child relationships that exist of the objects managed by the cloning system.

Figure 36:
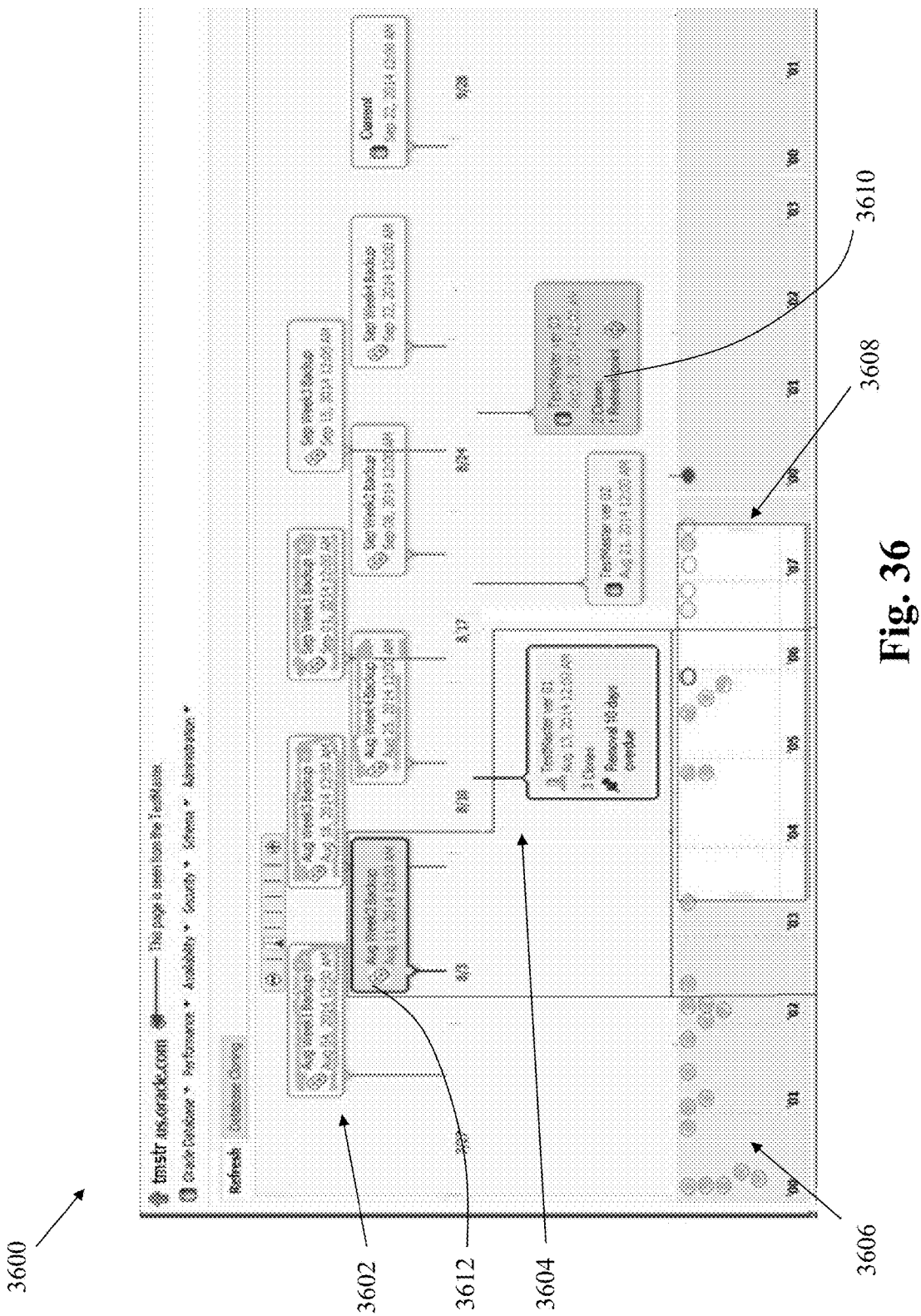
FIG. 36 shows an example interface that can be used to manage clones.

FIG. 36 shows an example interface 3600 that can be used to manage clones. This interface 3600 is useful to view details regarding the grandparent data (e.g., production data), parent data (e.g., test master data), and child data (e.g., clones) in the system.

The lower portion 3606 shows a visual timeline of objects that can be displayed in the interface 3600. The rectangular box 3608 on the bottom comprises a window of time for which the top portion of the interface displays the corresponding objects. Selection box 3608 can be shifted along the timeline to focus the interface 3600 onto a specific portion of the timeline. This selects the set of small size representations of objects in interface portion 3606 for presentation as larger representations at the top portion of the interface 3600.

Within the top portion of interface 3600, interface portion 3602 is used to identify the sources created in the system within the selected window timeline 3608. Each of the sources in interface portion 3606 can be represented by an object showing the source name and time of creation.

Interface portion 3604 displays the clones that are created in the system corresponding to the selected window timeline 3608. These clones include, for example, test master objects. Various types of details are provided for the clones displayed in portion 3604. For example, details may be provided regarding refresh/aging policies that may be applicable to the clones.

Any of the test master objects in the interface portion 3604 can be selected, which causes its parent production data to be highlighted. For example, assume that backup 3612 is the source used to create test master 3610. In this situation, selection of object 3610 will highlight both objects 3610 and 3612. In addition, a data source can also be selected, which will cause its corresponding clone(s) to be highlighted.

The details for the test master objects are displayed in some embodiments, which can be used for example, to identify the number of clones from that test master. Also displayed in some embodiments is information pertaining to retention deadlines and dates for the test master.

The management interfaces can be used to display any desired information regarding the clones and/or their parent objects. For example, clone information can be provided such as database details for the clone, source details (e.g., database backup used), storage savings, etc. As additional examples, parent information can be provided such as database details, source information, and information about the roll-up of children.

Figure 37:
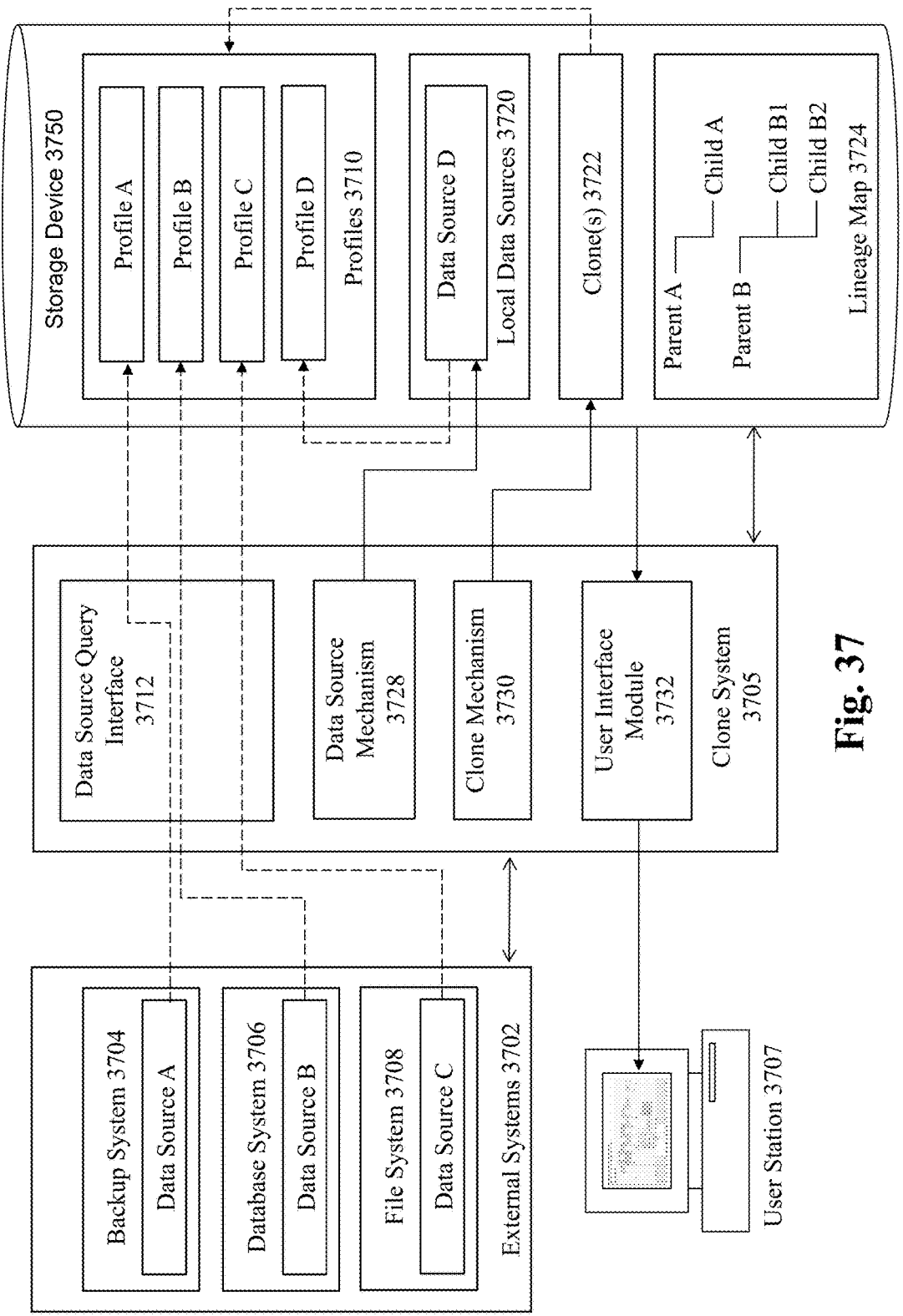
FIG. 37 illustrates a system that can be used in some embodiments to generate a user interface.

FIG. 37 illustrates a system that can be used in some embodiments to generate the user interface of FIG. 36. The clone system 3705 represents data sources as profiles in profile store 3710 in storage device 3750. Each data source to be displayed in the user interface, whether created by the clone system 3705 or acquired from an external system 3702, is represented as a profile in the profile store 3710.

A profile corresponds to a specific data source, where the profile may list a set of versions for that data source. Therefore, the profile may include the data source/version name(s), creation dates, and number of databases/clones/testmasters/services that are using the source/version. In addition, the profile may list the policies that may have been established for the retention/creation of the sources/versions. For example, the retention status information may include the removal status, warnings about stale snapshots, and messages about pending removals.

Data sources created by the data source mechanism 3728 of the clone system 3705 are stored within the local data source storage 3720. For example, a data source D may have been created by the data source mechanism 3728, e.g., using any of the methods discussed above. When the data source D is created, a profile D is also created and maintained in the profile store 3710. Each time a new version of the source D is created, the profile D for that source is updated to reflect the new version.

Data sources from external systems 3702 may also be represented within the profile store 3710. Since these data sources may not have been created by the clone system 3705, it is likely that information may need to be obtained from the external systems 3702 to allow for the representation of these external data sources as profiles within the profile store 3710. One approach is to use a query interface 3712 to query the underlying external systems to acquire the necessary information about the external data sources.

For example, an external backup system 3704 may be the origin of a data source A. The query interface may operate by issuing a request to the backup system 3704 to obtain information about the backups of interest created/maintained by the external backup system 3704, e.g., by issuing the appropriate API calls exposed by the backup system 3704. This information about the backups maintained by the backup system 3704 would be used to populate profile A in the profile store 3710.

Similarly, a database system 3706 may be the origin of data source B, e.g., snapshots of data from within a database. The query interface 3712 is configured to issue the appropriate query, e.g. in the SQL language, to access the appropriate tables within the database system 3706 to obtain the necessary information to populate profile B within the profile store. As yet another example, the external systems 3702 may include an external file system 3708 having another data source C. The query interface 3712 may be used to issue the appropriate file system calls to acquire information about data source C sufficient to populate a profile C that is maintained in the profile store 3710.

The clone mechanism 3730 is used to generate clones 3722 from any of the data sources. Any of the techniques described above for creating clones may be used by the clone mechanism 3730 to create the clones 3722. In some embodiments, information about the created clones are also maintained in the profiles in profile store 3720.

A lineage map 3724 is also maintained in some embodiments. The lineage map tracks parent-child relationships between data sources and clones within the clone system 3705. In some embodiments, the lineage map comprises relational table having a set of entries corresponding to each clone created in the system. Whenever a new clone is created, a corresponding entry is added to the lineage map that identifies the clone, its parent data source, and any other information deemed relevant for that clone. This set of entries provides a searchable set of data that tracks the relationship between clones/testmasters/services, and their underlying data sources. In this way, identification of a clone of interest can therefore be used to search the lineage map to identify its parent source. Similarly, identification of a parent source of interest can be used to search the lineage map to identify its child clone(s).

A user interface module 3732 is employed to generate the user interface to be displayed on a user station 3707. The user interface module accesses profiles in profile store 3710 to display information about the various data sources/versions. The clone information is accessed to display information about the clones. In addition, the lineage map 3724 can be used to trace and highlight related objects in the user interface, e.g., parent sources relative to their child clones, and vice versa.

Figure 38:
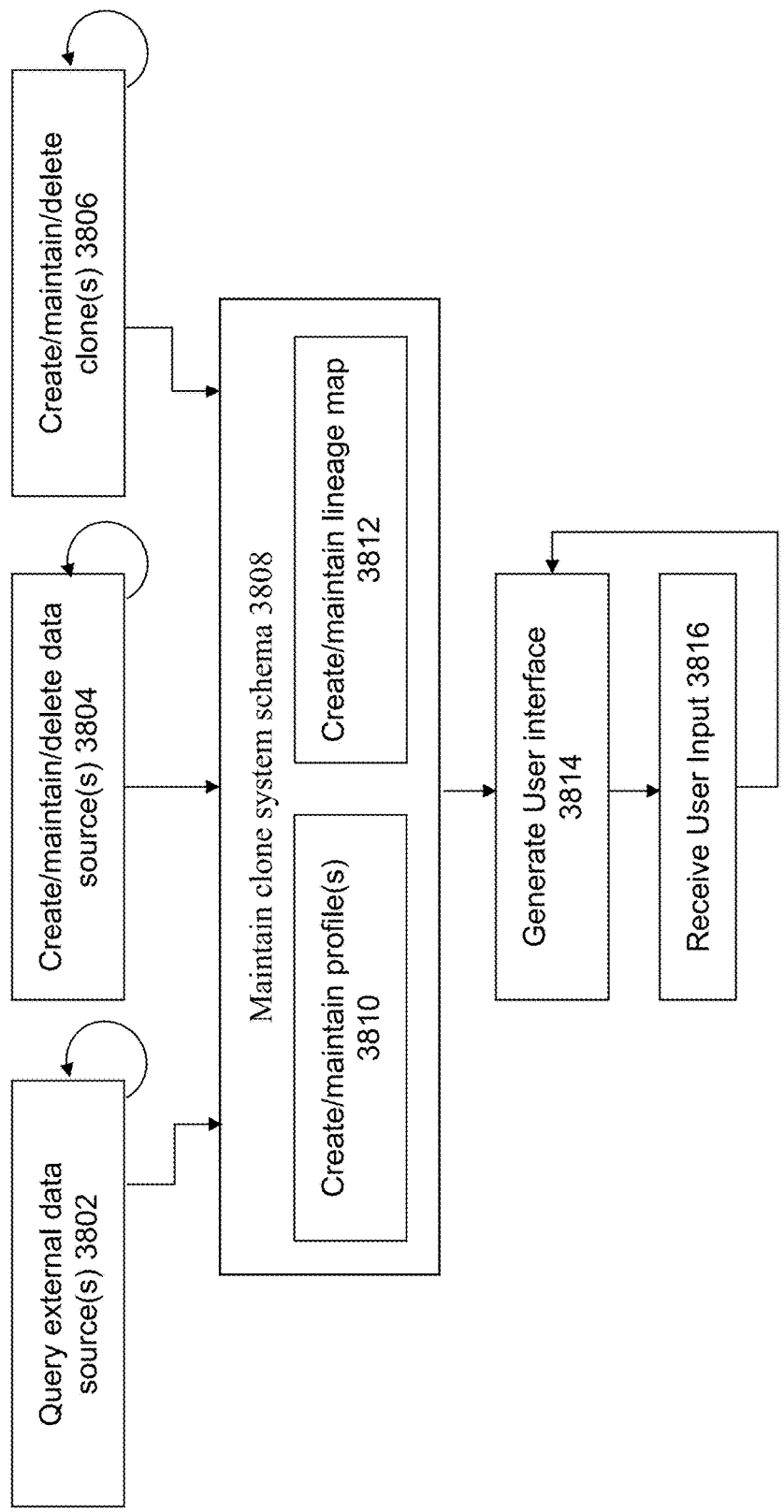
FIG. 38 shows a flowchart of an approach to implement a user interface according to some embodiments of the invention.

FIG. 38 shows a flowchart of an approach to implement the user interface according to some embodiments of the invention. At 3802, a query may be posed to an external data system to obtain information about one or more external data sources. As discussed above, a functional call, e.g., an API call, file system call, network call, and/or SQL query, may be posed against the external system to obtain the requested information. 3802 may be a periodic and/or recurring action that operates to regularly access information about the external systems. The information may be "pulled" by explicitly making a request for the information from the external systems, or "pushed" by configuring the external system to provide notification of any updates.

At 3804, operations may occur internally within the unified clone system to create, maintain, and/or delete a data source. These activities generates metadata accessible by the cloning system to recognized any changes that may need to occur to any related profiles, e.g., the creation of a new version of a data source.

At 3806, operations may occur within the unified clone system to create, maintain, and/or delete one or more clones, testmasters, and/or services. These activities will also generate metadata accessible by the system that is recognizable as requiring changes to any related profiles.

At 3808, clone system schema may need to be created and/or updated as a result of changes to the external data sources, internal data sources, and/or clones. At 3810, operations occur to create or maintain profiles corresponding to the changes to related data sources. For example, creation of a new version of an existing source will create the need to update the corresponding profile (that already exists) to reflect the existence of the new version. Creation of a new source will case the need to create a new profile for that new source. Creation of a new clone will cause the need to update the appropriate profile to reflect the existence of the new clone.

At 3812, operations occur to create or maintain the lineage map corresponding to the changes to related data sources and/or clones. For example, creation of a new clone will result in a new entry in the lineage map that identifies the new clone and its corresponding parent source.

The user interface, at 3814, is generated from the profile information and/or lineage map information. The data from the profiles are retrieved and used to populate the different portions of the user interface. The information within the lineage map is used to trace, track, and highlight the parent-child relationships between the various sources, testmasters, clones, and services within the system.

At 3816, inputs may be received from the user to operate the user interface. The inputs may be used, for example, to select a specific portion of the overall data set for detailed review, e.g., using a time window. In addition, the inputs may be used to select a specific clone to identify and highlight its parent source. Similarly, the user input may be used to select a source in order to highlight its child clone(s).

Figure 39:
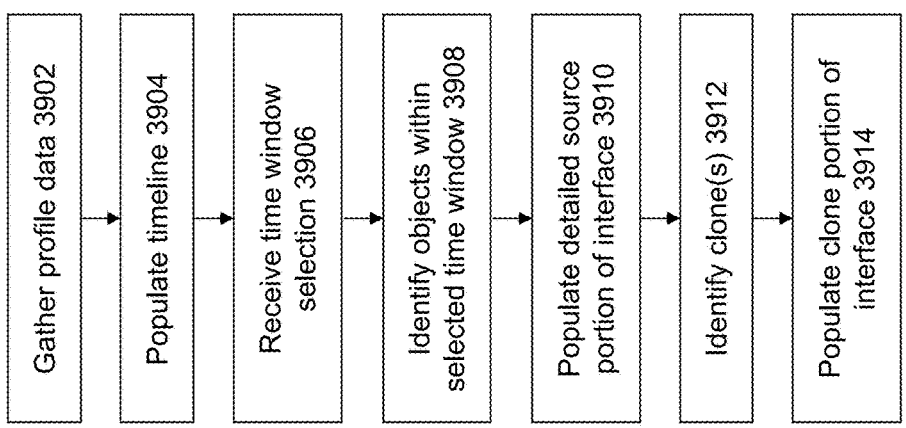
FIG. 39 shows a detailed flowchart of an approach to populate a user interface according to some embodiments of the invention.

FIG. 39 shows a detailed flowchart of an approach to populate a user interface according to some embodiments of the invention. At 3902, profile data is gathered for the profiles of interest within the clone system. As noted above, the profile may pertain to sources from external systems as well as internally created sources. At 3904, the sources and versions identified from the profiles may be used to provide a visual timeline of objects that can be displayed in the user interface. The data metadata from the profiles can be used to sort the sources/versions by date for placement within the visual timeline.

At 3906, a time window selection may be received from the user. A rectangular box within the interface can be used as a window of time for which the top portion of the interface displays the corresponding objects. This selection box can be shifted along the timeline to focus the user interface onto a specific portion of the timeline (e.g., a specific date/time range), which allows for selection of a smaller set of objects for presentation as larger objects at the top portion of the interface. Therefore, at 3908, identification is made of the objects within the selected time window for enhanced display.

At 3910, the top portion of the interface is populated with the enhanced representation of the selected source objects/versions. For example, within the top portion of user interface, objects are displayed that represent the sources created in the system within the selected window timeline. Each of the sources displayed in this portion of the interface can be represented by an object showing the source name and time of creation.

At 3912, identification is made of the clones corresponding to these source objects. This action is implemented, for example, by reviewing the appropriate entries within the profile for the source of interest. At 3914, an interface portion is displayed that shows the clones that are created in the system corresponding to the selected window timeline. Various types of details may be provided for the clones displayed in this interface portion. For example, details may be provided regarding refresh/aging policies that may be applicable to the clones, as well as statistics regarding the clones regarding overdue expirations.

For purposes of explanation, FIG. 41 shows a very simple illustration of two profiles—profile A and profile B. Each profile pertains to a respective data source. In this case, profile A pertains to data source A and profile B pertains to a data source B. Each profile may include information about the different versions that have been created for that source.

Here, profile A identifies four versions of A that have been created. Version A1 was created on 5/2015, version A2 was created on 6/2015, version A3 was created on 7/2015, and version A4 was created on 8/2015. If a clone exists for a given version, then that clone would appear in the "clone" column of the profile structure (which may also be referred to herein as the "used by" column) Here, only version A3 is associated with a clone (i.e., Clone_A3). Status information may also exist for each of the sources/clones. For example, for clone_A3, the status information notes that this clone is overdue for removal by 10 days.

Profile B identifies two versions of A that have been created. Version B1 was created on 8/2015 and version B2 was created on 9/2015. As before, if a clone exists for a given version, then that clone would appear in the "clone" column of the profile structure. Here, both version B1 and B2 are associated with a clone, with version B1 associated with Clone_B1 and version B2 associated with Clone_B2. Status information exist for each of these sources/clones. For example, for clone_B1, the status information notes that this clone is eligible for removal in 10 days, whereas for clone_B2, the status information notes that this clone is eligible for removal in 30 days.

A lineage map may also exist having entries that correspond to these profiles. Each entry identifies a parent-child relationship for the sources/clones in the system. Here, the entry for Clone_A3 identifies A3 as its parent. The entry for Clone_B1 identifies B1 as its parent. The entry for Clone_B2 identifies B2 as its parent.

It is noted that in some embodiments, the profile includes a column for the profile creation date and another column for the clone creation date. Both sets of data can be captured and placed into the timeline. For the purposes of illustration/explanation and to un-clutter the diagrams, the profile shown in FIG. 41 does not include both columns, although one skilled in the art would clearly understand that an inventive application of the techniques described herein could include these additional columns, as well as others possible columns for additional profile parameters.

FIGS. 42A-J illustrate how a user interface can be populated using this information, according to some embodiments of the invention. The top part of these figures shows a user interface having three portions. The bottom portion 4202 provides a visual timeline of the different sources mapped along the timeline. The top portion 4206 shows the sources that exist within a selected time window. The middle portion 4204 shows the clones that correspond to the sources within the time window.

Figure 42A:
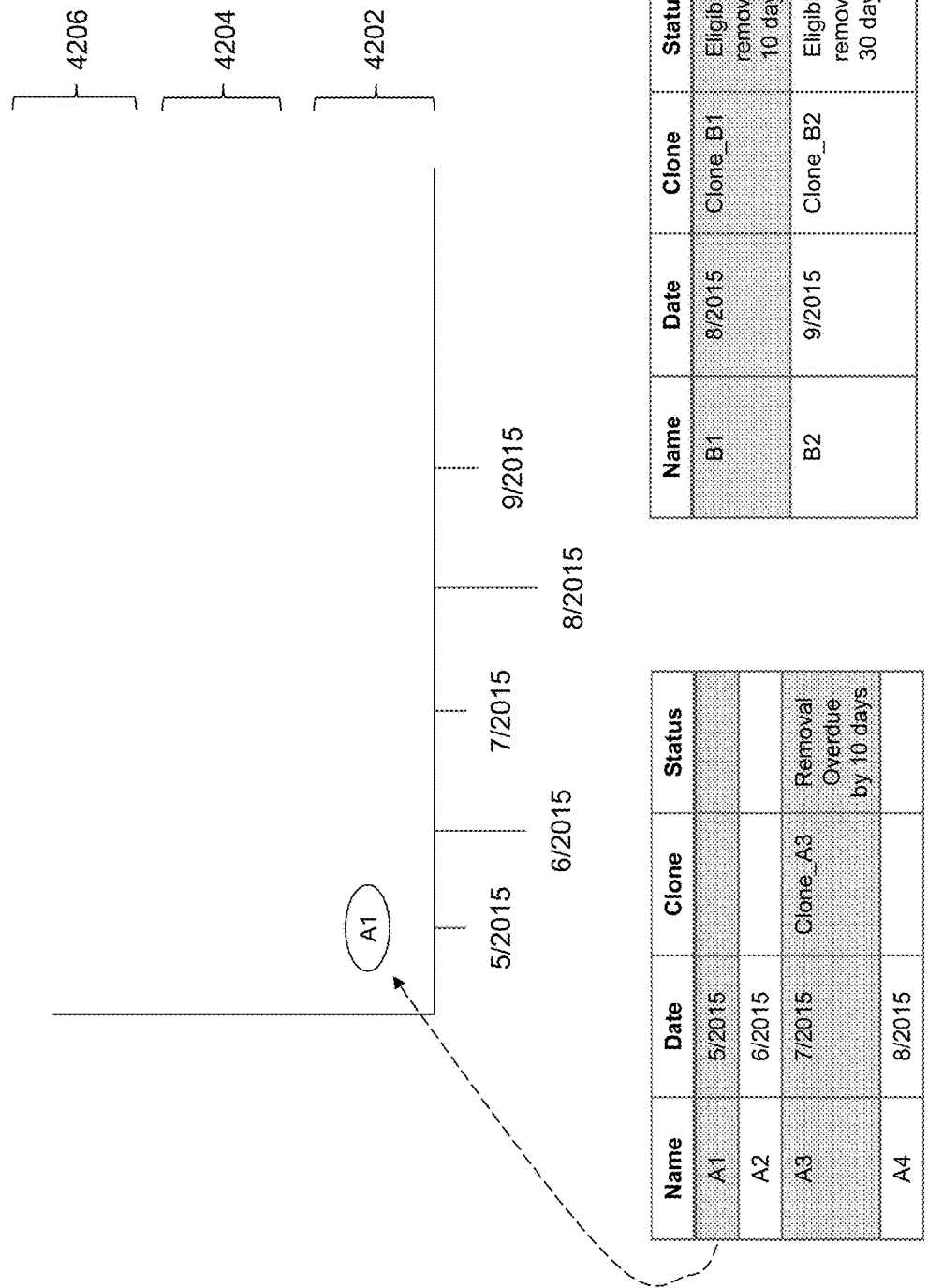
Figure 42B:
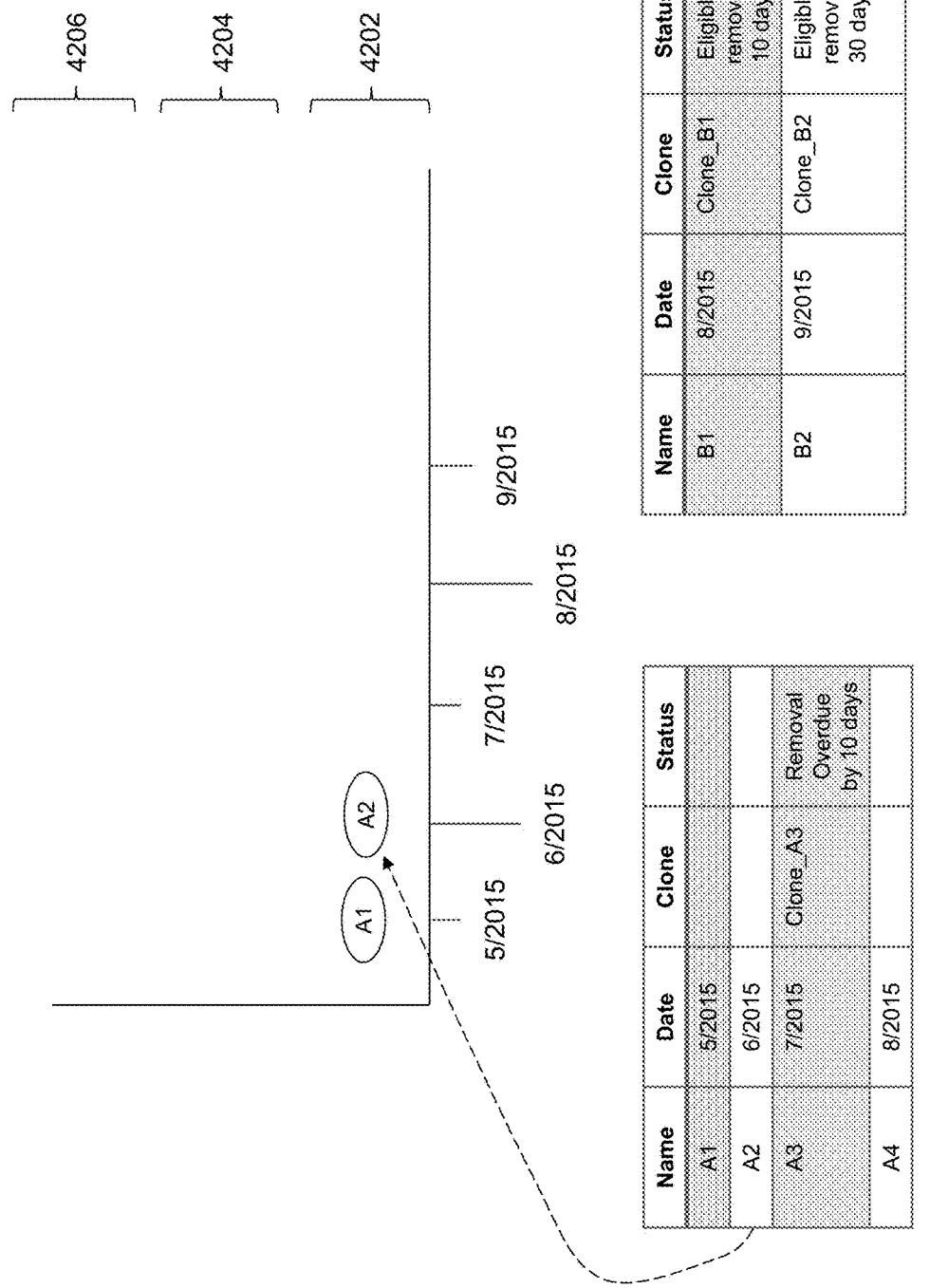
Figure 42C:
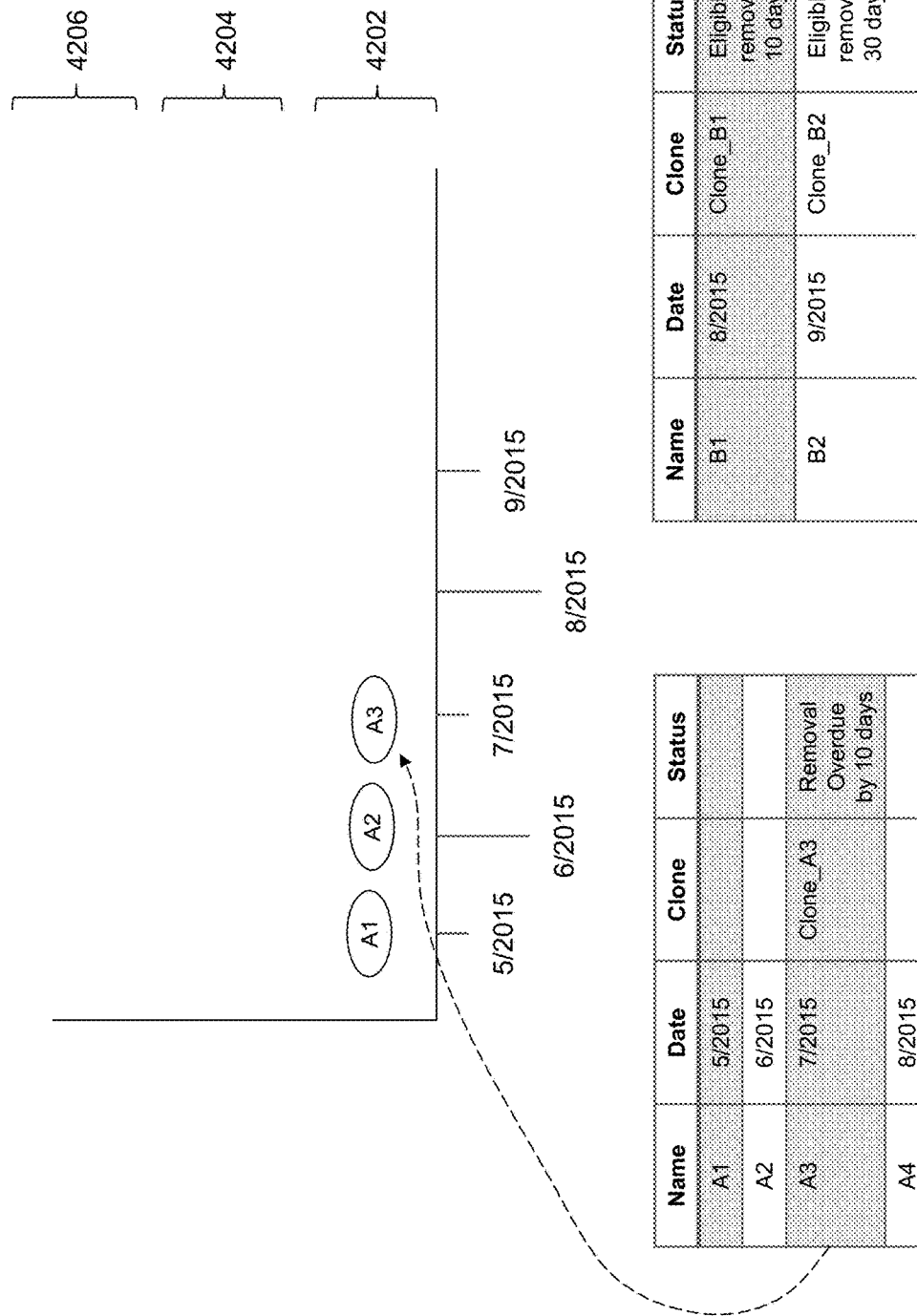
Figure 42D:
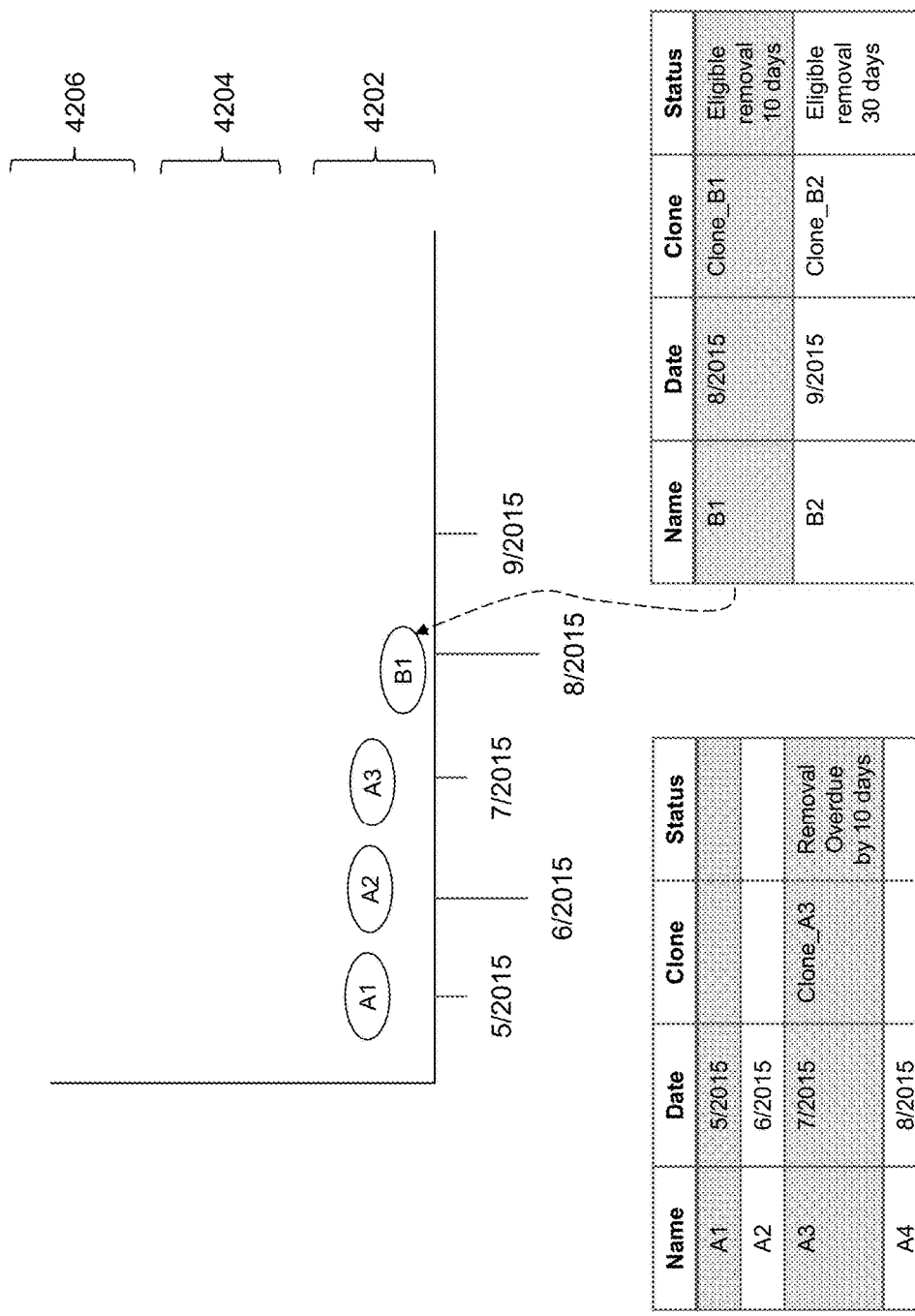
Figure 42E:
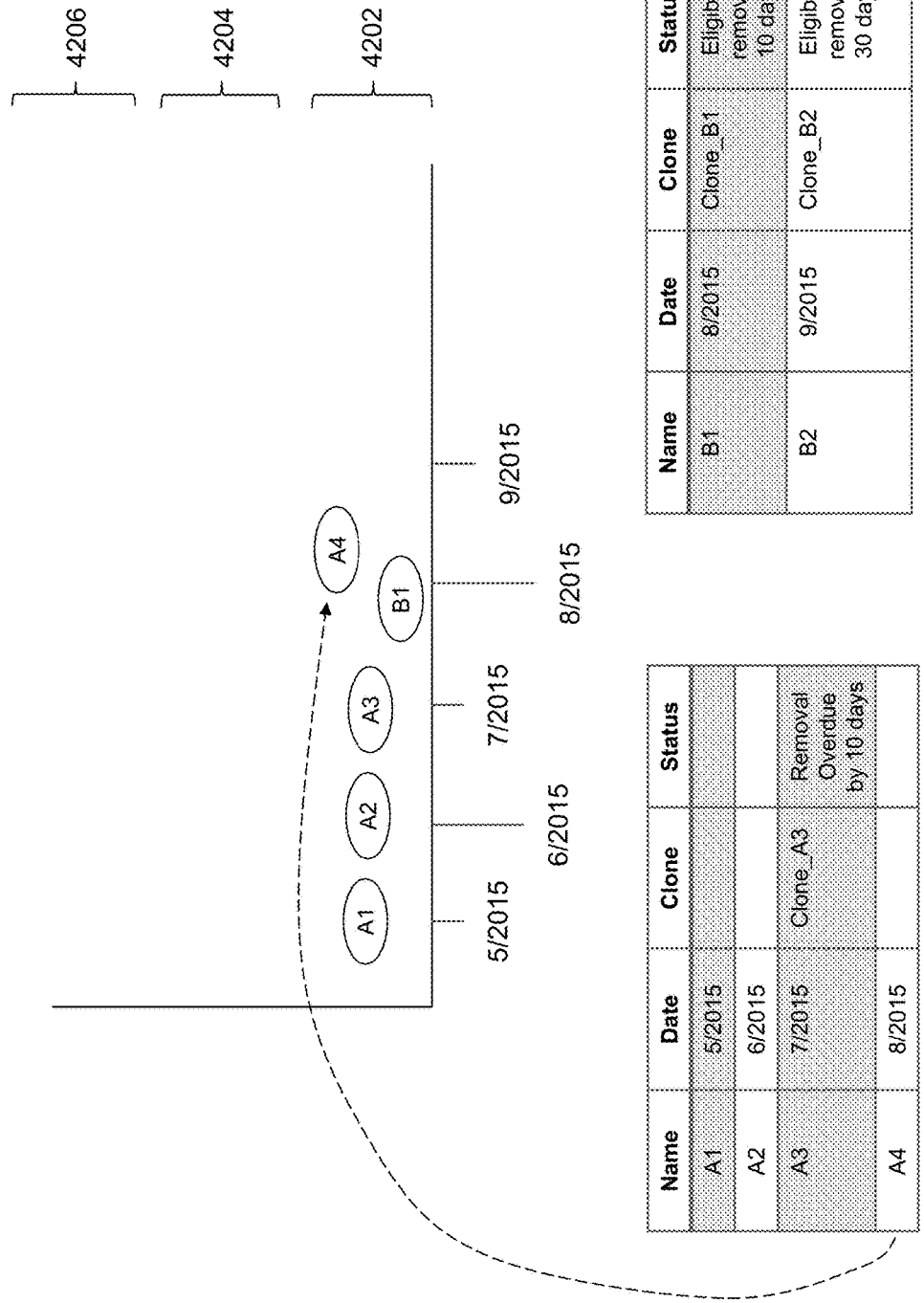
Figure 42F:
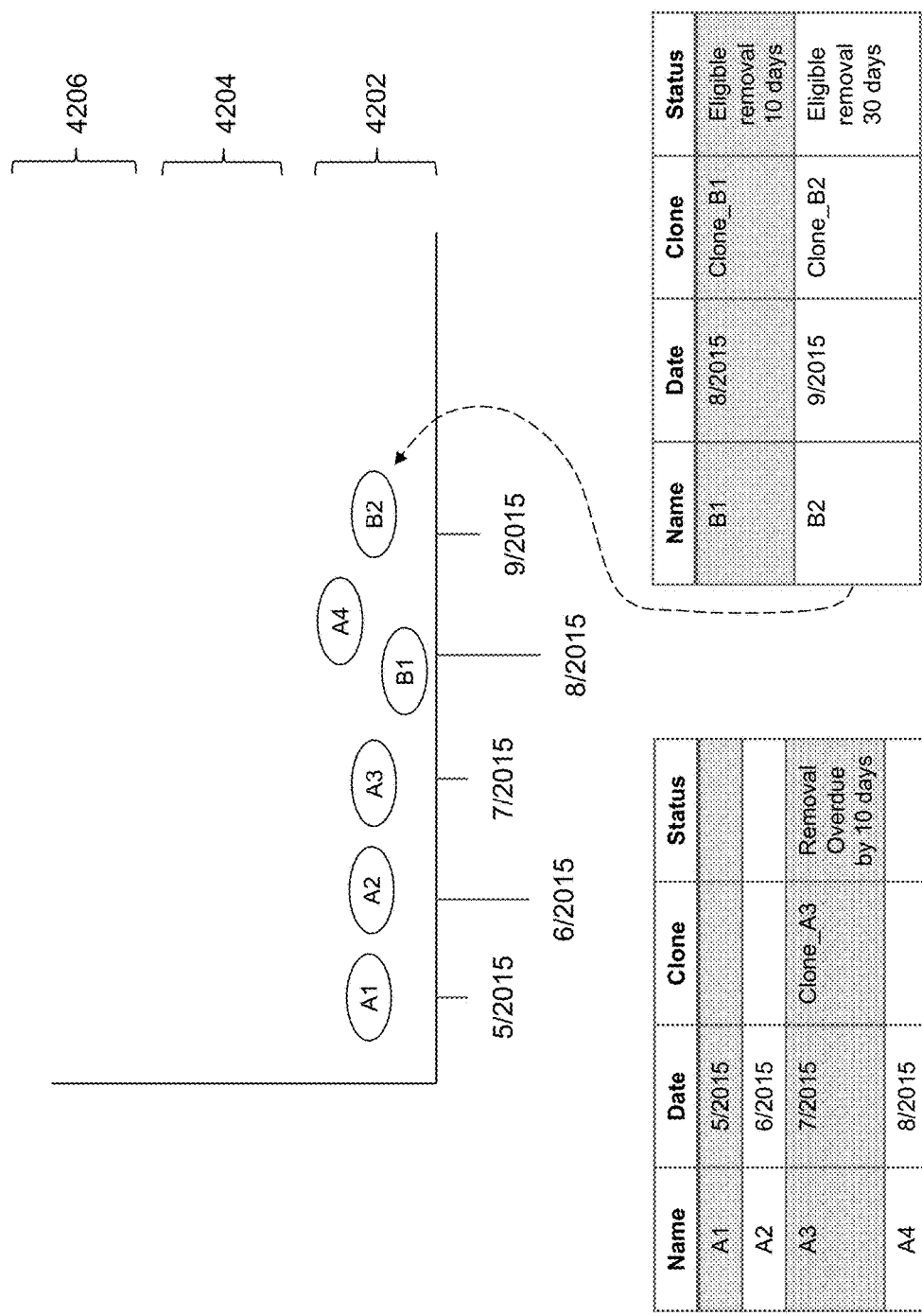

Each entry with the profiles are used to populate the bottom portion 4202 of the interface. FIG. 42A shows that, starting with A1, each of these sources/versions are represented within the timeline of portion 4202. FIG. 42B therefore shows the next source/version A2 being represented in portion 4202 of the interface. FIG. 42C shows a representation of A3 being placed into portion 4202. FIG. 42D shows a representation of B1 being placed into portion 4202 of the interface. FIG. 42E shows a representation of A4 being placed into portion 4202 of the interface. FIG. 42F shows a representation of B2 being placed into portion 4202 of the interface.

FIG. 42G illustrates a time window 4210 that is placed over a portion of the timeline of interface portion 4202. Here, the time window 4210 encompasses the time/date from 7/2015 through 8/2015. It can be seen that this time window 4210 encompasses sources/versions A3, B1, and A4.

Figure 42H:
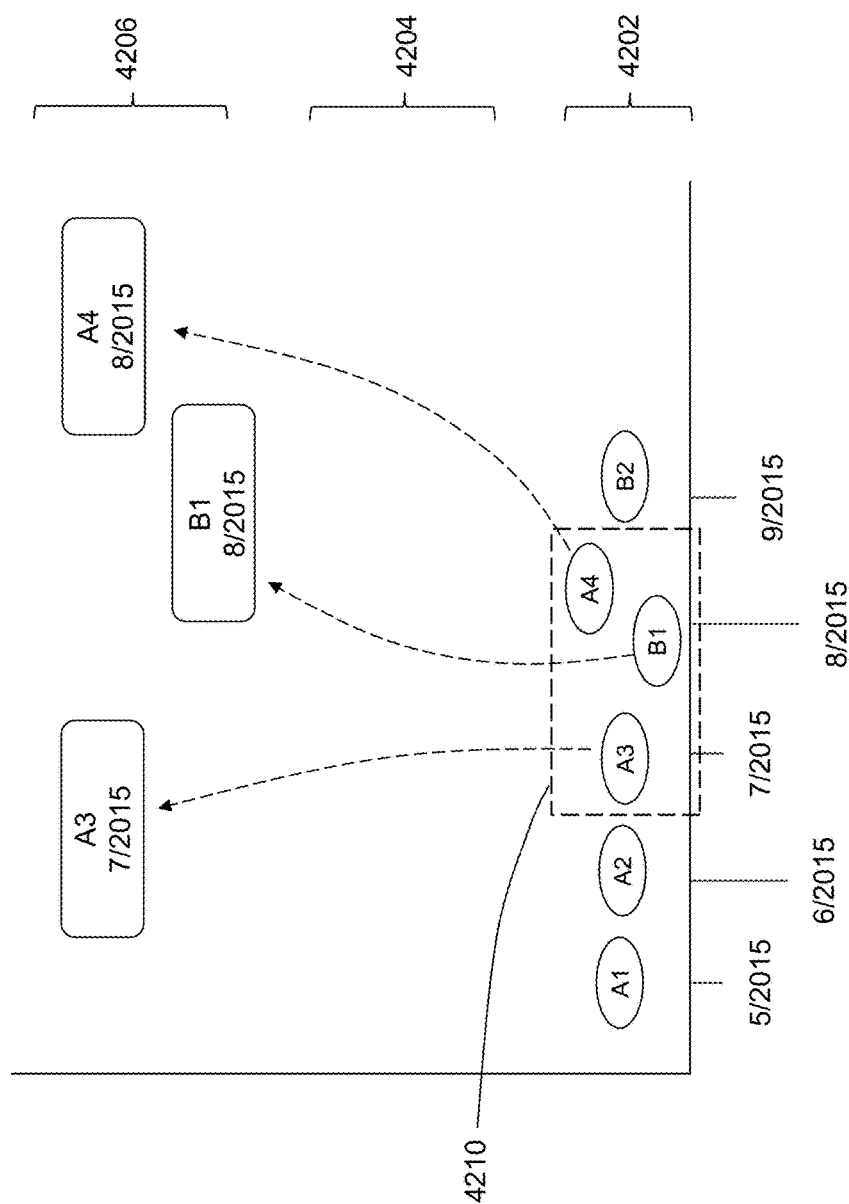

At this point, each of these sources/versions A3, B1, and A4 encompassed by time window 4210 will now be represented in greater detail in the top portion 4206 of the interface, as shown in FIG. 42H. This allows greater amounts of information to be presented for these sources/versions. For example, the date/time of creation can be displayed for each of these sources/versions in interface portion 4206.

Figure 42I:
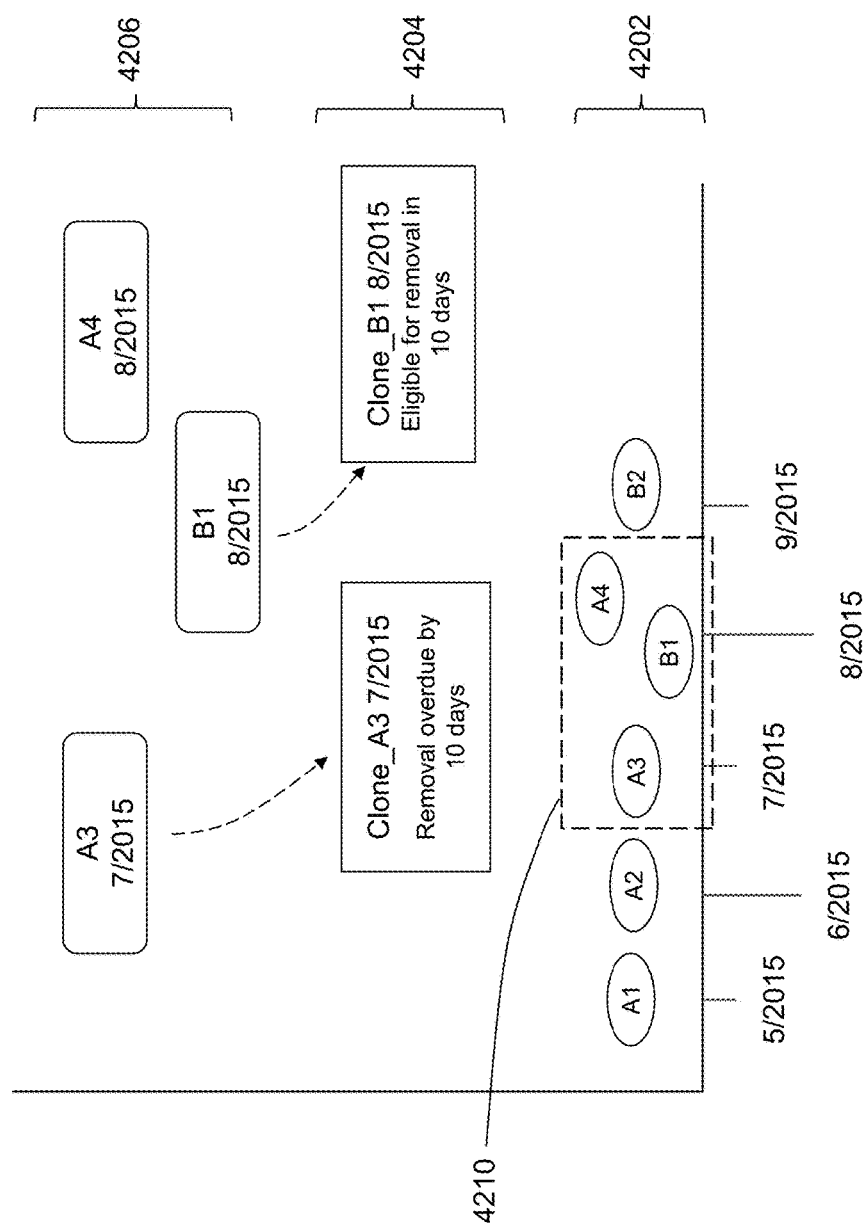
Figure 42J:
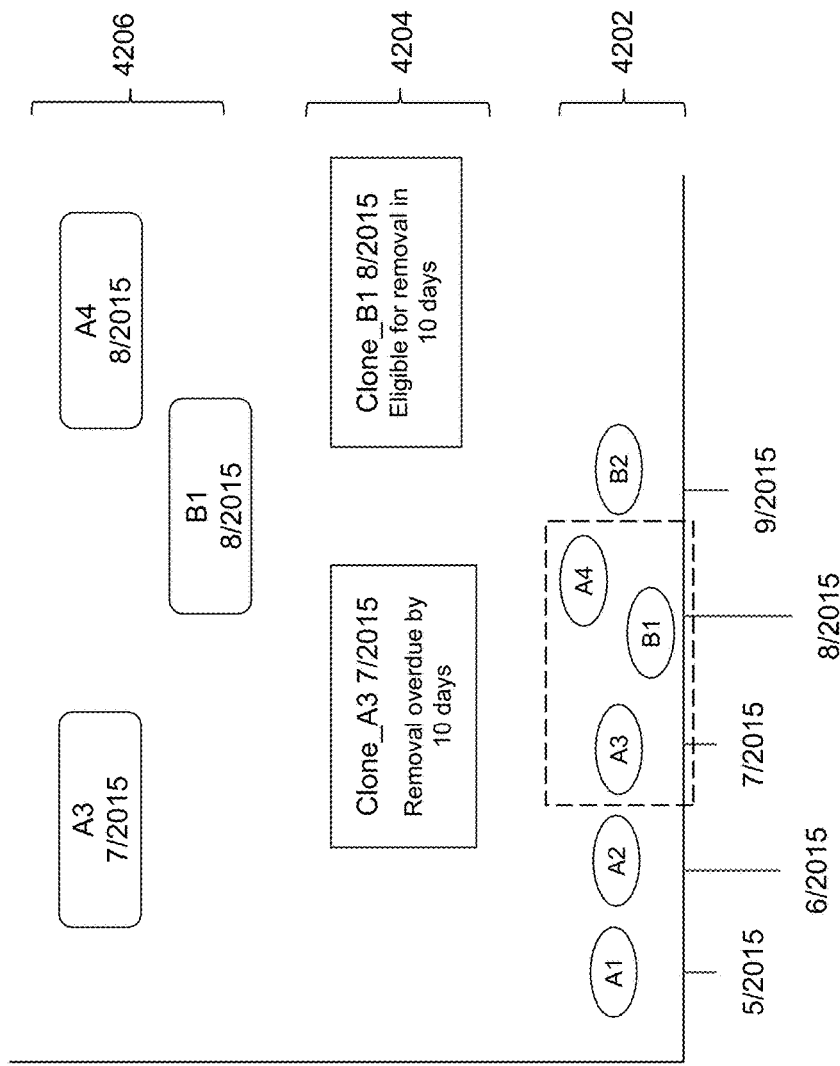

Next, as shown in FIG. 42I, detailed information about clones, testmasters, and/or services corresponding to each of these sources/versions are displayed in interface portion 4204. A3 is associated with Clone_A3, and therefore a representation of Clone_A3 is placed into interface portion 4204. Similarly, B1 is associated with Clone_B1, with a representation of Clone_B1 also placed into interface portion 4204. Each of these clone representations may include additional status information about that clone, such as information about refresh/aging policies applicable to the clones, as well as statistics regarding overdue expirations for the clones. Here, Clone_A3 is identified as being overdue for removal by 10 days. Clone_B1 is identified as being eligible for removal in 10 days. The final version of the user interface for this situation is shown in FIG. 42J.

As noted above, one of the advantages of certain embodiments is the ability to visually track and/or present lineages of different objects in the clone system, e.g., from versions such as production instances to test master instances to services running on the test master instances. The user interface provides functionality to select any given object, and to trace its parent-child relationships to highlight its related parent and/or child source/clone.

Figure 40:
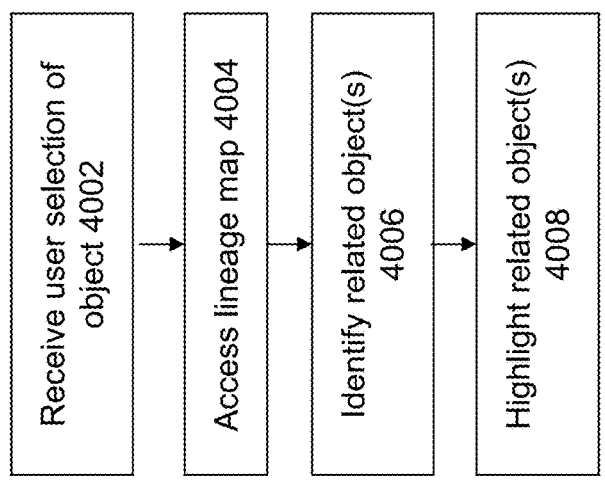
FIG. 40 shows a flowchart of an approach to implement visual tracking and/or presentation of lineages of objects in the clone system according to some embodiments.

FIG. 40 shows a flowchart of an approach to implement visual tracking and/or presentation of lineages of objects in the clone system according to some embodiments. According to some embodiments, the user interface visually identifies sets of related objects. For example, any of the test master objects in the interface can be selected, which causes its parent production data to be highlighted, or vice version.

At 4002, the user interface receives a user selection of an object in the interface. The object may be a source/version objection in top portion 4206 of the interface. In addition, the user section may be of a clone/testmaster object in the middle portion 4204 of the interface.

Next, at 4004, the lineage map structure is accessed with respect to the selected object. At 4006, related objects are identified for the selected object. This is performed, for example, by searching for one or more entries within the lineage map structure that pertains to the selected object. For example, if a testmaster/clone is selected, then the entry for that clone/testmaster is identified within the lineage map, and the entry is reviewed to identify its parent source. As another example, if a source/version is selected, then the lineage map is checked to see if there are any child clones that correspond to that selected source/version.

At 4008, the related objects are highlighted in the user interface. For example, where a given backup is the source used to create a test master, then selection of either of these two objects will cause the user interface to highlight the representation of both of these objects in the interface.

Figure 43A:
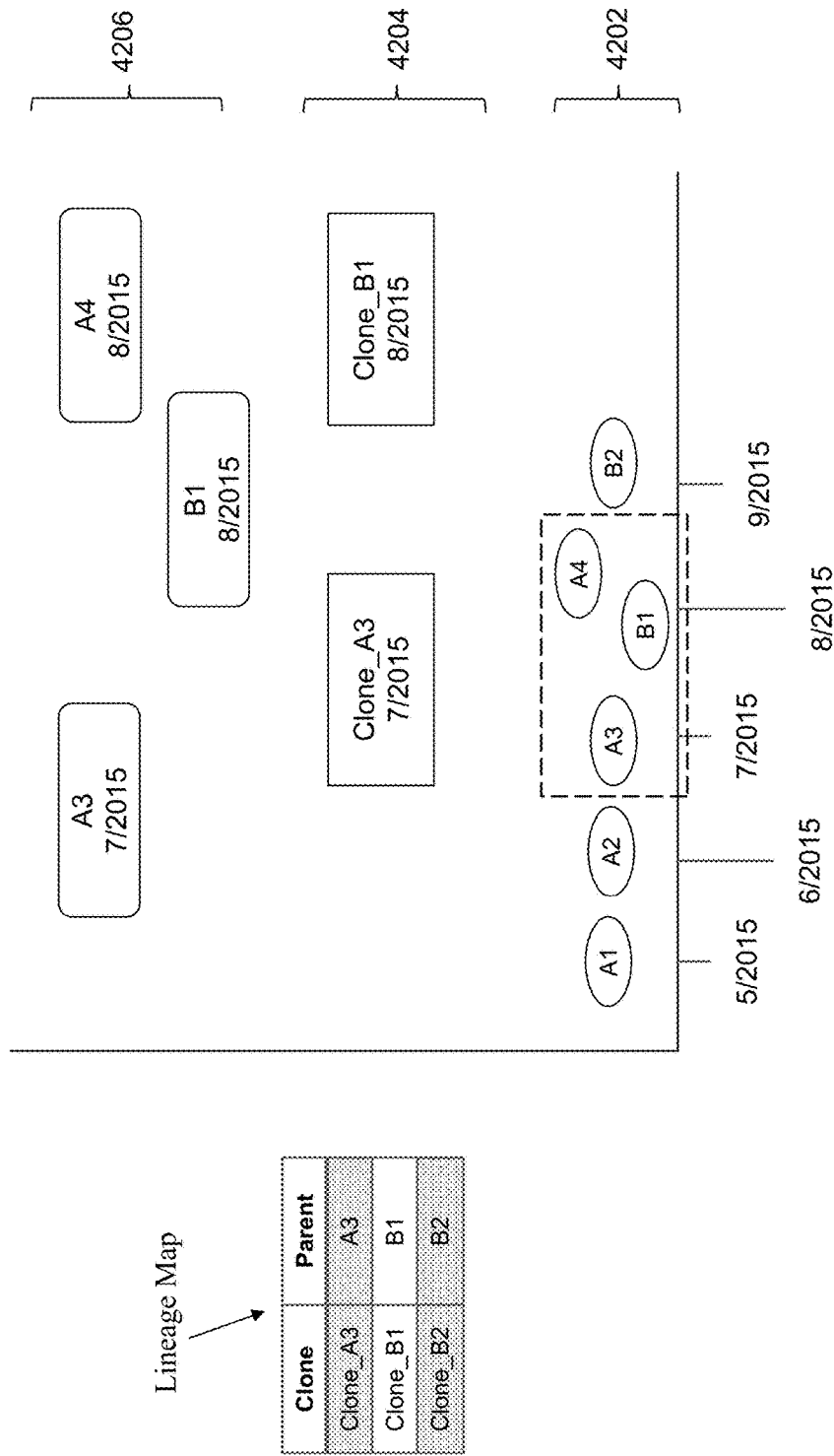
FIGS. 43A-E illustrate an example of a process to implement visual tracking and/or presentation of lineages of objects.

FIGS. 43A-E illustrate an example of this process. FIG. 43A shows the previous example, where profiles A and B are used to populate the user interface, and a time window encompasses versions A3, A4, and B1. This figure also shows a lineage map having entries for each of the clones for the profiles A and B.

Figure 43B:
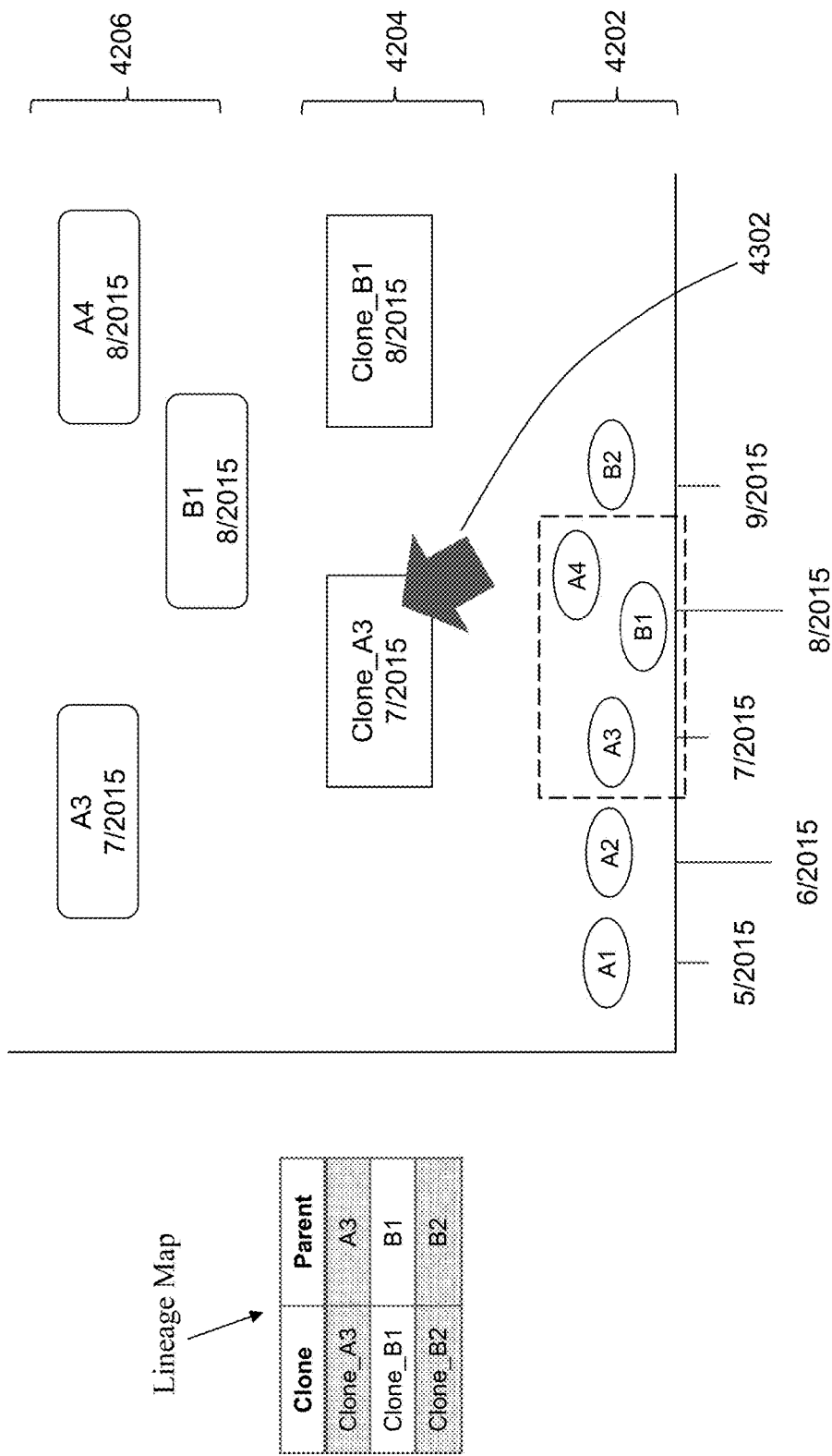

FIG. 43B shows the situation when a user selects an object in the user interface. Here, a pointer 4302 (e.g., a mouse pointer) has been used by the user to select Clone_A3.

Figure 43C:
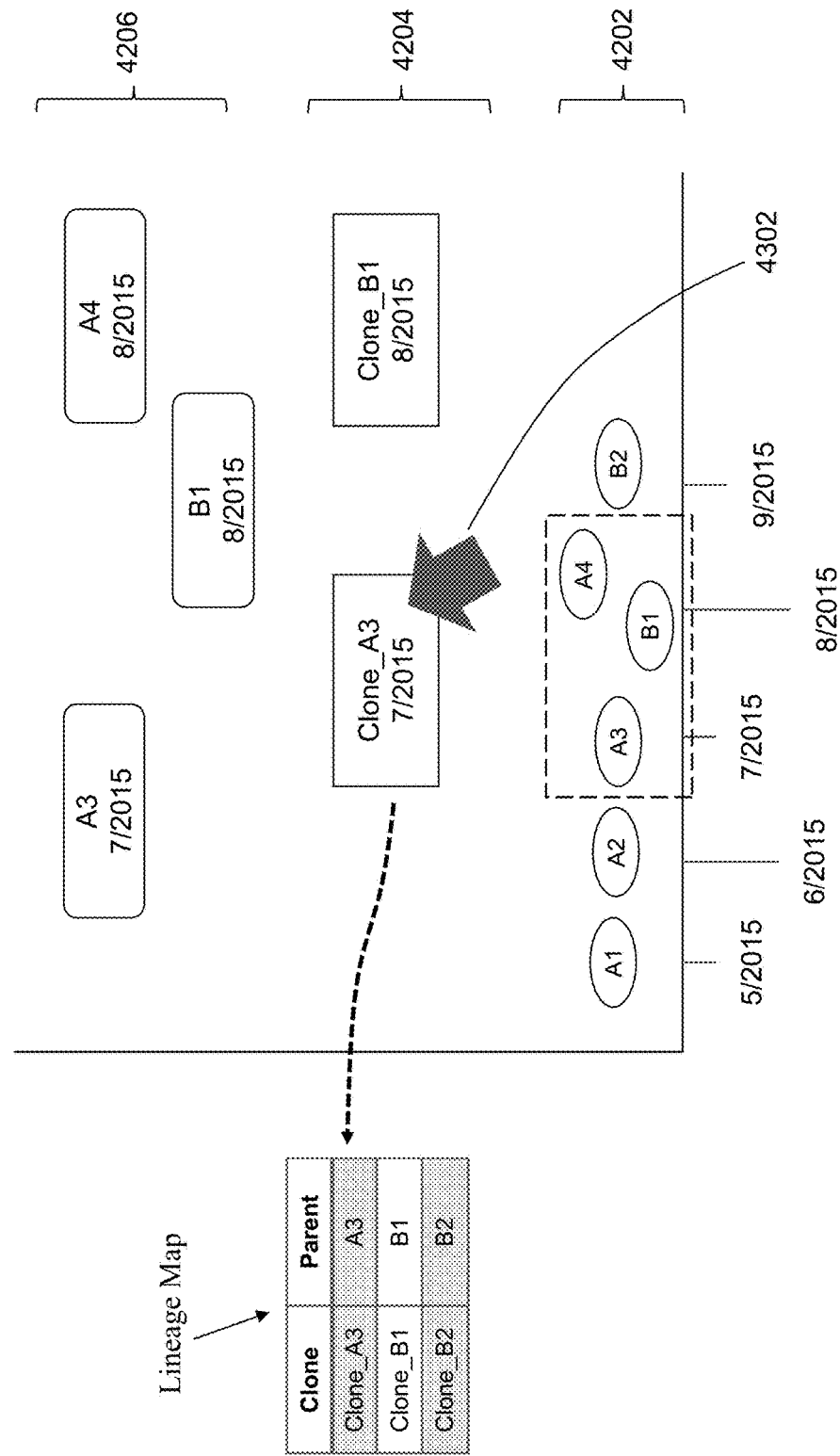
Figure 43D:
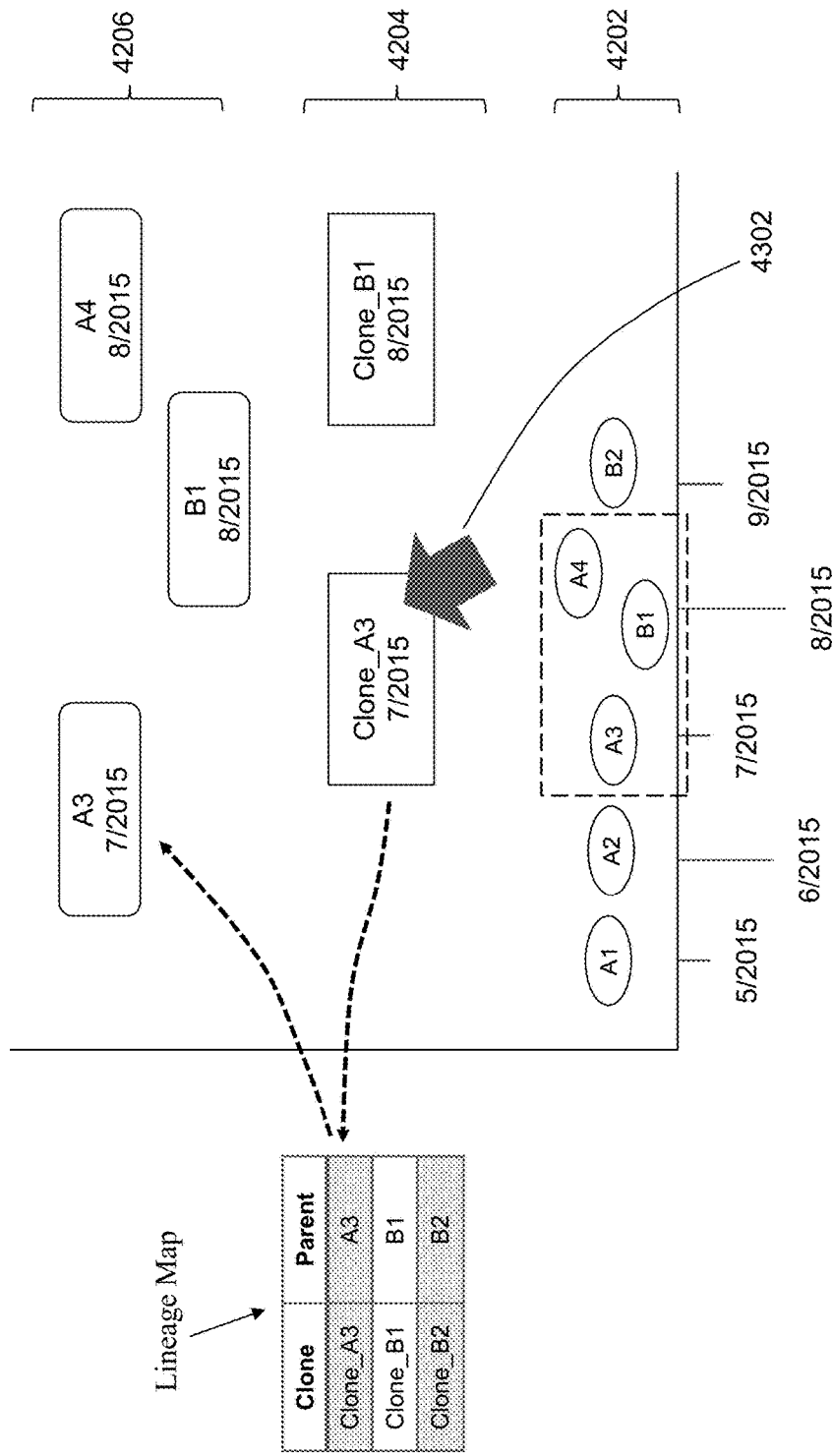

As shown in FIG. 43C, the lineage map is accessed to identify the specific entry in the lineage map structure that is associated with the selected object. Here, it can be seen that the first entry in the lineage map table corresponds to the selected Clone_A3. This entry is then reviewed to identify its parent object. As shown in FIG. 42D, its can be seen that the parent object is source version A3.

Figure 43E:
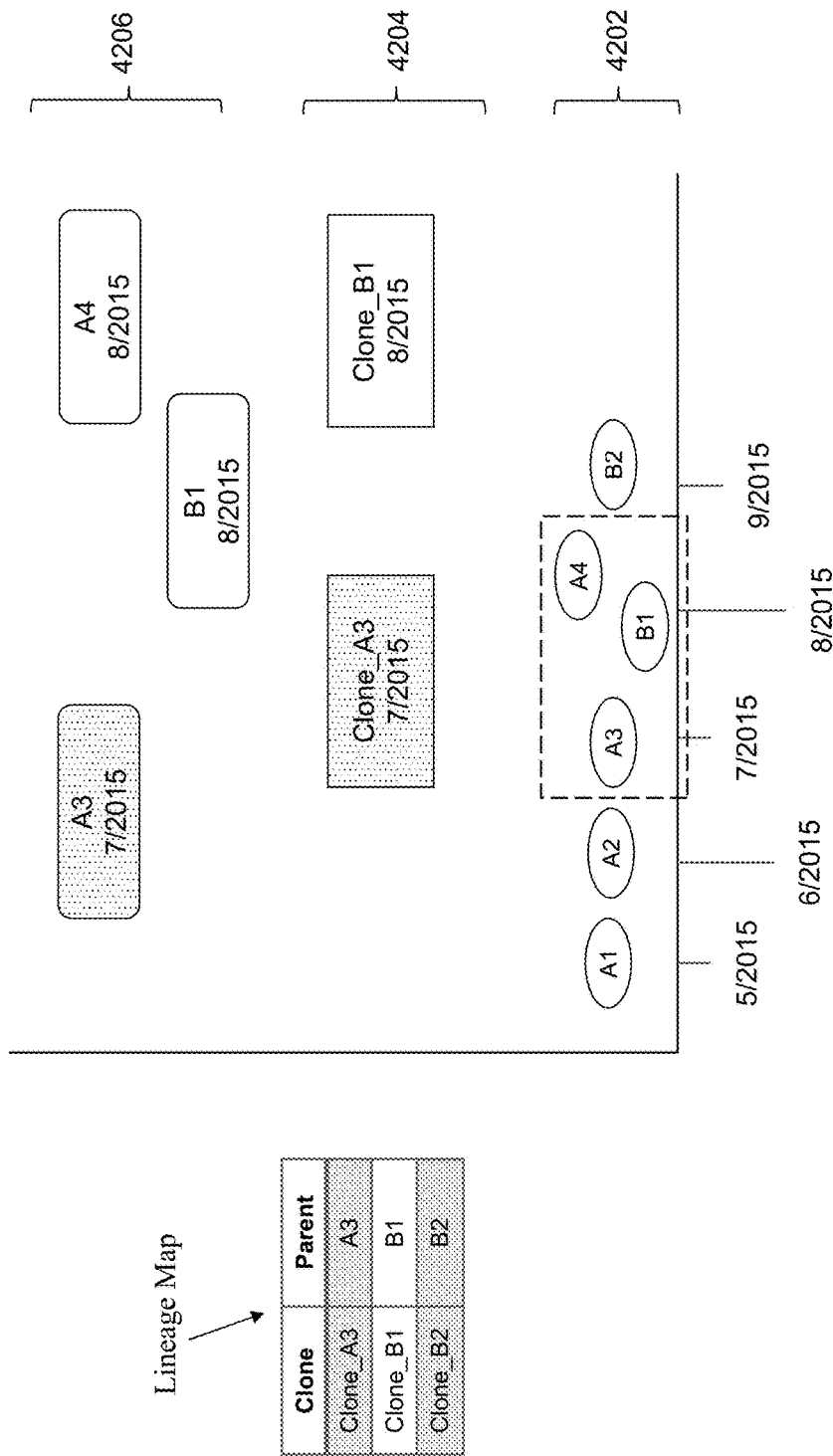

At this point, the user interface will highlight the related objects. As shown in FIG. 43E, both the selected object (Clone_A3) and its related object (parent A3) are highlighted in the user interface.

It is noted that this process may also be performed in the reverse direction. If the user had selected object A3, the lineage map structure could be searched to identify any entries corresponding to child clone/testmaster/service objects to A3. If any are found, this means that A3 does indeed have child objects, which can then be highlighted. If no corresponding entries are found, this means that A3 does not have any children clones tracked by the system.

Therefore, what has been described is a system, method, and computer program product for a unified system for implementing clones. The unified system includes the appropriate infrastructure to create, maintain, and administer clones and supporting data sources in the computing environment. By providing a unified system to implement clones, this avoids the need to require users and administrators to learn how to implement clones for each individual type of underlying system and clones which may be required in the system.

The embodiments of the invention provide complete life cycle management of data which allows the capture of data on demand and/or capture of data periodically based on a specific schedule. In addition, a purge policy can be specified for the captured data. An appropriate revision of the data can be selected that allows "time travel" to occur to a specific point in time.

A user interface is provided that is capable of visually displaying relationships and lineages of sources and clones in the system. The user interface provides functionality to select any given object, and to trace its parent-child relationships to highlight its related parent and/or child source/clone.

System Architecture Overview

Figure 44:
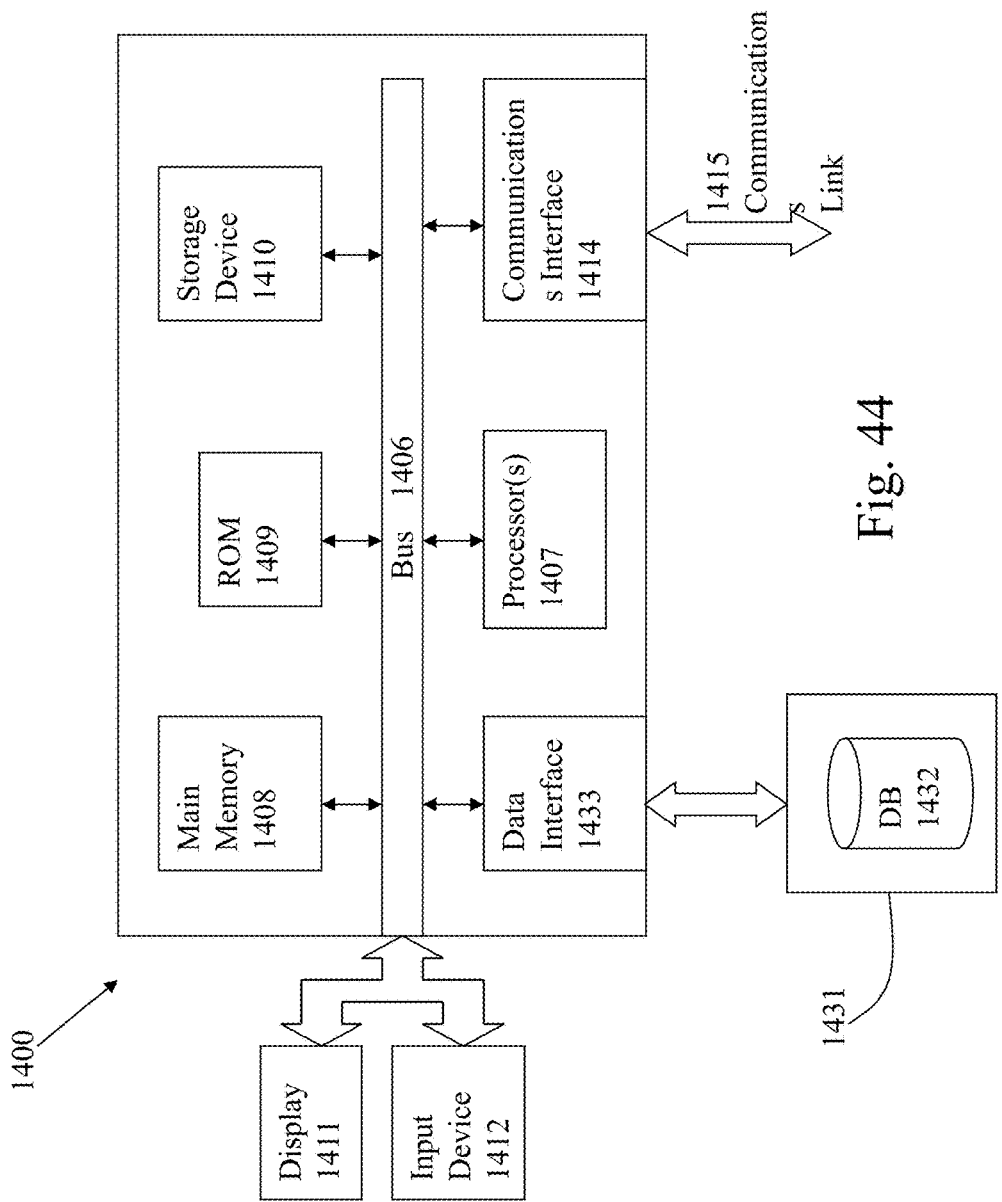
FIG. 44 shows an architecture of an example computing system with which the invention may be implemented.

FIG. 44 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
    receiving a first request to create a data source from a production database;
    responsive to the first request: creating the data source derived from the production database and storing a first entry in a lineage map structure, the first entry comprising a first parent-child relationship between the production database and the data source;
    receiving a second request to create a clone from the data source;
    responsive to the second request, creating the clone from the data source;
    storing a second entry in the lineage map structure comprising a second parent-child relationship between the data source and the clone;
    presenting, in a user interface, a display of the lineage map structure, the display comprising:
        (a) a first plurality of objects respectively representing a plurality of production databases,
        (b) a second plurality of objects respectively representing a plurality of data sources, and
        (c) a third plurality of objects respectively representing a plurality of clones;
    receiving a selection of a first object representing the data source;
    searching the lineage map structure for objects, related to the first object, by identifying:
        (a) the first parent-child relationship between the production database and the data source, and
        (b) the second parent-child relationship between the data source and the clone; and
    responsive to identifying the first parent-child relationship and the second parent-child relationship, visually identifying in the display:
        (a) a second object representing the clone derived from the data source; and
        (b) a third object representing the production database used to derive the data source.

2. The method of claim 1, wherein the user interface comprises a first interface portion having a visual timeline of the plurality of data sources, a second interface portion having a selected set of data sources selected from the plurality of data sources from the visual timeline, and a third interface portion that displays clones, of the plurality of clones, that correspond to the selected set of the data sources.

3. The method of claim 2, wherein receiving the selection of the first object representing the data source comprises receiving the selection of the first object in the second interface portion.

4. The method of claim 3, wherein visually identifying the second object and the third object in the display comprises highlighting the second object and the third object in the display.

5. The method of claim 2, wherein the third interface portion displays information for each of the clones displayed in the third interface portion, the information for said each clone comprising at least one of a refresh policy, an aging policy, expiration information, overdue date information, or statistics.

6. The method of claim 1, wherein the operations further comprise: creating a cloned database with clones derived from a respective set of data sources located on a plurality of different database platforms.

7. The method of claim 1, wherein a transformation is applied to the data source to create the clone, the transformation comprising at least one of masking, configuration changes, binary changes, or content changes.

8. The method of claim 1, wherein at least one of a retention policy or a purge policy is applied to maintain the data source or the clone.

9. The method of claim 1, wherein a profile is maintained for each data source of the plurality of data sources, the profile identifying one or more versions of said each data source.

10. The method of claim 1, wherein the creating the clone further comprises storing information about the clone in association with the second entry created for the clone in the lineage map structure, the information about the clone including at least a plurality of: (a) transformation, (b) purge policy, (c) refresh policy, and (d) version of the clone;
    wherein the transformation is applied to the data source to derive the clone;
    wherein the purge policy indicates conditions for deleting the clone; and
    wherein the refresh policy indicates conditions for updating the data in the clone.

11. The method of claim 1, further comprising:
    receiving a selection of the second object representing the clone derived from the data source;
    responsive to receiving the selection of the second object representing the clone derived from the data source:
        visually identifying in the display the second object representing the clone derived from the data source;
        finding the data source from which the clone was derived by searching the lineage map structure for the second parent-child relationship between the data source and the clone;

visually identifying in the display the first object representing the data source;
finding the production database from which the data source was derived by searching the lineage map structure for the first parent-child relationship between the production database and the data source; and
visually identifying in the display the third object representing the production database.

12. The method of claim 1, wherein visually identifying the third object in the display comprises highlighting the third object in the display.

13. A computer readable medium having stored thereon a sequence of instructions which, when executed by a processor causes the processor to execute operations comprising:
receiving a first request to create a data source from a production database;
responsive to the first request: creating the data source derived from the production database and storing a first entry in a lineage map structure, the first entry comprising a first parent-child relationship between the production database and the data source;
receiving a second request to create a clone from the data source;
responsive to the second request, creating the clone from the data source;
storing a second entry in the lineage map structure comprising a second parent-child relationship between the data source and the clone;
presenting, in a user interface, a display of the lineage map structure, the display comprising:
(a) a first plurality of objects respectively representing a plurality of production databases,
(b) a second plurality of objects respectively representing a plurality of data sources, and
(c) a third plurality of objects respectively representing a plurality of clones;
receiving a selection of a first object representing the data source;
searching the lineage map structure for objects, related to the first object, by identifying:
(a) the first parent-child relationship between the production database and the data source, and
(b) the second parent-child relationship between the data source and the clone; and
responsive to identifying the first parent-child relationship and the second parent-child relationship, visually identifying in the display:
(a) a second object representing the clone derived from the data source; and
(b) a third object representing the production database used to derive the data source.

14. The computer readable medium of claim 13, wherein the user interface comprises a first interface portion having a visual timeline of the plurality of data sources, a second interface portion having a selected set of data sources selected from the plurality of data sources from the visual timeline, and a third interface portion that displays clones, of the plurality of clones, that correspond to the selected set of the data sources.

15. The computer readable medium of claim 14, wherein receiving the selection of the first object representing the data source comprises receiving the selection of the first object in the second interface portion.

16. The computer readable medium of claim 15, wherein visually identifying the second object and the third object in the display comprises highlighting the second object and the third object in the display.

17. The computer readable medium of claim 14, wherein the third interface portion displays information for each of the clones displayed in the third interface portion, the information for said each clone comprising at least one of a refresh policy, an aging policy, expiration information, overdue date information, or statistics.

18. The computer readable medium of claim 13, wherein the operations further comprise: creating a cloned database with clones derived from a respective set of data sources located on a plurality of different database platforms.

19. The computer readable medium of claim 13, wherein a transformation is applied to the data source to create the clone, the transformation comprising at least one of masking, configuration changes, binary changes, or content changes.

20. The computer readable medium of claim 13, wherein at least one of a retention policy or a purge policy is applied to maintain the data source or the clone.

21. The computer readable medium of claim 13, wherein a profile is maintained for each data source of the plurality of data sources, the profile identifying one or more versions of said each data source.

22. A system, comprising:
a processor;
a memory having stored thereon a sequence of instructions which, when executed by a processor causes the processor to execute operations comprising:
receiving a first request to create a data source from a production database;
responsive to the first request: creating the data source derived from the production database and storing a first entry in a lineage map structure, the first entry comprising a first parent-child relationship between the production database and the data source;
receiving a second request to create a clone from the data source;
responsive to the second request, creating the clone from the data source;
storing a second entry in the lineage map structure comprising a second parent-child relationship between the data source and the clone;
presenting, in a user interface, a display of the lineage map structure, the display comprising:
(a) a first plurality of objects respectively representing a plurality of production databases,
(b) a second plurality of objects respectively representing a plurality of data sources, and
(c) a third plurality of objects respectively representing a plurality of clones;
receiving a selection of a first object representing the data source;
searching the lineage map structure for objects, related to the first object, by identifying:
(a) the first parent-child relationship between the production database and the data source, and
(b) the second parent-child relationship between the data source and the clone; and
responsive to identifying the first parent-child relationship and the second parent-child relationship, visually identifying in the display:
(a) a second object representing the clone derived from the data source; and (b) a third object representing the production database used to derive the data source.

23. The system of claim 22, wherein the user interface comprises a first interface portion having a visual timeline of the plurality of data sources, a second interface portion having a selected set of data sources selected from the plurality of data sources from the visual timeline, and a third interface portion that displays clones, of the plurality of clones, that correspond to the selected set of the data sources.

24. The system of claim 23, wherein receiving the selection of the first object representing the data source comprises receiving the selection of the first object in the second interface portion.

25. The system of claim 24, wherein visually identifying the second object and the third object in the display comprises highlighting the second object and the third object in the display.

26. The system of claim 23, wherein the third interface portion displays information for each of the clones displayed in the third interface portion, the information for said each clone comprising at least one of a refresh policy, an aging policy, expiration information, overdue date information, or statistics.

27. The system of claim 22, wherein the operations further comprise: creating a cloned database with clones derived from a respective set of data sources located on a plurality of different database platforms.

28. The system of claim 22, wherein a transformation is applied to the data source to create the clone, the transformation comprising at least one of masking, configuration changes, binary changes, or content changes.

29. The system of claim 22, wherein at least one of a retention policy or a purge policy is applied to maintain the data source or the clone.

30. The system of claim 22, wherein a profile is maintained for each data source of the plurality of data sources, the profile identifying one or more versions of said each data source.

* * * * *

UNITED STATES PATENT AND TRADEMARK OFFICE
CERTIFICATE OF CORRECTION

PATENT NO. : 10,042,908 B2
APPLICATION NO. : 14/866118
DATED : August 7, 2018
INVENTOR(S) : Kuchibhotla et al.

Page 1 of 1

It is certified that error appears in the above-identified patent and that said Letters Patent is hereby corrected as shown below:

In the Specification

Column 7, Line 6, delete "lifecyle" and insert -- lifecycle --, therefor.

Column 17, Line 53, after "snapshots" insert -- . --.

Column 25, Line 47, delete "column) Here," and insert -- column). Here, --, therefor.

Signed and Sealed this
Fourteenth Day of May, 2019

Andrei Iancu
*Director of the United States Patent and Trademark Office*